US012655686B2

(12) United States Patent
Huang et al.

(10) Patent No.: US 12,655,686 B2
(45) Date of Patent: Jun. 16, 2026

(54) SECURITY LADDER FOR A POOL

(71) Applicant: BESTWAY INFLATABLES & MATERIAL CORP., Shanghai (CN)

(72) Inventors: Shuiyong Huang, Shanghai (CN); Wenhua Hu, Shanghai (CN); Changde Wan, Shanghai (CN); Xiaobo Chen, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 940 days.

(21) Appl. No.: 17/749,601

(22) Filed: May 20, 2022

(65) Prior Publication Data

US 2022/0275683 A1 Sep. 1, 2022

Related U.S. Application Data

(63) Continuation of application No. 16/370,768, filed on Mar. 29, 2019, now Pat. No. 11,352,836.

(30) Foreign Application Priority Data

Mar. 30, 2018 (CN) ......................... 201820464344.1
Mar. 30, 2018 (CN) ......................... 201820473681.7
(Continued)

(51) Int. Cl.
*E06C 7/50* (2006.01)
*E04H 4/06* (2006.01)
(Continued)

(52) U.S. Cl.
CPC ................. *E06C 7/50* (2013.01); *E04H 4/06* (2013.01); *E04H 4/144* (2013.01); *E06C 1/26* (2013.01); *E06C 7/006* (2013.01); *E06C 7/082* (2013.01)

(58) Field of Classification Search
CPC ... E06C 1/26; E06C 7/50; E06C 7/006; E04H 4/144
See application file for complete search history.

(56) References Cited

U.S. PATENT DOCUMENTS 646,347 A * 3/1900 Betty ........................ E06C 1/32 16/326
1,308,147 A * 7/1919 Cooper ..................... E06C 1/32 182/24

(Continued)

FOREIGN PATENT DOCUMENTS

CN 205189448 4/2016
CN 206279812 6/2017
FR 2832755 5/2003

OTHER PUBLICATIONS

Extended European Search Report dated May 17, 2024 (May 17, 2024), 7 pages, issued on related European Patent Application 24162824.3 by the European Patent Office.

(Continued)

*Primary Examiner* — Colleen M Chavchavadze
(74) *Attorney, Agent, or Firm* — Dickinson Wright PLLC

(57) ABSTRACT

A safety ladder for a pool includes a movable ladder portion that can be moved between an accessible position and an inaccessible position. The movable ladder portion is disposed substantially outside of the pool and provides a series of steps that can be climbed vertically for entry into the pool when it is located in the accessible position. In the inaccessible position, the movable ladder portion is moved such that the steps can no longer be climbed and access to the pool is prevented. Such safety ladder assemblies are provided primarily to prevent children and other at risk individuals from entering an unattended pool. A dampening member is provided such that the force necessary to move the movable ladder portion is regulated to prevent a dangerous accumu- (Continued)

lation of moment and limit a risk of injury through harmful contact therewith.

15 Claims, 54 Drawing Sheets

(30) Foreign Application Priority Data

| | | |
|---|---|---|
| Mar. 30, 2018 | (CN) | 201821203446.4 |
| Mar. 30, 2018 | (CN) | 201821203463.8 |
| Jul. 27, 2018 | (CN) | 201820444310.6 |
| Jul. 27, 2018 | (CN) | 201820444511.6 |

(51) Int. Cl.

| | |
|---|---|
| ***E04H 4/14*** | (2006.01) |
| ***E06C 1/26*** | (2006.01) |
| ***E06C 7/00*** | (2006.01) |
| ***E06C 7/08*** | (2006.01) |

(56) References Cited

U.S. PATENT DOCUMENTS

| | | | | |
|---|---|---|---|---|
| 3,288,248 | A | 11/1966 | Gurian et al. | |
| 3,447,633 | A | 6/1969 | Montalto | |
| 3,539,033 | A * | 11/1970 | Schwarz | E04H 4/144 182/77 |
| 3,586,124 | A | 6/1971 | Kunzweiler et al. | |
| 3,908,795 | A | 9/1975 | Gannon | |
| 4,527,297 | A | 7/1985 | Pettit | |
| 4,566,150 | A | 1/1986 | Boothe | |
| 4,577,986 | A | 3/1986 | Wang | |
| 4,666,328 | A | 5/1987 | Ryu | |
| 4,697,305 | A | 10/1987 | Boothe | |
| 4,773,503 | A | 9/1988 | Purkapile | |
| 4,824,278 | A | 4/1989 | Chang | |
| 4,947,959 | A | 8/1990 | Yuen | |
| 4,974,701 | A | 12/1990 | Parise | |
| 5,163,531 | A | 11/1992 | Whiting | |
| 5,228,535 | A | 7/1993 | McCarty | |
| 5,263,507 | A | 11/1993 | Chuang | |
| 5,487,207 | A | 1/1996 | Rey | |
| 5,661,942 | A | 9/1997 | Palmer | |
| 5,689,999 | A | 11/1997 | Wiley et al. | |
| 5,992,566 | A | 11/1999 | Yeh | |
| 10,214,962 | B2 * | 2/2019 | Lin | E06C 7/006 |
| 10,494,866 | B2 | 12/2019 | Hsu | |
| 10,557,227 | B2 | 2/2020 | Felsenthal | |
| 2012/0061182 | A1 | 3/2012 | Grimes | |
| 2017/0101821 | A1 | 4/2017 | Shattuck et al. | |
| 2017/0356244 | A1 | 12/2017 | Peterson et al. | |
| 2018/0274296 | A1 | 9/2018 | Foley et al. | |

OTHER PUBLICATIONS

Communication pursuant to Article 94(3) EPC (European Office Action) dated Mar. 13, 2025 (Mar. 13, 2025), 15 pages, issued on related European Patent Application 24162821.3 by the European Patent Office.

Communication—Extended European Search Report dated Aug. 21, 2019 (Aug. 21, 2019) issued on related European Patent Application 19166121.4 by the European Patent Office.

Communication pursuant to Article 94(3) EPC dated Jun. 28, 2022 (Jun. 28, 2022) issued on related European patent application 21162193.3 by the European Patent Office.

* cited by examiner

SECURITY LADDER FOR A POOL

CROSS-REFERENCE TO RELATED APPLICATIONS

This U.S. patent application is a continuation of and claims priority to U.S. patent application Ser. No. 16/370,768, filed Mar. 29, 2019, which claims priority to and the benefit of Chinese patent application number 201820444511.6, filed Mar. 30, 2018, Chinese patent application number 201820444310.6, filed Mar. 30, 2018, Chinese patent application number 201820473681.7, filed Mar. 30, 2018, Chinese patent application number 201820464344.1, filed Mar. 30, 2018, Chinese patent application number 201821203463.8, filed Jul. 27, 2018, and Chinese patent application number 201821203446.4, filed Jul. 27, 2018, the entire disclosures of which are hereby incorporated by reference.

BACKGROUND OF THE INVENTION

1. Field of the Invention

The present disclosure relates to a security ladder, and more particularly, to a security ladder for an above-ground pool that selectively allows or prevents access to the above-ground pool.

2. Related Art

This section provides background information related to the present disclosure which is not necessarily prior art.

Pools provide a favorite past time in hot climates and warm summer months, as well as in cooler climates. Even if not in use, families gather around pools, grill, listen to music, and enjoy the outdoors. There are various types of residential and commercial pools that each exhibit various benefits and shortcomings. For example, in-ground pools can be constructed to be very large, are able to endure harsher environmental conditions, and have a longer operational life than above-ground pools. On the other hand, above-ground pools are generally less expensive, easier to move, and are safer than in-ground pools. Above-ground pools are largely considered a safer alternative than in-ground pools because they have a vertical wall that extends from the ground to at least partially restrict access to children and other at-risk persons. Furthermore, above-ground pools prevent accidental entry whereas an un-fenced in-ground pool can be easily accessed. However, while generally considered safer, above-ground pools can provide a dangerous attraction to children, and therefore, can still be quite dangerous. Because of these potential dangers, many regions have developed strict fencing laws to attempt to prevent children and other at-risk persons from having access to pools without adult supervision. While these laws have, to a certain extent, reduced the potential dangers associated with the various types of residential and commercial pools, not every region requires fencing, and even if required, the fencing can often times be climbed or otherwise circumvented.

For above-ground pools, various types of ladders are typically used for entry over the vertical wall. As mentioned above, these above-ground swimming pools potentially pose a significant threat to small children and toddlers that cannot swim but can still climb the ladder. Ladders for above-ground pools can be directly attached to or otherwise extend over the vertical wall and cannot easily be removed when the pool is not being supervised by an adult who is ready, willing, and able to assist someone who cannot swim. Moreover, these standard pool ladders have various configurations for easy entry into and out of the pool. For example, many ladders are constructed so that even the elderly can climb into the pool for therapeutic or recreational use. As a result of this need for convenience and easy access to the pool, these pools are also incidentally accessible by children, even without adult assistance. There have been developments to the conventional pool ladders to improve safety. The developments incorporate certain safety mechanisms onto the ladder that are often complicated in structure and costly to produce or manufacture. Another issue with traditional safety mechanisms is that they have movable parts that, during movement, can develop enough momentum to injure a user or the wall of the pool. The magnitude of injury is typically a function of the weight and speed of the moving part. Accordingly, in safety ladders that have large movable parts with a wide range of movement, there is a greater risk of injury as there is a larger range of movement to development momentum.

Another issue with these traditional safety ladders having movable parts is that they are only connected to the pool. By only connecting the safety ladder to the pool, there is an increased chance of falling off the ladder while it is being climbed. For example, because the ladder cannot be properly stowed in a usable position, it has a tendency to shake and wobble as it is being climbed.

Consequently, there exists a need for a safety ladder designed to selectively prevent access to an above-ground pool that is safe to operate and stow and relatively inexpensive to manufacture.

SUMMARY OF THE INVENTION

This section provides a general summary of the disclosure and should not be interpreted as a complete and comprehensive listing of all of the objects, aspects, features and advantages associated with the present disclosure.

Accordingly, one exemplary embodiment of the present invention provides a ladder assembly for a provided above-ground pool. The ladder assembly comprises a movable ladder portion including a movable pair of rails, a plurality of steps extending between the movable pair of rails, and a connection mechanism coupled to the movable ladder portion. The connection mechanism is configured to allow movement of the movable ladder portion relative to the provided above-ground pool between a first position and a second position. The first position permits access to the provided above-ground pool using the movable ladder portion and the second position restricts access to the provided above-ground pool using the movable ladder portion. A dampening member is coupled to the connection mechanism for controlling the amount of force necessary to move the movable ladder portion between the first position and the second position.

Further areas of applicability will become apparent from the description provided herein. The description and specific examples set forth in this summary are intended for purposes of illustration only and are not intended to limit the scope of the present disclosure.

BRIEF DESCRIPTION OF THE DRAWINGS

The drawings, as shown and described herein, are for illustrative purposes only of selected embodiments and are not intended to limit the scope of the present disclosure. The inventive concepts associated with the present disclosure will be more readily understood by reference to the following description, in combination with the accompanying drawings wherein.

DETAILED DESCRIPTION OF THE INVENTION

Example embodiments will now be described more fully with reference to the accompanying drawings. In general, the subject embodiments are directed to a safety ladder for an above-ground pool that can be stowed out of reach of children (i.e., "children" herein means children or anyone else requiring supervision while in the pool) to prevent access into the above-ground pool. However, the example embodiments are only provided so that this disclosure will be thorough, and will fully convey the scope to those skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies may not be described in detail.

The present disclosure provides a series of safety ladder configurations that provide various benefits and improve common problems that have impaired safety ladders in the prior art. Throughout the disclosure there are detailed descriptions of numerous embodiments. It should be appreciated that each safety ladder assembly 20 having a different connection mechanism 23 can benefit from any of the dampening members 25, as described herein. Accordingly, while the dampening member 25 may not be explicitly shown in every Figure, it should be understood that each embodiment, unless otherwise stated, could include any of the features of any embodiment of a dampening member disclosed herein. It should further be appreciated that the claims are not limited to any one specific embodiment unless otherwise stated and that different parts, assemblies, mechanisms of the numerous embodiments may be swapped or modified in accordance with other embodiments described herein.

Figure 1:
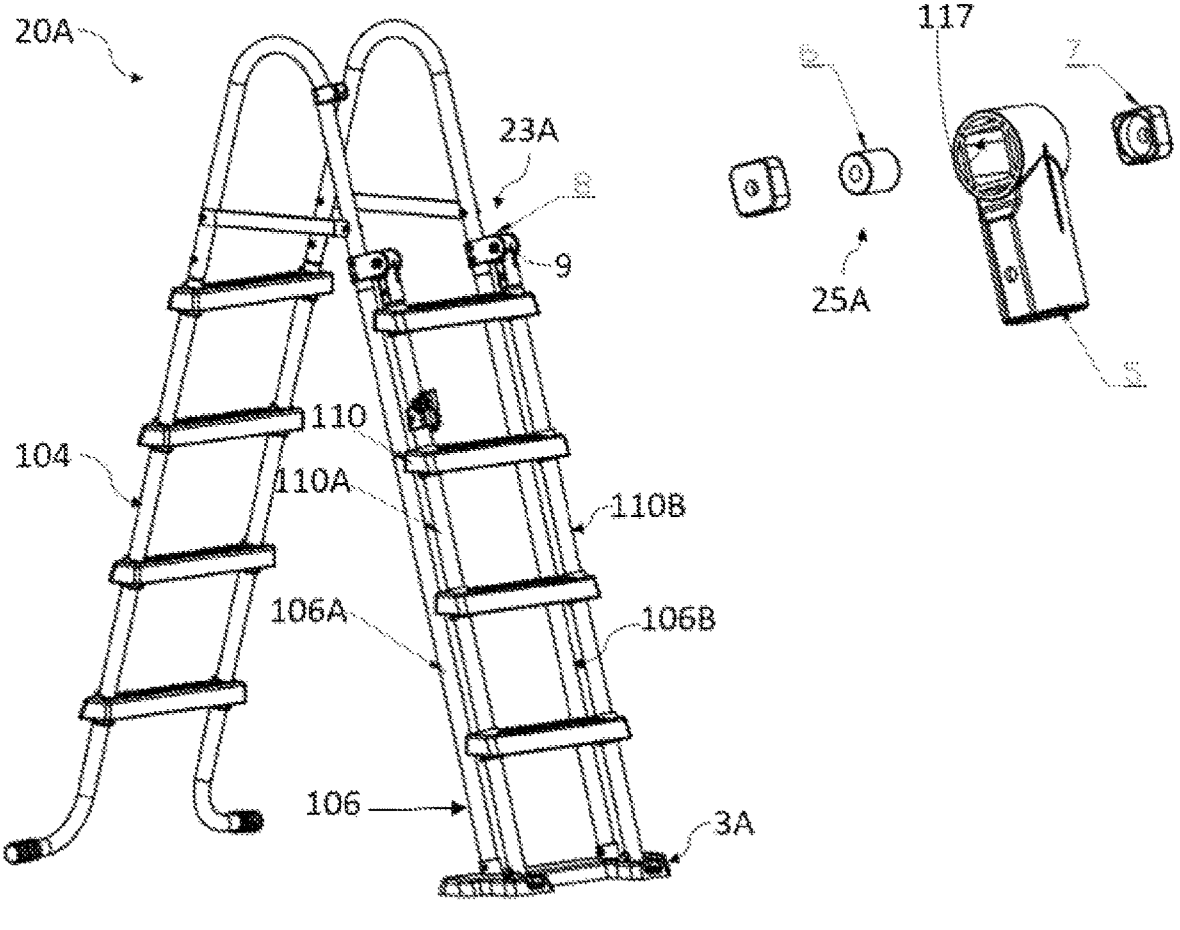
FIG. 1 is a perspective view of the one example embodiment of a safety ladder with a movable ladder portion to selectively prevent access to an above-ground pool.

Referring to FIG. 1, one embodiment of a safety ladder assembly 20A configuration is illustrated. The safety ladder assembly 20A includes a main support frame 106, 104 that includes a pair of spaced rails forming a generally triangular shape that fits over a wall of an above-ground pool. More specifically, the main support frame 106, 104 includes an exterior portion 106 that is adapted to be located outside of the above-ground pool and an interior portion 104 adapted to be located inside of the above-ground pool. The interior portion 104 includes a plurality of steps that can be climbed to allow a user to exit the above-ground pool while the exterior portion 106 does not include any steps and thus, in and of itself, cannot be climbed for access to the above-ground pool. However, the exterior portion 106 includes a movable support 110, or movable ladder portion 110, that can be climbed and that has a pair of rails or movable rails 110A, 110B. The movable rails 110A, 110B of the movable ladder portion 110 and the rails of the exterior portion, or first ladder portion 106 are connected to one another with an connection mechanism 23A located on an upper portion close to the apex of the triangle. The connection mechanism 23A is configured to allow the ladder portion 110 to be flipped with respect to the exterior portion 106 of the main support frame 106, 104. More specifically, the ladder portion 110 can be flipped approximately 180° such that it can be moved from a first, accessible position, as shown in FIG. 1, to a second, stowed position wherein the ladder portion 110 is flipped approximately 180° such that it cannot be reached by children.

The rotation of parts via the connection mechanism 23A is regulated by a dampening member 25. The dampening member 25A, in accordance with the safety ladder assembly 20A presented in FIG. 1, is configured as a rotary damper to control acceleration and deceleration of the ladder portion 110 as it is moved between the accessible position and the stowed position (or vice versa). Stated another way, the dampening member 25A increases the force necessary to move the movable ladder portion 110 between positions. By controlling acceleration and deceleration, the ladder portion 110 is prevented from moving at a velocity that could hurt a user. Numerous embodiments of the dampening member 25A are described herein, any of which can be incorporated with the various embodiments of the safety ladder assemblies described herein.

The connection mechanism 23A of the present embodiment pivotally connects each of the rails 110A, 110B of the movable ladder portion 110 to respective rails of the main support frame 106, 104, and more particularly, to the first or exterior ladder portion 106. U-shaped brackets 8 are connected to or integral with the rails of the exterior ladder portion 106. The connection mechanism 23A further includes a joint housing 5 sleeved over each rail 110A, 110B of the movable ladder portion 110 that seat within the U-shaped bracket 8. The joint housing 5 includes a through hole 117, such that a pivot pin 9 can extend through both the U-shaped bracket 8 and the through hole 117 of the joint housing 5. The dampening member 25 is located on the connection mechanism 23A and includes wear-resistant members 7 and a damper or elastic fitting 6. The housing through hole 117 is located on at least one rail 110A, 110B of the ladder portion 110 and at least partially surrounds the elastic fitting 6. In one example embodiment, the elastic fitting 6 can operate as a rotary damper. More particularly, the elastic fitting 6 is sized to come into contact with an interior surface of the housing through hole 117 and the pin 9 such that it provides friction during rotation of the joint housing 5 with respect to the U-shaped bracket 8. In operation, the elastic fitting 6 is disposed in the housing through hole 117 and is also sandwiched between the two wear-resistant members 7. The pin 9 extends through the U-shaped bracket 8 and sequentially through one wear-resistant member 7, the elastic fitting 6, and the other wear-resistant member 7, which can all be located in the through hole 117. The pin 9 can be tightened as it is threaded into a nut (not shown). Tightening of the pin 9 on the nut axially compresses the elastic fitting 6 via a sandwiching effect of the wear-resistant members 7 such that the elastic fitting 6 expands radially to enhance gripping contact with the housing through hole 117 and/or inwardly such that it enhances the grip around the pin 9. The more the elastic fitting 9 is axially compressed, the greater the grip and the resistance that is provided, in part, from the damper (which is configured in this embodiment to rotate with the pin) becomes, such grip and resistance needing to be overcome to rotate the ladder portion 110. In an alternative embodiment, the elastic fitting 6 is connected to the housing through hole 117, such that rotation of the ladder portion 110 causes corresponding rotation of the elastic fitting 6 and gripping resistance of the pin 9. In accordance with this alternative embodiment, the rotation of the ladder portion 110 and the elastic fitting 6 is resisted via frictional engagement with the pin 9 and/or the wear-resistant members 7, which are not rotating, thus increasing the force necessary to rotate the movable ladder portion 110 between first and second positions.

Figure 2A:
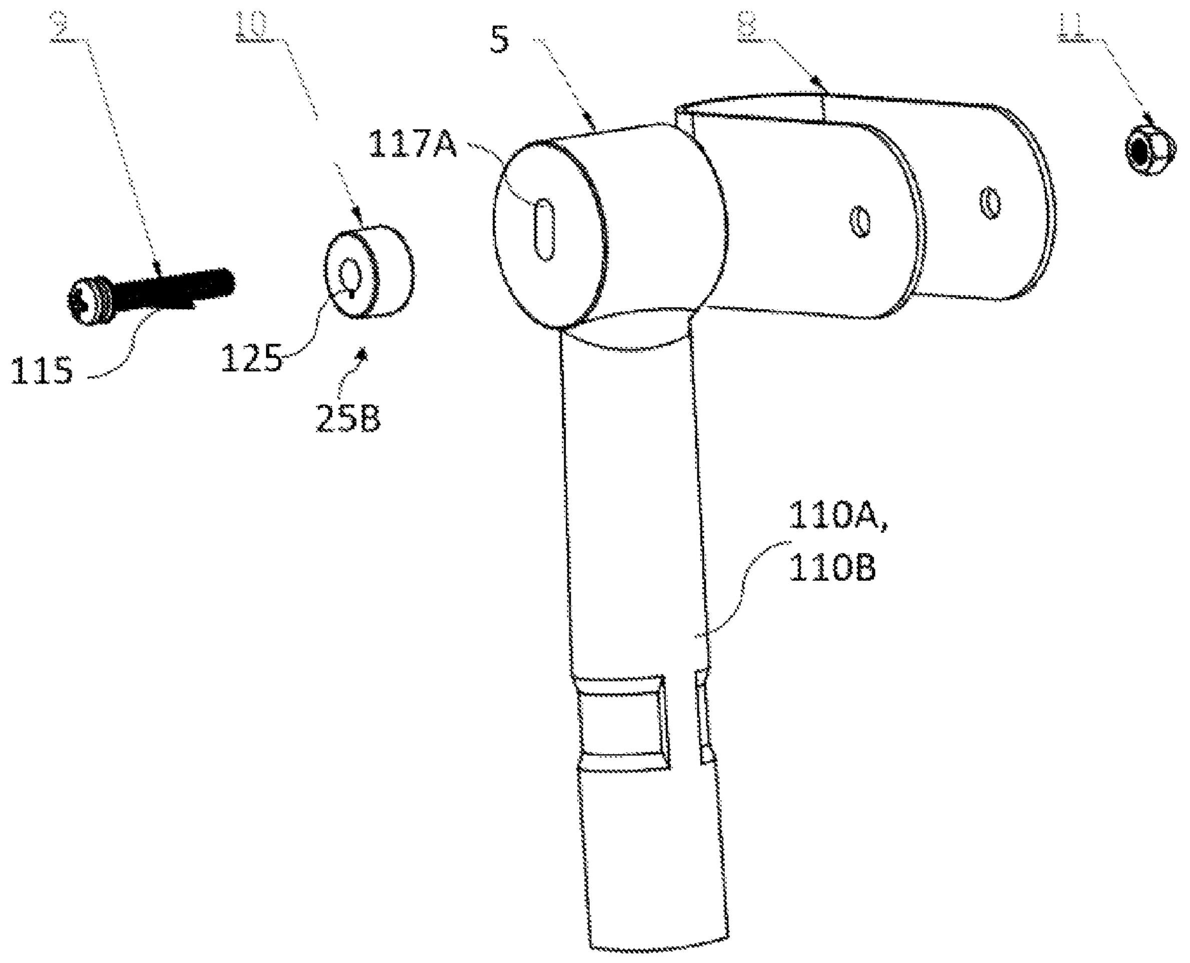
FIG. 2A is a perspective view of a connection mechanism used to rotate the movable ladder portion of the safety ladder, the connection mechanism including a dampening member to regulate the force necessary to move the movable ladder portion.

Another embodiment of the dampening member 25B is shown in FIG. 2A, wherein the connection mechanism 23A also includes housing joint 5 and U-shaped brackets 8 similar the arrangement presented in FIG. 1. Extending through the through hole 117 of the joint housing 5 is a positioning pin 9, holding in place a damper 10, and threaded in place via a locknut 11. The dampening member 25B of FIG. 2A can be utilized on one or both of the movable rails 110A, 110B of the ladder portion 110. In one exemplary embodiment, the damper 10 is connected to the housing through hole 117, such that rotation of the ladder portion 110 causes corresponding rotation of the damper 10 and gripping friction against pin 9. In other words, the rotation of the movable ladder portion 110 and damper 10 is resisted via frictional engagement with the pin 9 and/or the nut 11 which are not rotating. Alternatively, the damper 10 may be sized to come into gripping and frictional contact with an interior surface of the housing through hole 117 but is at least partially prevented from rotating therewith by connection to the pin 9. The pin 9 may include one or more ribs 115 that lock into an aperture in the damper 10. In certain embodiments, the damper 10 may include corresponding grooves 125 for seating the ribs 115 of the pin 9. In an alternative assembly of parts, the through hole 117A may be smaller than damper 10 such that the damper 10 is squeezed between an outside surface of the joint housing 5 and the inner surface of the U-shaped bracket 8. In such arrangements, two dampers 10 may be used.

Figure 2B:
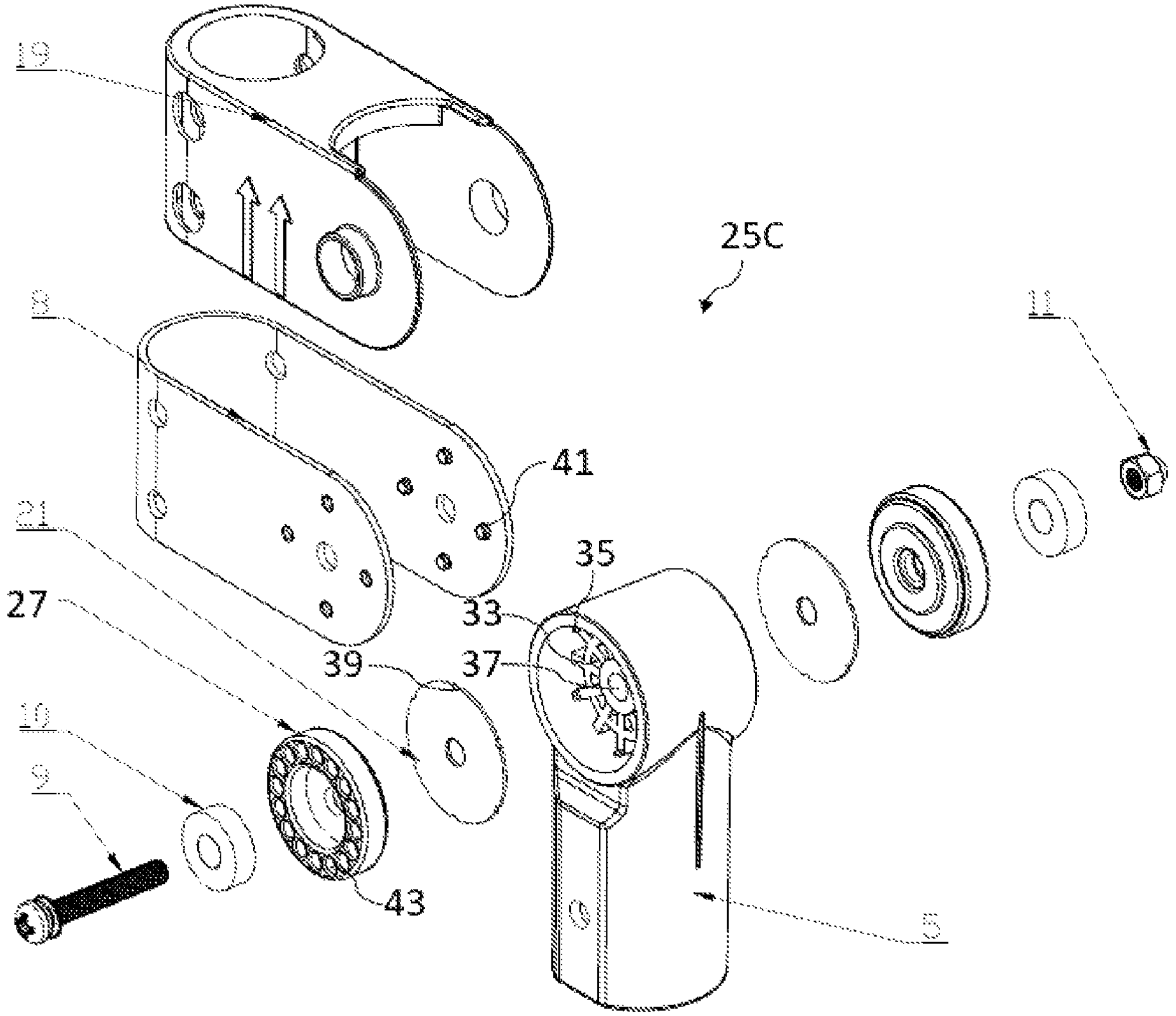
FIG. 2B is a perspective view of a connection mechanism including another dampening member configuration.

Another embodiment of the dampening member 25C is shown in FIG. 2B. The dampening member 25C is located in a connection mechanism that includes a joint housing 5 and a U-shaped bracket 8. The joint housing 5 fits within the U-shape bracket 8 and rotates relative thereto. The dampening member 25C includes a pair of friction discs 27, including a first and second friction disc 27. The friction discs 27 each include a plurality of depressions 43 arranged in a circumferential array. The U-shaped bracket 8 includes a plurality of projections 41 that are also arranged in a circumferential array. In certain embodiments, the projections 41 fit within the depressions 43 and, during rotation of the movable part 110, the projections 41 sequentially seat within the depressions 43 as the friction disc 27 rotates relative to the U-shaped housing 8. Un-seating the projections 41 from the depressions 43 requires some force, thus increasing the force necessary to rotate the movable ladder portion. In such embodiments, the friction disc 27 at least partially rotates with the joint housing 5. Still referring to FIG. 2B, the housing joint 5 has a through hole 117 similar to the previous embodiments. However, an interior wall 33 divides the through hole 117 in approximately half. The interior wall 33 includes a bore 37 from which a pin 9 can extend through. Each of the friction discs 27 are on opposite sides of the interior wall 33. Between each friction disc 27 and the interior wall is a spacer 21 that includes a bearing surface. The spacer 21 has apertures 39 and the interior wall 33 has protuberances 35 that mate with the apertures 39 thus connecting the spacers 21 to the interior wall 33. The spacers 21 each provide a bearing surface upon which the friction disc 27 can be allowed to rotate relative to even when in direct contact. The dampening member 25C further includes a compression ring 10 or damper 10 that is located on an outside surface of each friction disc 27 and preferably is sized to compresses in order to provide frictional contact between the friction disc 27 and the U-shaped bracket 8. A bracket cover 19 is shaped to fit over the entire U-shaped bracket 8 once the dampening member 25C is assembled. The bracket cover 19 prevents debris from effecting the dampening member 25C and further prevents users from pinching and injuring themselves during movement of the movable ladder portion. A nut 11 is threaded into pin 9 to connect the dampers 10, friction discs 27, and spacers 21. In other embodiments, the friction disc 27 may not rotate with joint housing 5 such that the projections 41 are permanently seated within depressions 43 and friction is caused between the friction disc 27 and the spacer 21. In yet another embodiment, the friction disc 27 may rotate partially but not completely with the joint housing 5 and cause friction against both the U-shaped bracket and the spacer simultaneously. It should be appreciated that the bracket cover 19 can be implemented in any of the embodiments provided herein.

Figure 3:
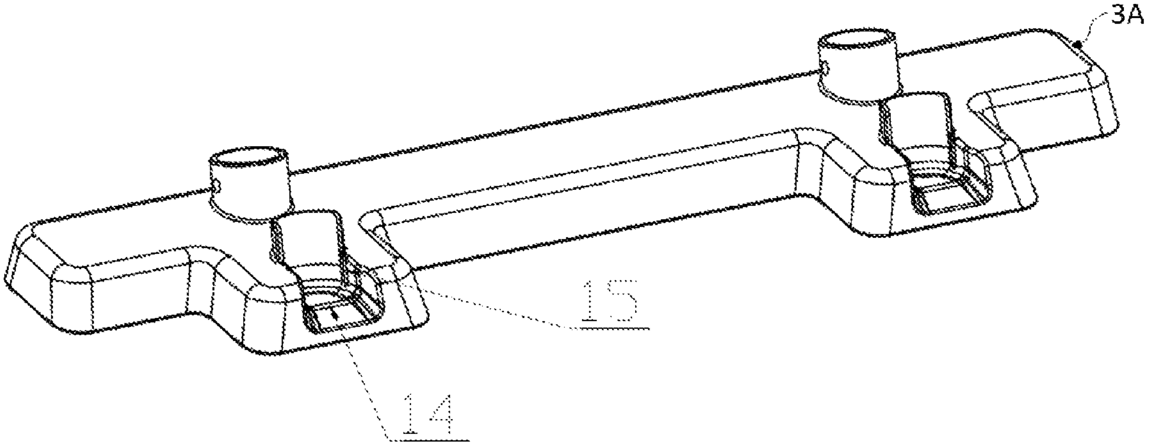
FIG. 3 is a perspective view of a support base that retains the movable ladder portion of the safety ladder in a position that allows access to the above-ground pool.

Referring to FIGS. 1 and 3, a support base 3A is attached to the bottom of the exterior portion 106 of the main frame 106, 104, and preferably remains stationary on the ground when the safety ladder assembly 20A is installed on an above-ground pool. In certain embodiments, the support base 3 includes pins (not shown) that can be driven into the ground for locking it in place. As will be detailed further in the proceeding paragraphs, the support base 3 includes a stop structure for selectively retaining the movable ladder portion 110 in the first or accessible position, as shown in FIG. 1. Numerous example embodiments of the stop structure are provided and the stop structure is primarily intended to hold onto a bottom portion of the rails 110A, 110B of the movable ladder portion 110 to prevent shaking or wobbling of the movable ladder portion 110 as it is being climbed.

Figure 4:
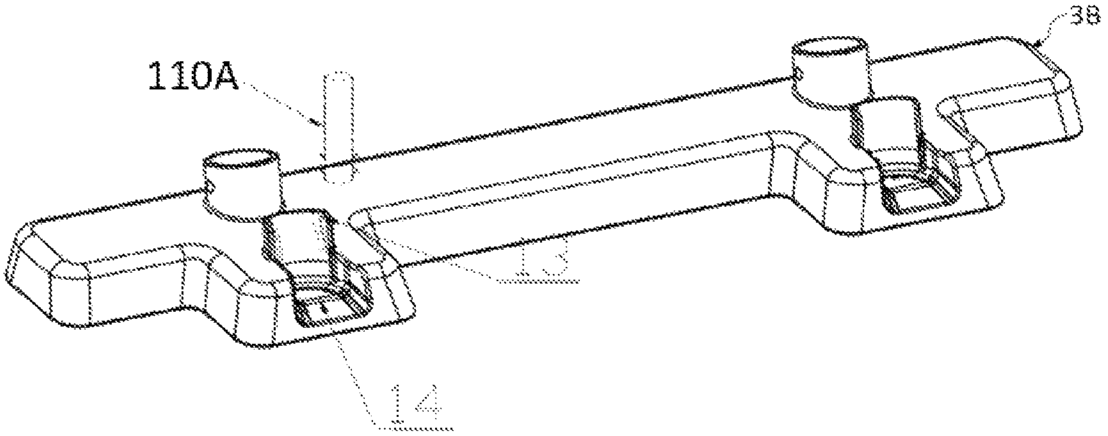
FIG. 4 is a perspective view showing a portion of the safety ladder being inserted into a support base in accordance with another embodiment of the support base.

The support base 3A includes at least one fixing recess 14, or alternatively two, for receiving and retaining at least one of the movable rails 110A, 110B in a press-fit connection. The fixing recesses 14 are provided with protruding stop ridges 15 that help form the press-fit connection. FIG. 4 illustrates an additional embodiment of the support base 3B that also includes a fixing recess for receiving the movable support or rails 110A, 110B. As shown in FIG. 4, at least one of rail 110A, 110B of the movable ladder portion 110 includes elastic buckles 12 extending outwardly therefrom that are disposed on both sides of a bottom of the rail 110A, 110B that interfaces with the support base 3B. The modified support base 3B includes a projection 13 that is shaped to mate with the buckles 12. Each projection 13 may extend into the fixing recess and each projection 13 may further be at least partially flexible.

Figure 5:
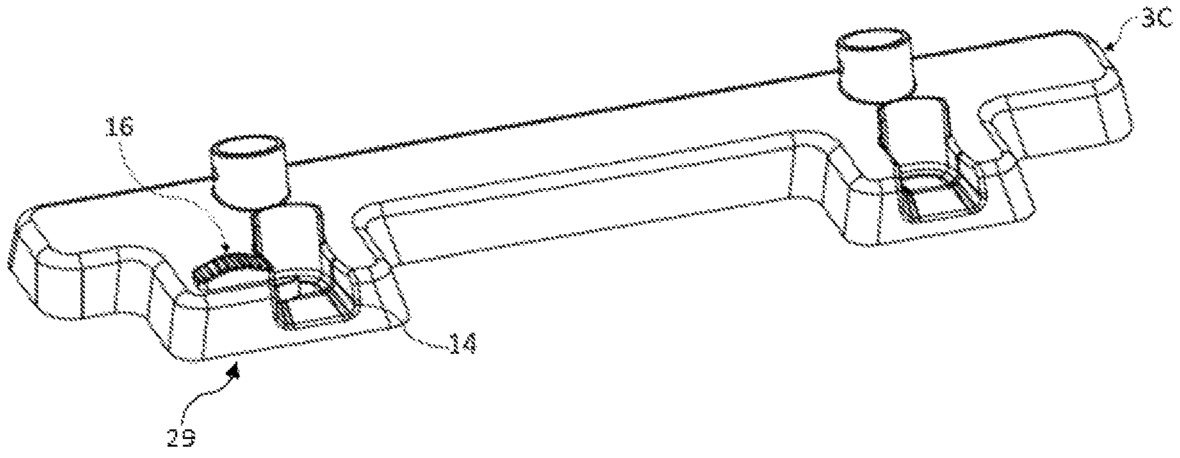
FIG. 5 is a perspective view of another embodiment of the support base of the present disclosure.
Figure 6:
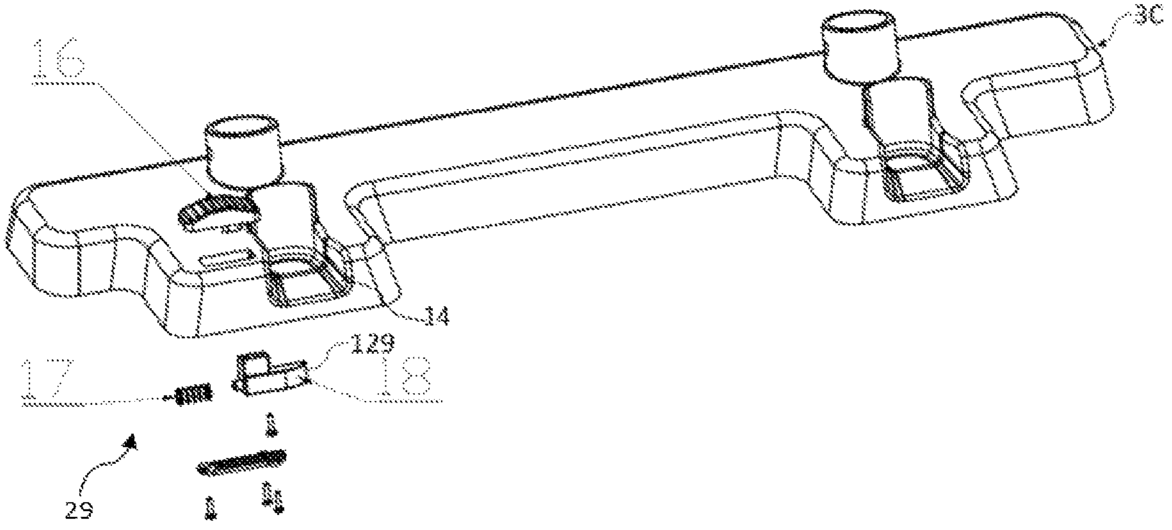
FIG. 6 is a partial exploded view of the support base shown in FIG. 5.

FIG. 5 and FIG. 6 illustrate another embodiment of support bracket 3C, the modified support bracket 3C also including a fixing recess 14 for receiving the movable rail 110A, 110B. A side of the fixing recess 14 is provided with a movable latching mechanism 29. The movable latching mechanism 29 includes a movable elastic block 18 located in a cavity of the support base 3C adjacent to the fixing recess 14. The movable elastic block 18 includes an end portion that is biased by a spring 17. An upper part of the movable elastic block 18 is connected to a switch 16 for moving the movable block 18 between a locked position and a released position. The movable elastic block 18 normally will, and is biased to, protrude from the fixing recess 14 and locks the rail 110A, 110B in the locked position. The switch 16 is accessible to a user such that they can manually actuate sliding of the movable elastic block 18 entirely or substantially entirely into the cavity of the support base 3C so that the rail 110A, 110B of the movable ladder 110 can be released. An outer end of the movable elastic block 18 forms a slope 129 (see FIG. 6) that can wedge the rail 110A, 110B of the movable ladder 110 into the fixing recess 14.

In accordance with one aspect, the safety ladder assembly 20A includes a main support frame 106, 104, wherein on one side of the main support frame 106, 104 is provided a movable support 110 or movable ladder portion 110 adapted to be flipped with respect to the main support frame 106, 104. An upper part of the movable ladder portion 110 is connected to the main support frame 106, 104 by means of an connection mechanism 23A and a dampening member 25. A bottom of the main support frame 106, 104 is provided with a support base 3A that includes a stop structure for preventing the movable ladder portion 110 from releasing from the first or accessible position. The movable ladder portion 110 comprises two support straight pipes or rails 110A, 110B having an upper portion connected with a joint housing 5. The joint housing 5 is provided with a through hole 117 both sides of which are mounted with wear-resistant members 7 and in which is provided with an elastic fitting 6. The main support frame 106, 104 includes at least one U-shaped bracket 8 for connection with a joint housing 5 to allow relative pivotal movement therebetween along a first axis. The main support frame 106, 104 can also or alternatively include at least one U-shaped bracket 8 connected to the joint housing 5 by means of a positioning pin 9, a damper 10, and a locknut 11.

The support base 3 can include a fixing recess 14 for receiving the movable ladder portion 110. In certain embodiments, a protruding stop ridge 13 extends adjacently to the fixing recess 14 such that it can form a press-fit connection with the rail 110A, 110B of the ladder portion 110. A bottom portion of at least one of the rails 110A, 110B may include elastic buckles 12 disposed on both sides thereof. The stop ridge 13 can be shaped to mate with the elastic buckles 12 in press-fit engagement. The support base 3 may further include a movable latching mechanism 29. The movable latching mechanism 29 includes a movable elastic block 18 located inside of a cavity in the support base 3 adjacent to the fixing recess 14. The movable elastic block 18 includes an inner end in contact with a spring 17 such that the movable elastic block 18 extends into the fixing recess 14. An upper part of the movable elastic block 18 is provided with a switch 16. The movable elastic block normally protrudes from the fixing recess 14 via biasing from the spring 17. An outer end of the movable block 18 can form a slope 129.

Prior art security ladders are not provided with a dampening member 25 to resist movement during the flipping process. Thus, there is a potential safety issue due to the high speed and large force of the movable ladder portion 110 during the flipping process. The safety ladder assembly 20A of the present disclosure provides a connection mechanism between the movable ladder portion 110 and the main support frame 106, 104 that is provided with a dampening member 25, and thus during flipping, the speed and force of the flipping can be damped by an element that buckles or grips or otherwise restricts the building of momentum thereby improving the safety of use. The present disclosure also provides support base 3 defining at least one fixing recess for receiving the movable ladder portion 110, and a plurality of stop structures are provided in and/or around the fixing recess 14 to facilitate insertion or removal of the movable ladder portion 110, which is convenient in use and is high in reliability. The support base 3 prevents the movable ladder portion 110 from wobbling during climbing in and out of an above-ground pool.

Referring back to the support base 3A for the safety ladder assembly 20A presented in FIG. 3. The support base 3A is provided at the bottom of the safety ladder. The support base 3A includes a fixing groove or fixing recess 14 into which a movable bracket, or the rail 110A, 110B of the movable ladder portion 110, of the safety ladder is inserted. The outer end of the fixing recess 14 is formed as an open end, such that the rail 110A, 110B of the movable ladder portion 110 can be inserted via pushing into the fixing recess 14 without being lifted. The inner surface defining the fixing recess 14 includes catching ribs 15 outwardly projecting into the recess 14 from at least one but preferably multiple sides thereof. As shown in FIG. 4, elastic buckles 12 are provided at two sides of the bottom of straight tubes or rails 110A, 110B of the movable bracket or ladder 110. The support base 3B includes a stopping part 13 that extends adjacently to the recess 14 and is matched with the elastic buckle 12 for providing a press-fit connection. As shown in FIGS. 5 and 6, the movable latching mechanism 29 can include a movable switch 16 provided at the side of the fixing recess 14. The movable latching mechanism 29 includes a movable block 18 on the support base 3C or within a cavity in the support base 3C adjacent to the fixing recess 14. The inner end of the movable block 18 is biased by a spring 17 into the fixing recess 14, the spring 17 may also be within the cavity in the support base 3C. The upper portion of the movable block is connected to a switch 16, and the movable block 18 projects outwardly relative to the fixing recess 14 in the rail retaining position such that manual axial movement of the switch 16 corresponds to axial movement of the block 18. A slope 129 is formed at the outer end of the movable block 18.

It should be noted that several improvements and variations can be made by those having ordinary skill in the art without departing from the principles of the present disclosure. Such improvements and variations should also be considered to be within the scope of protection of the present disclosure. The support base 3A, 3B, 3C for the safety ladder assembly 20A is primality intended for use with above-ground pools, so the support base 3 is typically provided at the bottom of the safety ladder. The support base 3A, 3B, 3C may include a fixing recess 14 into which a movable bracket of the safety ladder is inserted. The outer end of the fixing recess 14 is formed as an open end and a stopping structure is also included for preventing the movable bracket or movable ladder 110 from detaching during use. The inner portion of the fixing recess 14 can also include catching ribs 15 outwardly projecting from one, two, or more sides thereof. The movable bracket is provided with elastic buckle 12 at one, two, or more sides at the bottom thereof. The support base 3 may further include a surrounding stopping part 13 for matching with the elastic buckle 12 and forming a press-fit connection therewith. The fixing recess 14 is provided with a movable latching mechanism 29 mechanism at the inner side thereof. The inner end of the movable block 18 is provided with a spring and the upper portion of the movable block 18 is provided with a switch 16. The movable block 18 projects outwardly relative to the fixing recess 14 in the normal state or rail retaining position. The movable block 18 can further comprise a slope 129 at the outer end thereof for wedging the rail into the fixing recess 14.

Figure 7:
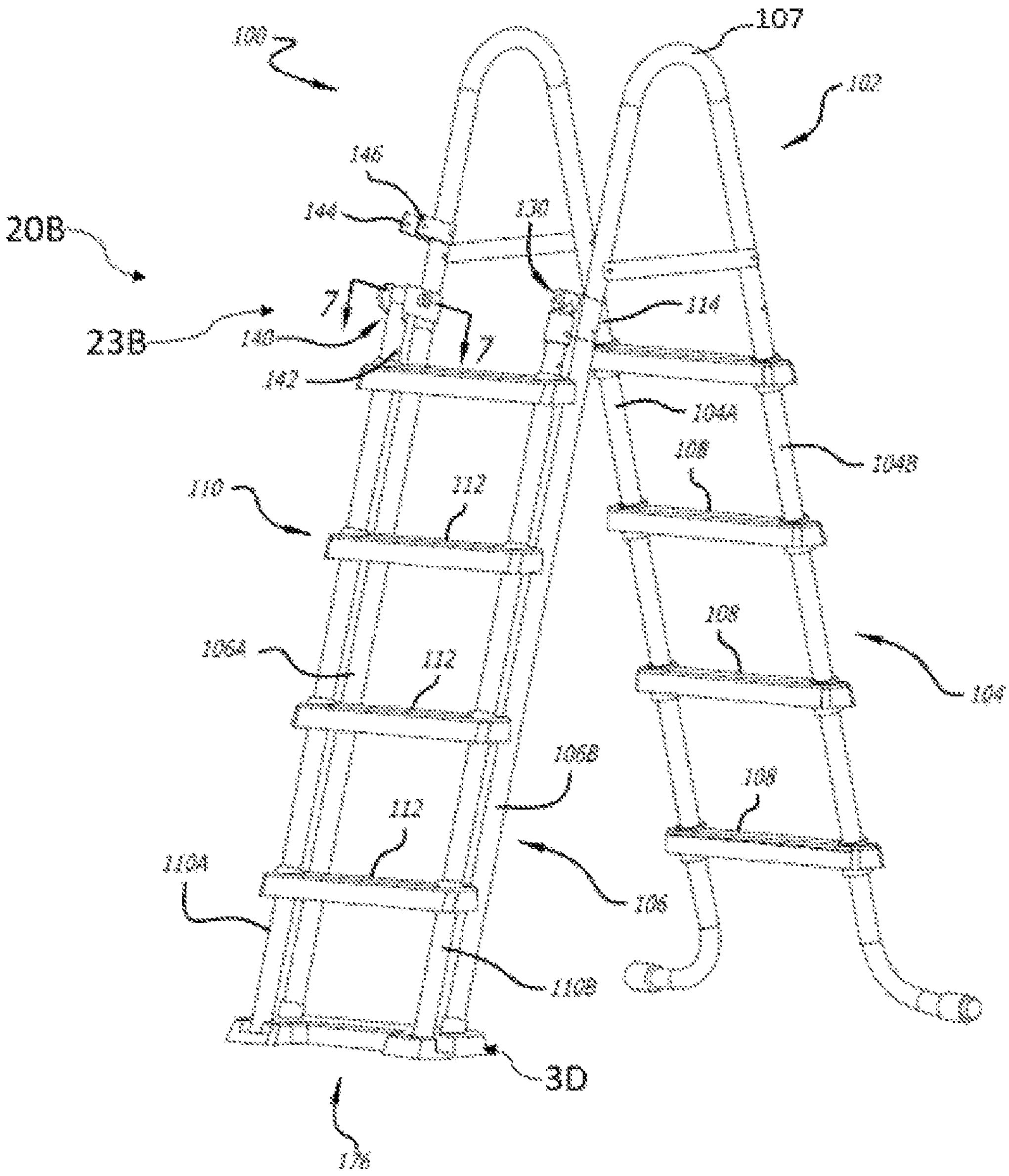
FIG. 7 is a perspective view showing a safety ladder having a rotation component, in accordance with another embodiment of the present disclosure.

FIG. 7 illustrates an additional embodiment of the safety ladder assembly 20B including ladder assembly 100 that may be used with an above-ground pool. The ladder assembly 100 includes a ladder body 102 having a first ladder section 104 and a second ladder section 106 coupled to the first ladder section 104. As depicted, the first ladder section 104 includes a plurality of steps 108 each mounted at predetermined positions lengthwise along the first ladder section and is intended to be placed within the above-ground pool. The plurality of steps 108 provide surfaces upon which users may step on in order to enter and exit the inside of the pool. In accordance with some embodiments, the ladder body 102 may have a shape of a “V,” a “U,” or any other similar shape capable of being positioned over the wall of an above-ground pool such that the first ladder section or portion 104 is placed in the pool and the second ladder section or portion 106 is placed outside the pool. The first ladder section 104 includes a pair of first supporting rods or rails, which includes a first supporting rod 104A and a second supporting rod 104B for placement in the pool. The plurality of steps 108 are attached to and extend between the first and second supporting rods 104A, 104B. The first ladder section 104 is thus configured to anchor a portion of the ladder assembly 100 in the pool while the remaining portion of the ladder assembly 100, i.e., the second ladder section 106 anchors the remaining portion of the ladder assembly 100 outside of the pool to the ground. The second ladder section 106 includes a first supporting rod 106A that is coupled to the first supporting rod 104A of the first ladder section 104. Likewise, the second ladder section 106 includes a second supporting rod 106B coupled to the second supporting rod 104B the first ladder section 104. This connection between rods 104A, 104B, 106A, 106B may be at the apex of the triangular-shape and may further include an intermediary member 107 that includes a bend, sleeves over, and/or otherwise connects corresponding rods 104A, 104B, 106A, 106B. The second ladder section 106 thus is the portion of the ladder assembly 100 that is anchored outside of the pool in order for individuals to climb up to access the pool.

In accordance with certain embodiments of the present disclosure, the ladder assembly 100 further includes a ladder sub-assembly 110 or movable ladder portion 110 connected via connection mechanism 23B. As depicted in FIG. 7, the ladder sub-assembly 110 is coupled to the portion of the ladder assembly mounted outside of the pool or the second ladder section 106. In some embodiments that will be described more fully below, the ladder sub-assembly 110 can be detachably coupled to the first ladder second 104 or the second ladder section 106. The ladder sub-assembly 110 can be detachably coupled to the other ladder section 104, 106 in any number of ways. In particular, the various embodiments of the present disclosure describe a manner of coupling the ladder sub-assembly 110 to the second ladder section 106 through various coupling mechanisms which shall be described in detail below. As previously discussed, the various coupling mechanisms described herein each provide the advantage of having a simplified structure which is easy to use that can be safely operated via a dampening member 25.

According to various embodiments of the present disclosure, the ladder sub-assembly 110 includes a sub-assembly first rod 110A and a sub-assembly second rod 110B. The sub-assembly first and second rods 110A, 110B may be coupled to the respective first and second supporting rods 106A, 106B of the second ladder section 106. The ladder assembly 100 includes an connection mechanism 23B, as shown in FIG. 7. As depicted, in the example connection mechanism 23B, the sub-assembly first rod 110A is detachably coupled to the first supporting rod 106A of the second ladder section and the sub-assembly second rod 110B is pivotally coupled to the second supporting rod 106B of the second ladder section 106. However, it should be appreciated that the ladder assembly 100 of the various embodiments described herein are not limited to the features that will be described in reference to the connection mechanism 23B. By-way of example, an alternative configuration is included in the disclosure wherein the sub-assembly first rod 110A is detachably coupled to the second supporting rod 106B of the second ladder section and the sub-assembly second rod 110B is pivotally coupled to the first supporting rod 106A of the second ladder section 106. Furthermore, the sub-assembly first rod 110A may be pivotally coupled to the first supporting rod 106A, while the sub-assembly second rod 110B is detachably coupled to the second supporting rod 106B. As such, the sub-assembly first and second rods 110A, 110B may be interchangeable, just as the first and second supporting rods 106A, 106B of the second ladder section 106 and the first and second supporting rods 104A, 104B of the first ladder section 104 may be interchangeable.

Figure 15:
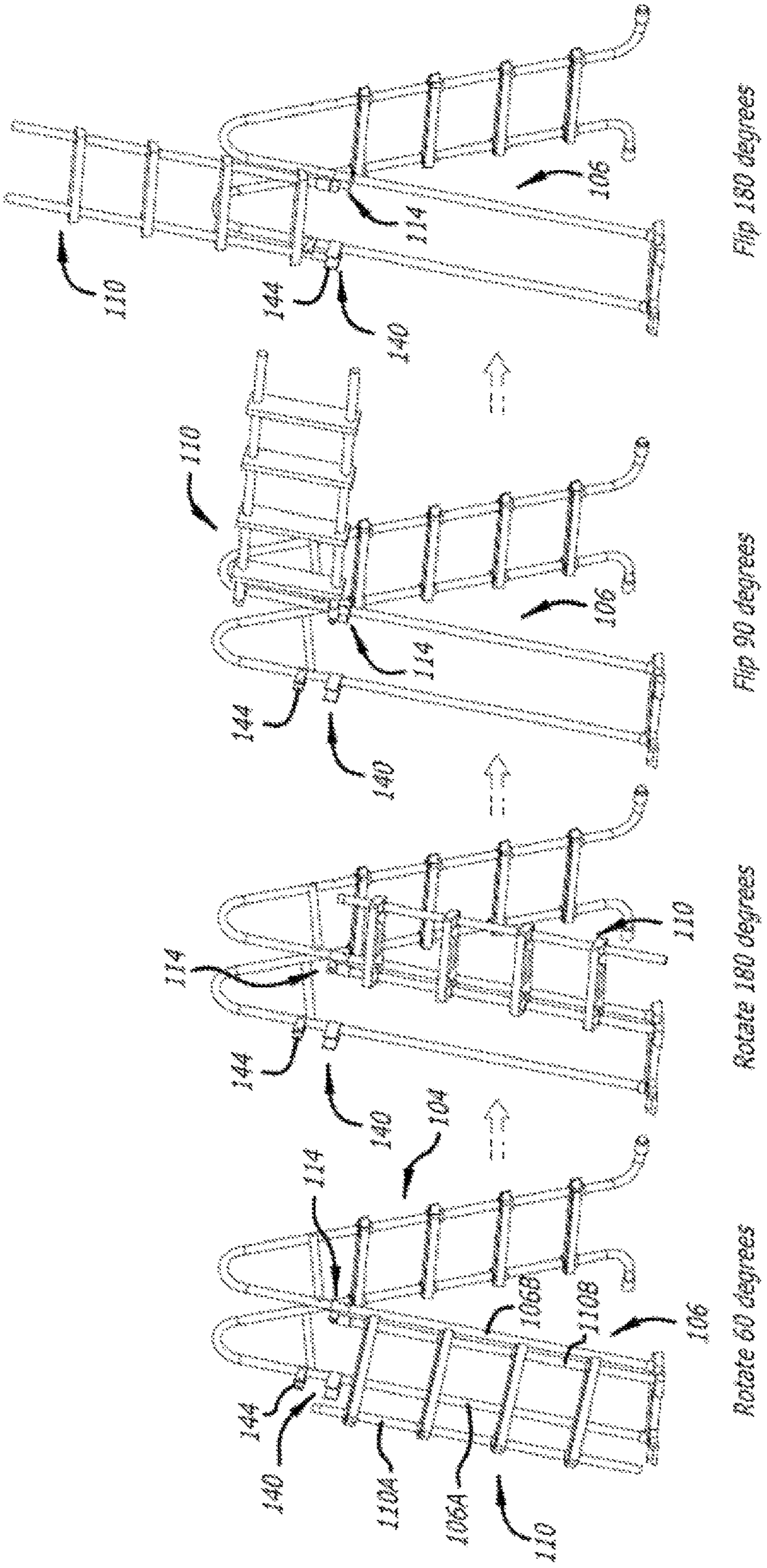
FIG. 15 is a series of perspective views of the safety ladder assembly of FIG. 7 being rotated from a first, operational position (the leftmost view) to a second, non-operational position (the rightmost view), according to exemplary implementations of the present disclosure.

Similar to the first ladder section 104, the ladder sub-assembly 110 includes a plurality of sub-assembly steps 112 coupled to and extending between the sub-assembly first and second rods 110A, 110B. The plurality of sub-assembly steps 112 are located serially along a plurality of corresponding positions along lengths of the sub-assembly first and second rods 110A, 110B. The plurality of steps act as surfaces upon which users may step in order to enter and exit the pool. Still referring to FIG. 7, the ladder sub-assembly 110 is detachably and rotationally coupled to the second ladder section 106 through the various coupling mechanisms. Of note, the second ladder section 106 preferably does not include steps and therefore, alone, cannot be climbed for access to the pool. For example, according to various embodiments of the present disclosure, the connection mechanism 23B of the ladder assembly 100 includes a snap-fit coupler 140 to detachably couple the ladder sub-assembly first rod 110A to the first supporting rod 106A of the second ladder section 106. The connection mechanism 23B may further include a rotation component 114 pivotally coupling the sub-assembly second rod 110B to the second supporting rod 106B of the second ladder section 106B. The rotation component of the various embodiments described herein may have various configurations referred to and illustrated in the figures as rotation elements 114A, 114B, and 114C. The rotation component 114 allows the ladder sub-assembly 110 to be rotated from an operational position (FIG. 7) wherein a base portion 176 of the ladder sub-assembly 110 opposite the connection mechanism 23B is on or adjacent the ground. Any rotary shaft described below may include a dampening member 25. Stated another way, the rotary shaft could be integral with the dampening member 25 and cause friction against a bore. Alternatively, the dampening member 25 may line the bore and cause friction against the shaft similarly as it does to the embodiment shown in FIG. 2A, wherein the shaft is replaced with the pin. Moreover, any dampening member described herein may be incorporated into the following embodiments. Additionally, in the operational position, the base portion 176 is slotted into a modified support base 3D having a pair of fixing recesses 14. Both fixing recesses 14 of the present embodied support base 3D are disposed in a perpendicular relationship, as best illustrated in FIG. 15. This perpendicular configuration is preferred for connection mechanisms that offer more than one axis of rotation. More particularly, the perpendicular configuration requires rotation with respect to a first axis X1 before it can be rotated with respect to a second axis X2.

As best illustrated in FIG. 15, the ladder sub-assembly 110 or movable ladder portion can be moved between any number of intermediate positions where the base portion 176 is released from the support base 3D and lifted off the ground to anon-operational position. In the non-operational position, the ladder sub-assembly 110 is positioned such that it is inaccessible, e.g., to unsupervised children. In the embodiment illustrated in FIG. 15, the ladder sub-assembly 110 rotates or flips approximately 180° along at least two axes between the second or non-operational position (rightmost) and the first or operational position (leftmost). Thus, because the second ladder section 106 has no steps, when the ladder sub-assembly 110 is rotated upwards to the non-operational position, it is not possible for children, or any other vulnerable individual to enter the pool without having an adult move the ladder back to the operational position.

As will be described more fully below and in accordance with some specific embodiments of the present disclosure, the connection mechanism 23 according to certain embodiments includes the rotation component 114 having a rotatable body 120 coupled to the second supporting rod 106B. The rotatable body 120 further includes a first rotating shaft 122 having an axis X1 extending axially therethrough. The rotatable body 120 of the various embodiments described herein may have various configurations referred to and illustrated in the figures as rotatable bodies 120A (FIG. 8), 120B (FIGS. 9A and 9B), and 120C (FIG. 10). The rotatable body 120 may be coupled to the second supporting rod 106B through a connector 124. Similar to the rotation component 114 and the rotatable body 120, the connector 124 of the various embodiments described herein may have various configurations referred to and illustrated in the figures as connectors 124A (FIG. 8), 124B (FIGS. 9A and 9B), and 124C (FIG. 10). For example, in some embodiments, the first rotating shaft 122 may be disposed on either the rotatable body 120 or the sub-assembly second rod 110B. In these embodiments, the remaining one of the rotatable body 120 and the sub-assembly second rod 110B which does not have the first rotating shaft 122 disposed thereon, includes a first shaft bore 126 configured to receive the first rotating shaft 120. In certain embodiments, the first rotating shaft 122 is disposed on the rotatable body 120, and the sub-assembly second rod 110B includes the first shaft bore 126 which is configured to receive the first rotating shaft 122 therein. In other embodiments, the first rotating shaft 122 is disposed on the sub-assembly second rod 110B, and the rotatable body 120 includes the first shaft bore 126 configured to receive the first rotating shaft 120 therein. The aforementioned configurations will be described for fully in the following paragraphs.

Figure 8:
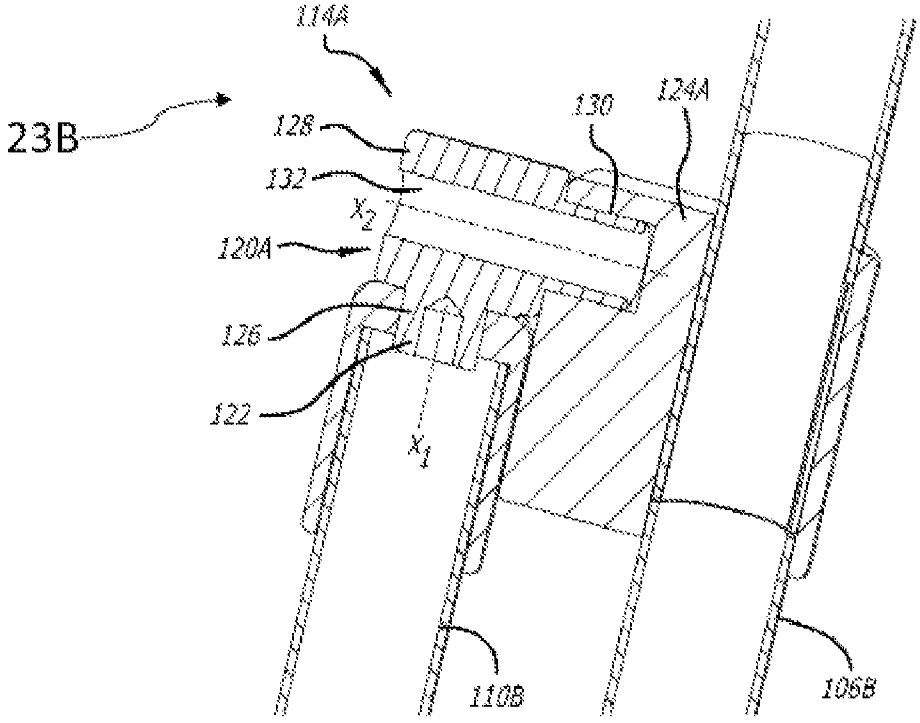
FIG. 8 illustrates an enlarged partial perspective view of the exemplary rotation component of the safety ladder assembly of FIG. 7.

FIG. 8 is an enlarged partial perspective view of one embodiment of the connection mechanism 23B. As illustrated in FIG. 8, the connection mechanism 23B includes a rotation component 114A having a rotatable body 120A, a first rotating shaft 122 having an axis X1 extending axially therethrough, and a connector 124A coupling the rotatable body 120A to the second ladder section 106. As illustrated, the first rotating shaft 122 is disposed on the rotatable body 120A. In this exemplary embodiment, the sub-assembly second rod 110B has the first shaft bore 126 defined therein, and is configured to receive the first rotating shaft 122. The rotatable body 120A is thus connected to the sub-assembly second rod 110B through the first shaft bore 126. Stated another way, the first rotating shaft 122 is disposed in the bore 126 so it rotatably couples the rotatable body 120A to the sub-assembly second rod 110B. In operation, the sub-assembly second rod 110B rotates about the axis X1 thereby allowing the ladder sub-assembly 110 to be rotated counterclockwise, for example, but not limited to, 180° from the original operational position.

Referring back to FIG. 7, the ladder sub-assembly 110 is coupled to the second ladder section 106 through the connection mechanism 23B that includes the snap-fit coupler 140 and the rotation component 114. As further illustrated in FIG. 8, the connector 124A couples the rotatable body 120A to second supporting rod 106B of the second ladder section 106. Because the sub-assembly second rod 110B is rotationally coupled to, or otherwise rotationally mounted to the rotatable body 120, the connector 124A thus couples the sub-assembly second rod 110B to the second supporting rod 106B. As such, when the sub-assembly first rod 110A is detached from the first supporting rod 106A of the second ladder section, the ladder sub-assembly 110 is rotationally coupled to and pivotable about the second supporting rod 106B along the X1 axis.

Referring still to the embodiment illustrated in FIGS. 7 and 8, the rotatable body 120A further may include a second rotating shaft 128 having an axis X2 extending axially therethrough. The connector 124A may include a connector bore 130 extending at least partially therethrough and configured to receive the second rotating shaft 128 therein. As depicted, the second rotating shaft 128 is rotationally mounted within the connector bore 130 to pivotally couple the sub-assembly second rod 110B along the second rotational shaft axis X2. The second shaft axis X2 may be referred to as a point along the first axis X1. The second rotating shaft 128 may be disposed on a side of the rotatable body 120A different than that on which the first rotating shaft 122 disposed. In the illustrative embodiments, the second rotating shaft 128 is positioned such that it is oriented at an angle with respect to the second rotating shaft 122 such that the first rotational shaft axis X1 is transverse to the second rotational shaft axis X2. In some embodiments, the angle between axes X1 and X2 may be about 90°, however the various embodiments described herein are not limited to this configuration, and the angle may be varied to fit the specific design purposes. In order for the angle at which the first rotating shaft 122 and the second rotating shaft 128 to be positioned with respect to each other is approximately 90°, the first rotational shaft and second rotational shaft axes X1, X2 are also formed perpendicularly with respect to each other. As further illustrated, the first rotating shaft 122 may be coupled to the second rotating shaft 128 by an intermediary body, and may further be integrally formed. As shall be described in further detail below with respect to operation of the ladder sub-assembly 110 of the various embodiments described herein, when the sub-assembly first rod 110A is detached from the first supporting rod 106A of the second ladder section 106, and the ladder sub-assembly 110 is rotated about the first rotating shaft axis XI, the ladder sub-assembly 110 may then be rotatable about the second rotational shaft axis X2 to a position above the ground, where it is inaccessible for use (non-operational). As such, these embodiments have two intersecting axes X1, X2 of rotation that are approximately perpendicular.

Figure 9A:
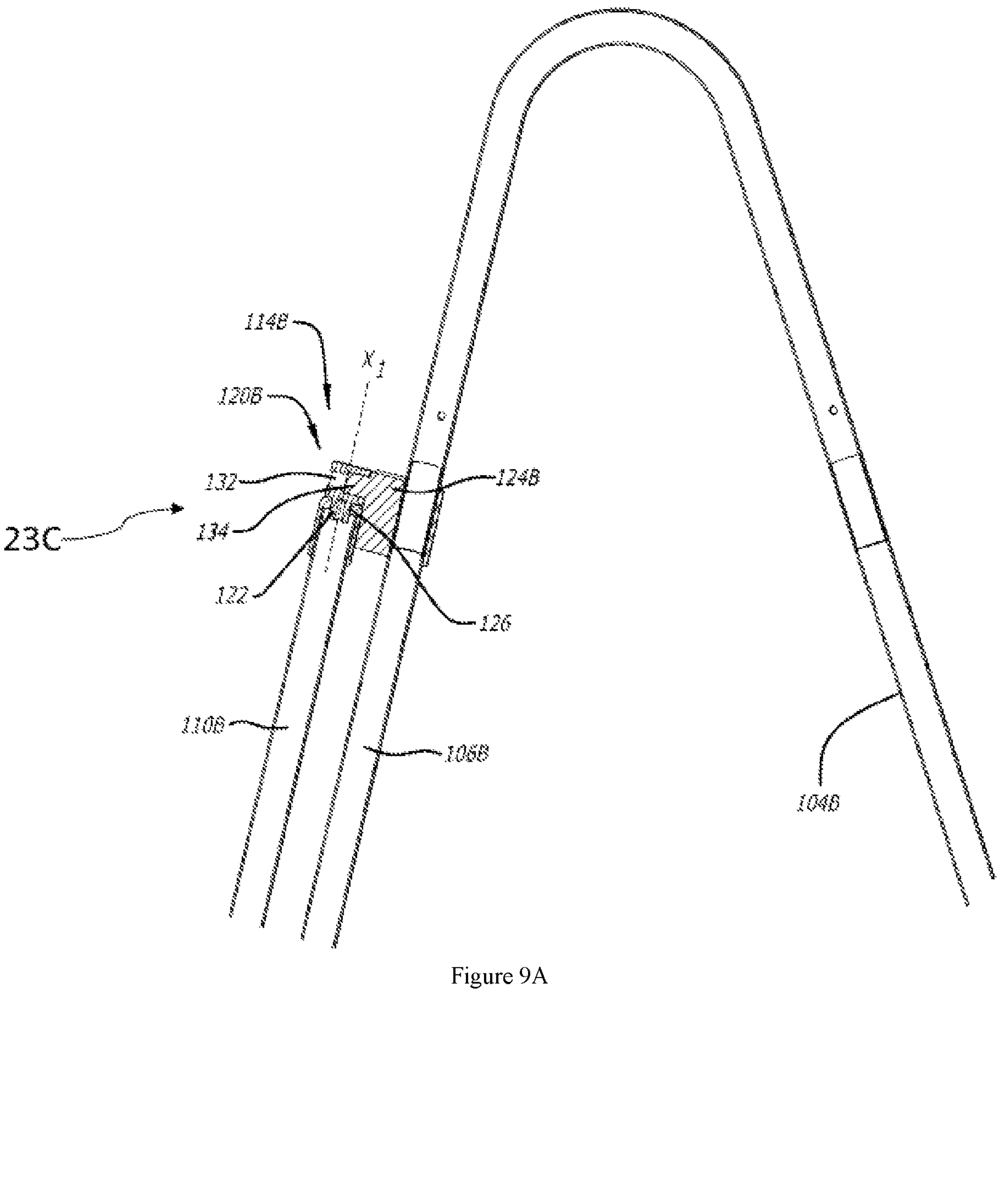
FIG. 9A is a side perspective view of the exemplary rotation component of the safety ladder assembly of FIG. 7.
Figure 10:
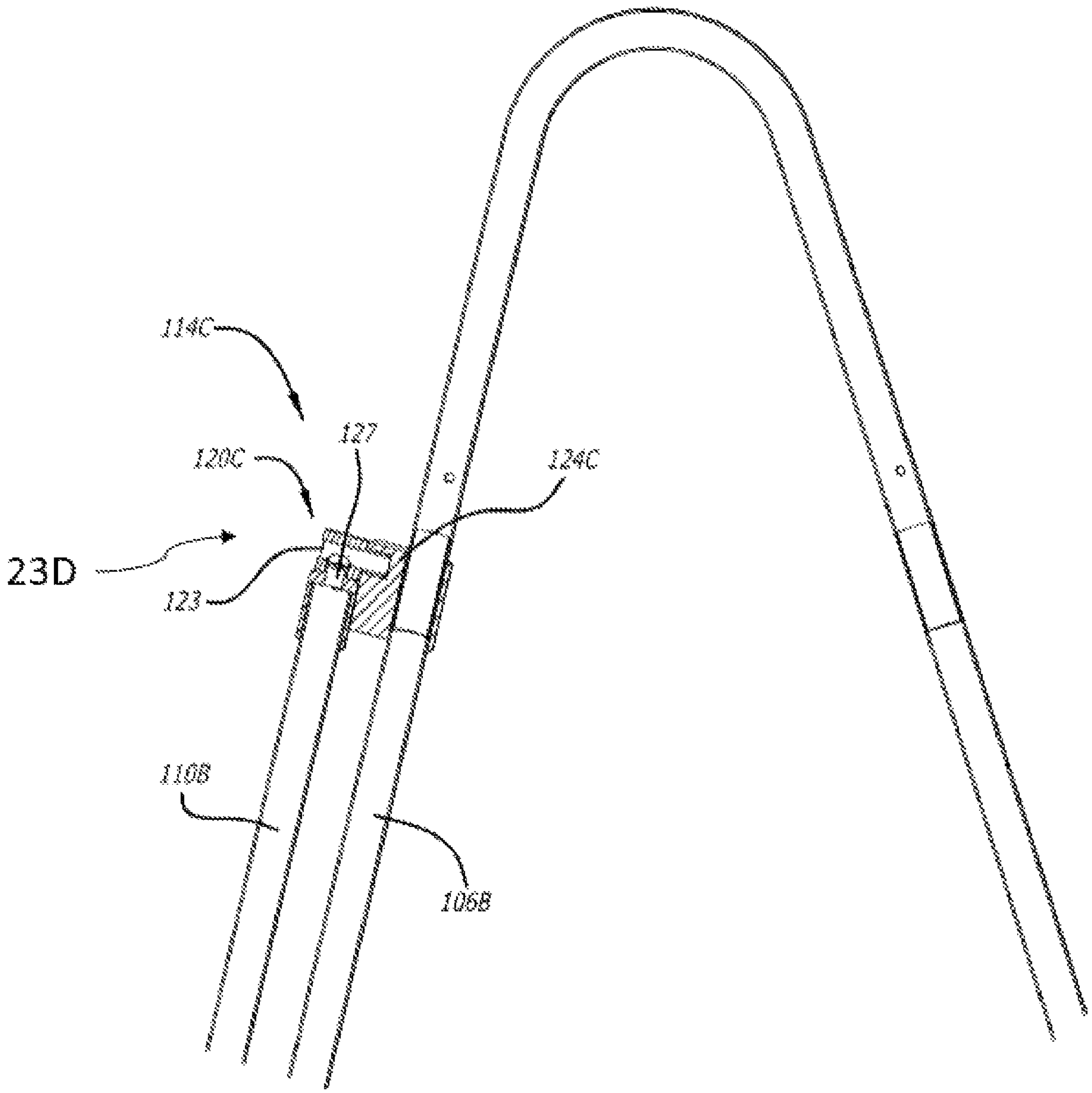
FIG. 10 is a side perspective view of another exemplary rotation component of the safety ladder assembly of FIG. 7.

FIG. 9A is a side perspective view of an additional exemplary connection mechanism 23C that includes a rotation component 114B. As illustrated, the first rotating shaft 122 is disposed on the rotatable body 120B, and has an axis X1 extending axially therethrough. In this embodiment, sub-assembly second rod 110B defines the first shaft bore 126 and is configured to receive the first rotating shaft 122. The rotatable body 120B is thus connected to the sub-assembly second rod 110B through the first shaft bore 126. In operation, the sub-assembly second rod 110B rotates about the axis X1 thereby allowing the ladder sub-assembly 110 to be rotated counterclockwise, for example, up to 180° from the original operational position.

As further illustrated in FIG. 9A, the rotation component 114B further includes a connector 124B which couples the rotatable body 120B to second supporting rod 106B of the second ladder section. Because the sub-assembly second rod 110B is rotationally coupled to or rotationally mounted to the rotatable body 120B, the connector 124B thus connects the sub-assembly second rod 110B to the second supporting rod 106B. As such, when the sub-assembly first rod 110A is detached from the first supporting rod 106A of the second ladder section, the ladder sub-assembly 110 is rotationally coupled to, and pivotable about, the second supporting rod 106B around at least one axis and more preferably two axes.

Figure 9B:
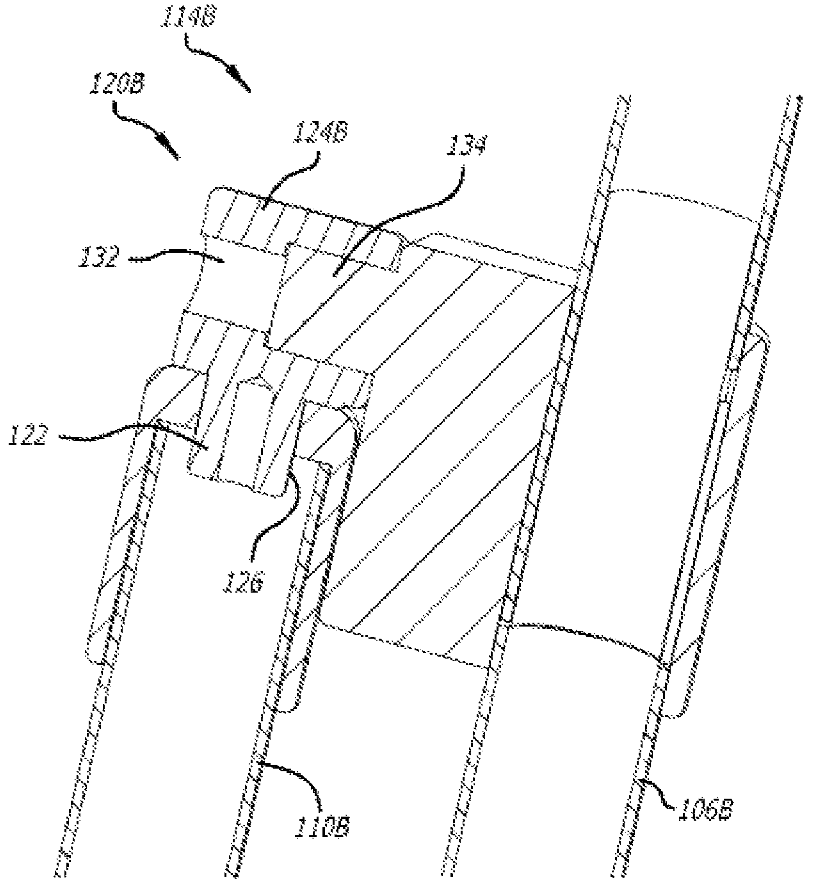
FIG. 9B is a partial perspective view of the exemplary rotation component of FIG. 9A.

FIG. 9B is an exploded partial perspective view of the exemplary rotation component 114B of FIG. 9A. As illustrated in FIG. 9B, the rotatable body 120B has a connector bore 132 extending at least partially therethrough. The connector 124B includes a rotating shaft 134 having an axis X2 extending axially therethrough. The rotating shaft 134 extends from an outer surface of the connector 124B, and is configured to be mounted within the connector bore 132. The rotatable body 120B is thus rotationally coupled to the connector 124B through the rotating shaft 134. Similar to the embodiments described with respect to FIG. 8, the connector 124B is rotationally coupled to the sub-assembly second rod 110 and the second supporting rod 106B via the rotatable body 120B. Further, when the sub-assembly first rod 110A is detached from the first supporting rod 106A of the second ladder section 106, and the ladder sub-assembly 110 has been rotated about the first rotating shaft axis X1, the ladder sub-assembly 110 is then rotatable about the connector rotating shaft axis X2 to a position above the ground, where it is inaccessible for use.

FIG. 10 is a side perspective view of an yet another exemplary connection mechanism 23D including rotation component 114C. The rotational component 114C has similar functionality to the rotational components 114A and 114B with the differences in rotational components 114A, 114B, and 114C being primarily in arrangement. In the embodiments illustrated in FIG. 10, the first rotating shaft 123 is disposed on the sub-assembly second rod 110B. As depicted, the first rotating shaft 123 extends from an upper portion of the sub-assembly second rod 110B along a longitudinal axis thereof. In other words, the first rotating shaft 123 protrudes from an upper surface of the sub-assembly second rod 110B. The first rotating shaft 123 may either be coupled to the upper surface of the second sub-assembly rod 110B or may be otherwise integrally formed with the second sub-assembly rod 110B. In these embodiments, the rotatable body 120C has a first shaft bore 127 defined therein and is configured to receive the first rotating shaft 123. The rotatable body 120C is thus connected to the sub-assembly second rod 110B through the first shaft 123. In operation, the sub-assembly second rod 110B rotates about the first axis X1 thereby allowing the ladder sub-assembly 110 to be rotated up to approximately 180° from the operational position.

As shown in FIG. 10, the rotatable body 120C is rotationally coupled to the connector 124B through the rotating shaft 134. Similar to the embodiments described with respect to FIG. 8, the connector 124C thus rotationally couples the sub-assembly second rod 110B to the second supporting rod 106B through the rotatable body 120C. Further, similar to the embodiments of FIG. 8, when the sub-assembly first rod 110A is detached from the first supporting rod 106A of the second ladder section 106, and the ladder sub-assembly 110 has been rotated about the first rotating shaft axis X1, the ladder sub-assembly 110 is then able to rotate about the connector rotating shaft axis X2 to a position above the ground, where it is inaccessible for use.

While the dampening member 25 can be used along the X1 or X2 axes of rotational components 114A, 114B, 114C, it is preferably incorporated into at least shaft 123, 128, 134 or corresponding bores to regulate the movement along the X1 axis. The dampening member 25 can include the damper 10 of FIG. 2A wherein the pin 9 is replaced with the one of the aforementioned shafts. In such arrangements, the damper 10 can define and interior surface the aforementioned counter-bores in order to create a gripping surface with increased friction. Likewise, the rotational shaft and counter bores previously described can include wear-resistant members 7 and an elastic fitting 6 as shown in FIG. 1. In such embodiments, the elastic fitting 6 replaces part of the shaft thickness integrally or is otherwise sleeved over the embodied shafts and/or at least one wear resistant member is disposed within the embodied counter bores. Similarly, the friction disc 27 with projection 41 can be incorporated onto an end of the shaft and can interlock with depressions 43 within the counter bore.

Figure 11:
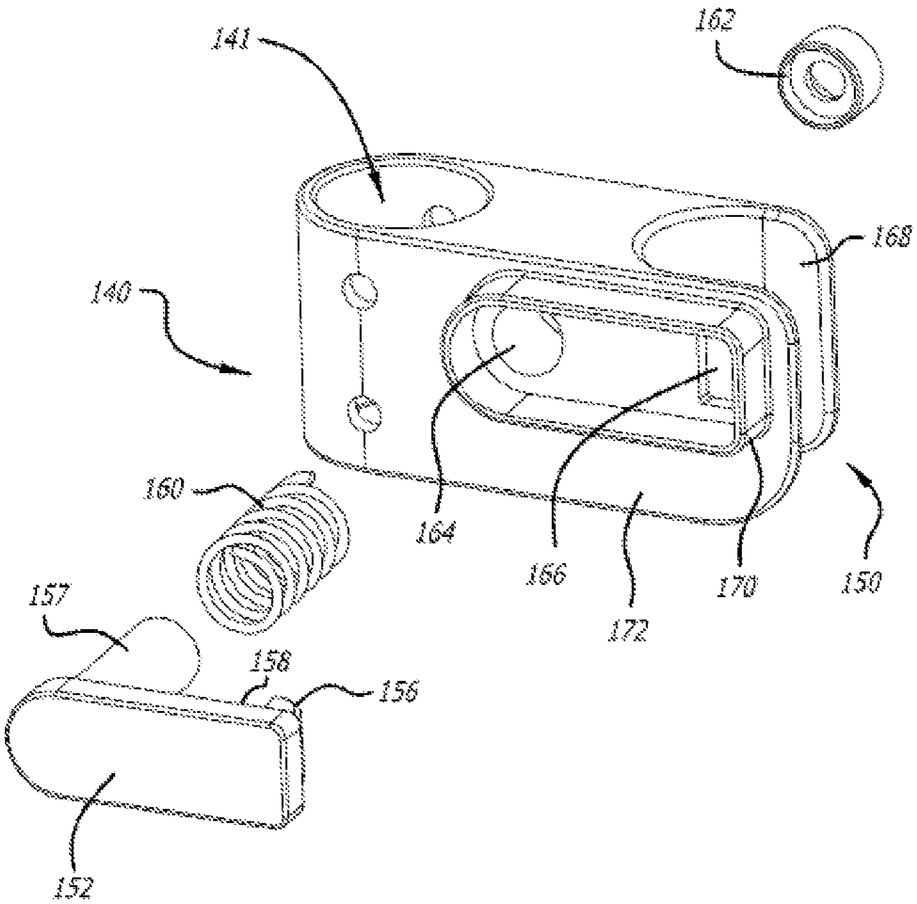
FIG. 11 is an exploded front perspective view of a snap-fit coupler of the safety ladder assembly, according to exemplary implementations of the present disclosure.
Figure 12:
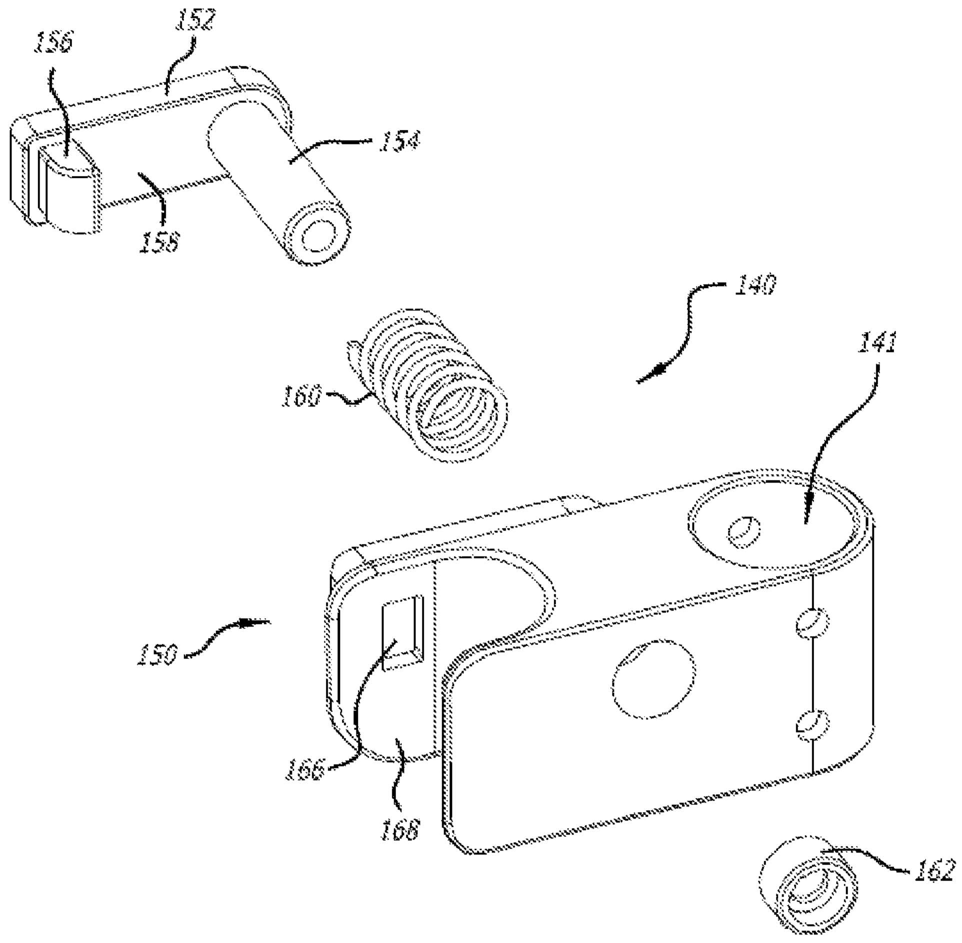
FIG. 12 is an exploded back perspective view of the exemplary snap-fit coupler of FIG. 11.

FIGS. 11 and 12 are exploded front perspective views of one embodiment of snap-fit coupler 140 of the safety ladder assembly 100. The snap-fit coupler 140 functions to lock the ladder sub-assembly 110 into position. As illustrated, the snap-fit coupler 140 is disposed along a length of the first supporting rod 106A of the second ladder section 106, at a position corresponding to an upper portion of the sub-assembly first rod 110A. In particular, the snap-fit coupler 140 is configured with a sleeve hole 141 through which the first supporting rod or rail 106A extends. The snap-fit coupler 140 may thus be secured to the first supporting rod 106A through any appropriate fastening means, for example at least one bolt, screw or other appropriate fastener extending through the body of the snap-fit coupler 140 and/or more particularly into the sleeve hole 141 and preferably also through a cross-section of the first supporting rod 106A. As described briefly above, with respect to FIG. 7, the snap-fit coupler 140 detachably couples the sub-assembly first rod 110A to the first supporting rod 106A of the second ladder section 106. In other words, the exemplary snap-fit coupler 140 operates to lock the sub-assembly first rod 110A to the second ladder section 106 in the first or operational position to prevent rotation in the X1 axis, the X2 axis, or the X1 and X2 axes. When it is desired to move the ladder sub-assembly 110 from the operational position to the non-operational position, the snap-fit coupler 140 may then be operated to detach the ladder sub-assembly 110 from the second ladder section 106. More specifically, the sub-assembly first rod 110A may be detached from the first supporting rod 106A of the second ladder section 106 via release of the snap-fit coupler 140.

In accordance with various embodiments of the present disclosure, as illustrated in FIG. 11, the snap-fit coupler includes a body 150 and a movable member 152 disposed in the snap-fit coupler body 150. The body 150 includes a first groove 164, a second groove 166, and a slot 168 recessed therein. The slot 168 is sized to receive at least part of the sub-assembly first rod 110A, preferably at least half of the circumference, and more preferably more than half of the rod 110A. The body 150 is configured to receive the movable member 152 therein so as to selectively engage the ladder sub-assembly 110 with the second ladder section 106 via the slot 168. To this effect, the movable member 152 includes a coupling shaft 154 configured to be received in the first groove 164, and a bump 156 protruding from an inner surface 158 of the movable member 152. The bump 156 is configured to be received in the second groove 166 and at least partially in the slot 168 to fix the sub-assembly first rod 110A therein. The movable member 152 may further include a spring 160 concentrically disposed about the coupling shaft 154, and a button 162 operably coupled to the movable member 152. In operation, pressing the button overcomes the bias of the spring 160 and moves the bump 156 substantially out of the slot 168 such that it no longer encumbers removal of rod 110A.

According to various embodiments of the present disclosure, in an engaged configuration, the coupling shaft 154 is disposed in the first groove 164 and the bump 156 is disposed in at least the slot 168 but also preferably the second groove 166 also. An "engaged configuration" as described herein refers to a configuration in which the ladder sub-assembly 110 is engaged with or locked to the second ladder section 106 via the bump 156. In particular, the engaged configuration refers to a configuration where the ladder sub-assembly first rod 110A is locked into engagement with the first supporting rod 106A of the second ladder section 106 through the snap-fit coupler 140. In the certain embodiments, the snap-fit coupler body 162 further includes a housing portion 170 protruding from an outer surface 172 of the body. In the engaged configuration, the movable member 152 is positioned in the housing portion 170. Additionally, in the engaged configuration, the coupling shaft 154 with the spring 160 concentrically disposed thereon is disposed substantially within the first groove 164. The bump 156, being connected to or integral with the shaft 154 is thus biased towards the second groove 166 and slot 168. Thus, in the engaged configuration, when the bump 156 is disposed in the second groove 166 and the slot 168, the button can be actuated to displace the bump 156 out of the slot 168 to a disengaged configuration via reactionary movement of the shaft 157, movable member 152, and/or bump 156. As previously explained, the interface between the bump 156 and the ladder sub-assembly first rod 110A prevents movement of the ladder sub-assembly 110 with respect to the above-ground pool or other portions including ladder body 102. More particularly, the interface prevents relative rotation of the ladder sub-assembly in the X1 axis, the X2 axis, or the X1 and X2 axes.

A "disengaged configuration" as described herein, refers to a configuration in which the ladder sub-assembly 110 is disengaged or unlocked from the second ladder section 106 via retraction of the bump 156. In particular, the disengaged configuration refers to a configuration where the sub-assembly first rod 110A is detached or unlocked from engagement with the first supporting rod 106A of the second ladder section 106 and is allowed to rotate around the X1 axis, the X2 axis, or the X1 and X2 axes. In this configuration, the snap-fit coupler 140 is operated to disengage or unlock the ladder first assembly rod 110A from the first of supporting rod 106A of the second ladder section 106. In one preferred embodiment, the disengaged configuration includes allowing the sub-assembly first rod 110A to be decoupled from the first supporting rod 106A of the second ladder section 106 and rotated 180° to a position where a base portion 176 of the ladder sub-assembly 110 is oriented facing upwards. Once the ladder sub-assembly 110 has flipped 180°, the ladder sub-assembly first rod 110A can be placed back into the slot 168 and the bump 156 can be interfaced to hold the ladder sub-assembly in an inaccessible position as shown in FIG. 15.

Figure 13:
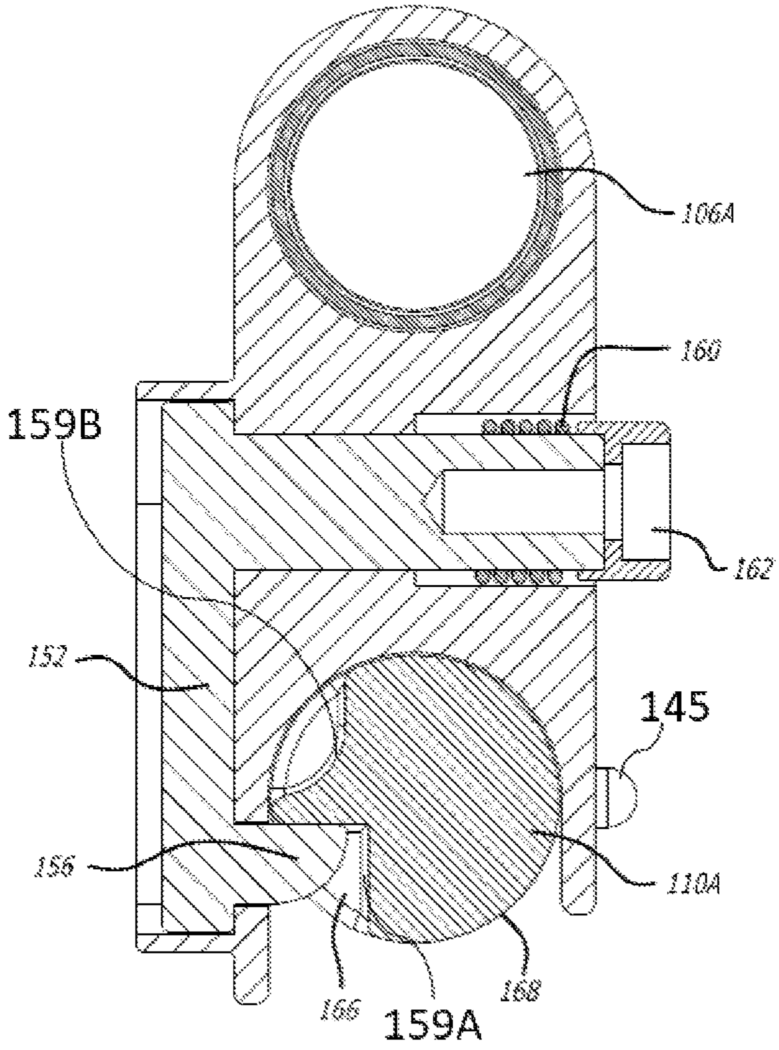
FIG. 13 is a cross-sectional view of the safety ladder assembly of FIG. 7, taken along line 7-7, showing the snap-fit coupler of FIGS. 11 and 12.

In operation, when it is desired to detach the sub-assembly first rod 110A from the first supporting rod 106A, a user can press against button 162. As best shown in FIGS. 11 through 13, when a user presses against the button 162, or exerts some axial force on the button 162 that overcomes the bias of the spring, the button 162 retracts towards and into the housing portion 170. This causes the spring 160, which is operably coupled to the button 162 and the coupling shaft 154, to be compressed. The compressive force applied to the spring 160 is transferred to the coupling shaft 154 thereby causing the movable member to be displaced out of the housing portion 170. Displacement of the movable member causes a corresponding displacement of the attached bump 156 until it is at least partially out of the slot 168 and/or at least partially out of the second groove 166. When the bump 156 is displaced, this causes the sub-assembly first rod 110A to be freed such that it may be manually released from the snap-fit coupler 140. The sub-assembly first rod 110A is thus detached from the first supporting rod 106A to which the snap-fit coupler 140 is attached. Once the sub-assembly first rod 110A is detached from the first supporting rod 106A, the ladder sub-assembly 110 is free to be rotated counterclockwise about the sub-assembly second rod 110B, and then counterclockwise again about the rotatable body 120 of the rotation component 114, in order to position the ladder sub-assembly 110 at the non-operational position.

FIG. 13 illustrates a cross-section of one embodiment of the snap-fit coupler wherein the first rod 110A is modified such that has a series of rail grooves 159A and 159B. More specifically, the first rod 110A includes a first rail groove 159A for seating and retaining the bump 156 in the engaged position wherein the ladder sub-assembly 110 can be climbed and the above-ground pool can be accessed. The first rod 110A further includes a second rail groove 159B for seating and retaining the bump 156 when the ladder sub-assembly 110 has been flipped 180° and the first rod 110A has been reinserted into slot 168 such that the ladder sub-assembly 110 is inaccessible and the above-ground pool cannot be accessed. These rail groove 159A, 159B seat the bump 156 and lock the first rod 110A within slot 166.

Figure 14:
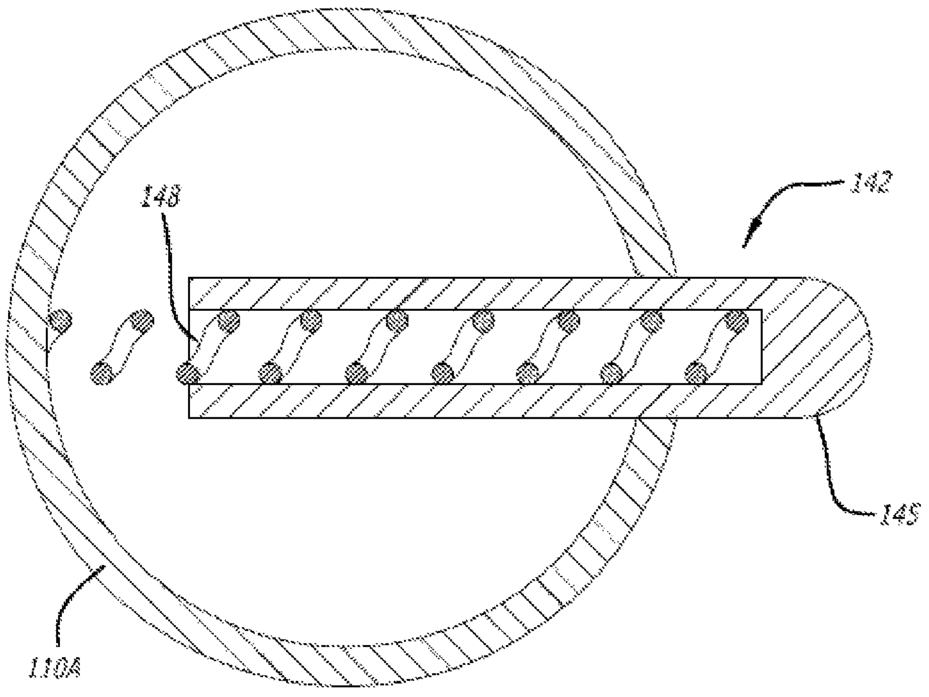
FIG. 14 is an upper view of a spring snap fastener of the safety ladder assembly, according to exemplary implementations of the present disclosure.

FIG. 14 is an upper view of one embodiment of a safety ladder assembly that includes a spring snap fastener 142 that is intended to lock the ladder sub-assembly 110 in a non-operational position. The spring snap fastener 142 is located on an upper portion of rail 110A as shown in FIG. 7. The ladder assembly 100 may further include a coupling member 144 disposed on the first supporting rod 106A, and including a slot 146 also shown FIG. 7. The coupling member 144 may be disposed at a position above the snap-fit coupler 140 which may be equal in distance to a distance at which the spring snap fastener 142 is positioned below the snap-fit coupler 140. In use, once the ladder sub-assembly or movable ladder portion 110 is rotated clockwise via an axis X1 extending through the sub-assembly second rod 110B, and then clockwise again about axis X2, the rotatable body 120 is located in the non-operational position, wherein the ladder sub-assembly is oriented upwards. In the non-operational position, the sub-assembly first rod 110A may be positioned in the slot 146 and locked in engagement therein using the spring snap fastener 142. More particularly, the spring snap fastener 142 includes a protrusion 145 and a spring 148 operably coupled to the protrusion 145 biasing it outwardly through an aperture in the rail 110A. The coupling member 144 on rail 106A may include at least one corresponding recess 143 into which the protrusion 145 of the spring snap fastener 142 may be engaged to lock the ladder sub-assembly 110 in the non-operational position. Thus, when the ladder sub-assembly 110 is rotated, for example, 180° degrees about the first rotational shaft axis X1, and 180° degrees about the second rotational shaft axis X2 to the non-operational position, the snap fastener 142 is configured to engage the sub-assembly first rod 110A within the slot 146 to maintain the orientation of the ladder sub-assembly at the non-operational position, out of reach of children. In some embodiments, when it is desired to disengage the sub-assembly first rod 110A from the coupling member 144, a force can be exerted on the protrusion 145 so as to compress the spring 148 and depress the protrusion 145 inwards towards an inner section or inner cavity of the sub-assembly first rod 110A, thereby releasing the sub-assembly first rod 110A from engagement with the recess 143 such that the movable ladder portion 110 can be moved back to the operational positon. It should be appreciated that the first rod 110A may extend beyond that of the second rod 110B and have at least one or two spring snap fasteners 142 in lieu of the snap-fit coupler 140. In such configurations, the protrusion 145 aligns with recess 143 in both operational and non-operational conditions. Alternatively, as described above, the snap-fit coupler 140 can be configured to hold the first rod 110A in both the operational position and the non-operational position that has been flipped 180° via first and second rail grooves 159A, 159B. It should also be appreciated that the present disclosure could utilize any variation of the above described couplers. Moreover, it should be appreciated that the rotation component 114 and the various couplers could also be on the same rod 110A or 110B and lock at an angle other than 180°.

FIG. 15 is a series of perspective views of a safety ladder assembly being rotated from the first or operational position to the second or non-operational position according to exemplary implementations of the present disclosure. In operation, the ladder sub-assembly 110 may be moved from the operational position to the non-operational position using the coupling mechanisms of the various embodiments described herein, i.e., the snap fit coupler, the rotation component, and the snap fastening mechanism.

The snap-fit coupler 140 is shown in FIG. 15 and is operated to disengage or unlock the ladder first assembly rod 110A from the first of supporting rod 106A of the second ladder section 106 as described above. In the disengaged configuration, wherein the sub-assembly first rod 110A is decoupled from the first supporting rod 106A of the second ladder section 106, the ladder sub-assembly 110 can then be rotated, for example, but not limited to, 60° degrees and then again, for example, but not limited to up to 180° degrees counterclockwise as illustrated in FIG. 15.

In order to place the ladder sub-assembly 110 in the non-operational position with a lower portion of movable ladder 110 facing upwards. While not limited thereto, the ladder sub-assembly 110 may be rotated or flipped for example, 90° and then again for example, up to 180° counterclockwise about the rotatable body 120 of the rotation component 114. Once rotated, the ladder sub-assembly 110 or movable ladder portion is locked into position at the non-operational position using the coupling member 144 and the spring snap fastener 142 as described above. Although the embodiments are detailed with respect to specific rotation directions, the disclosure is not limited thereto. The directions of rotation may be interchangeable, i.e., clockwise maybe substituted for counterclockwise, and vice-versa, all variations are within the scope of the present disclosure. Similarly, the rotational connection may be via first rails 106A, 110A or second rails 106B, 110B.

Figure 16:
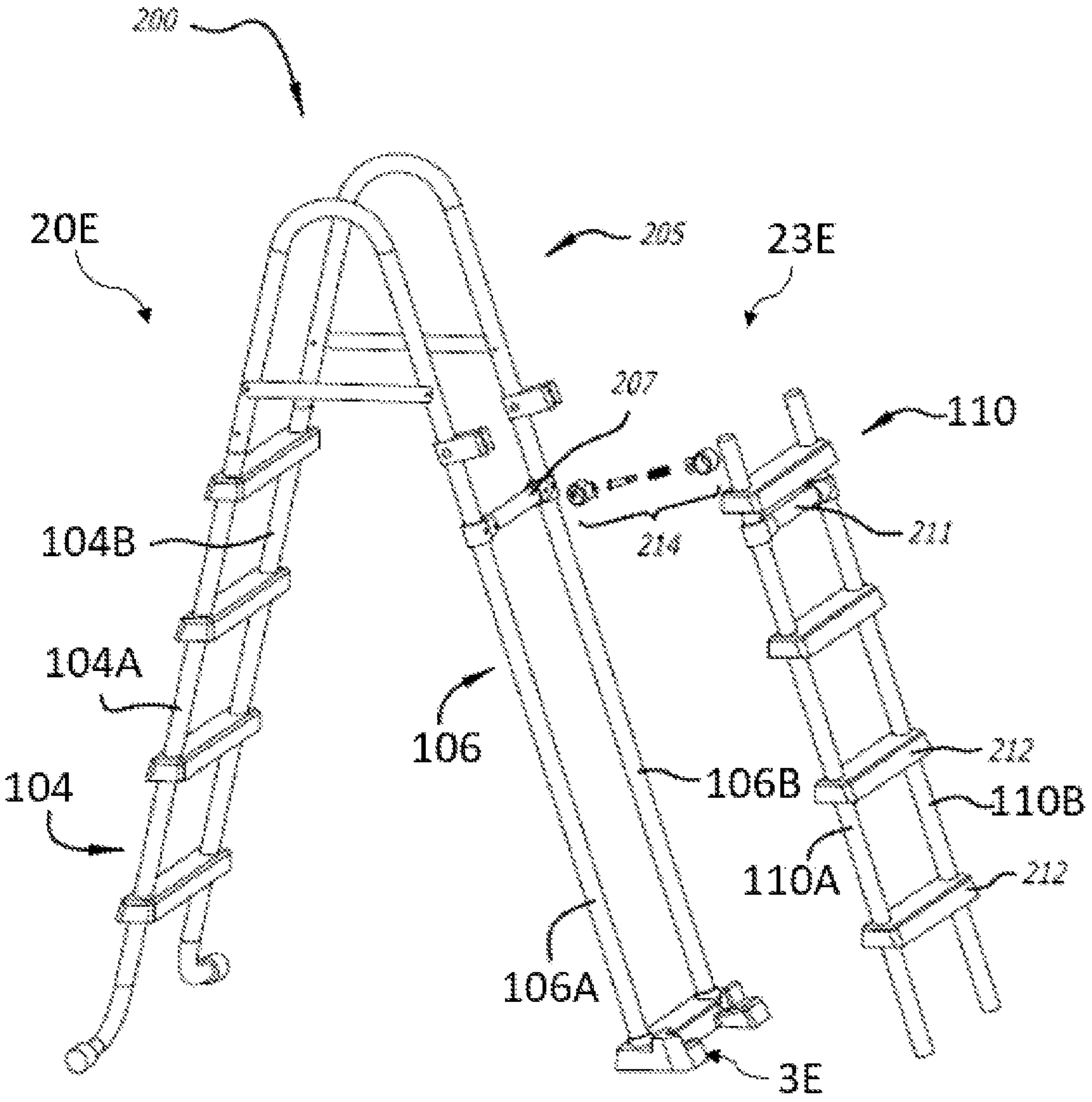
FIG. 16 is a perspective view of a safety ladder assembly, according to another embodiment of the present disclosure.

FIG. 16 is a perspective view of yet another embodiment of a safety ladder assembly 20E including ladder assembly 200 according to exemplary implementations of the present disclosure. Similar to the embodiments illustrated in FIG. 7, the embodiment of FIG. 16 may include a ladder body 205 having a first ladder section 104 and a second ladder section 106 coupled to the first ladder section 104. In accordance with some embodiments, the ladder body 205 may have a shape of a "V," a "U," or any other similar shape capable of being placed over the wall of an above-ground pool. The first ladder section 104 includes a pair of supporting rods or rails, including a first supporting rod 104A and a second supporting rod 104B. In operation, the first ladder section 104 is placed inside of the above-ground swimming pool and the second ladder section 106 is placed outside of the above-ground swimming pool such that the apex of the "V" or "U" shape is directly over the wall of the above-ground pool. Additionally, the first ladder section 104 includes a plurality of steps 208 each mounted at predetermined positions lengthwise along the first ladder section 104 such that they can be climbed to exit the pool. The first ladder section 104 is thus meant to anchor and/or sit a portion of the ladder assembly 200 in the pool for users to have access once they are in the pool. The second ladder section 106 is configured to anchor and/or sit the remaining portion of the ladder assembly 200 outside of the pool to provide access from the outside of the pool. To this effect, the second ladder section 106 is coupled to the first ladder section 104, and includes a first supporting rod 106A, coupled to the first supporting rod 104A of the first ladder section 104. Similarly, the second ladder section 106 includes a second supporting rod 106B coupled to the second supporting rod 104A the first ladder action 104. The second ladder section 106 thus is the portion of the ladder assembly 200 that is anchored outside of the swimming pool in order for individuals to climb up to access the pool. As depicted, the second ladder section 106 further includes a first connecting rod 207 disposed at a predetermined position along the second ladder section 106 between rails 106A, 106B. The predetermined position may vary based on design considerations and preferences. In the depicted embodiment, the predetermined position is an upper portion of the second ladder section 106 closer to the apex than the ground.

Still referring to FIG. 16, In accordance with some embodiments of the present disclosure, the ladder assembly 100 further includes a ladder sub-assembly 110, i.e., movable ladder portion 110 movable via a connection mechanism 23E. As depicted, the ladder sub-assembly 110 is coupled to the portion of the ladder assembly 200 which is mounted outside of the pool. That is, as illustrated, the ladder sub-assembly 110 is rotationally coupled to the second ladder section 106 via the connection mechanism 23E. The ladder sub-assembly 110 may be rotationally coupled to the second ladder section 106 in any number of ways. In particular, the various embodiments of the present disclosure describe a manner of rotationally coupling the ladder sub-assembly 110 to the second ladder section 106 through a rotatable body, as shall be described in detail below. The rotatable body as described herein, provides the advantage of having a simplified structure which is easy to use, and have a less complicated assembly process, thereby decreasing production costs of the overall ladder assembly.

As depicted in FIG. 16, the ladder sub-assembly 110 includes a sub-assembly first rod 110A, a sub-assembly second rod 110B, and a plurality of sub-assembly steps 212 coupling the sub-assembly first and second rods 110A, 110B to each other at a plurality of corresponding positions. The plurality of sub-assembly steps 212 serve the purpose of providing surfaces on which users may step on and climb to gain enter or exit the pool. In accordance with some embodiments, the connection mechanism 23E of the present ladder sub-assembly 110 further includes a connecting rod 211 mounted between the ladder sub-assembly first and second rods 110A, 110B at a predetermined position along the ladder sub-assembly 110. The predetermined position may vary based on design considerations and preferences. In the depicted embodiment, the predetermined position is an upper portion of the ladder sub-assembly 110 between the two uppermost steps of the ladder sub-assembly 110 so it is out of reach of children. However the various embodiments of the present disclosure are not limited to the aforementioned configuration. As illustrated, the predetermined mounting position of the connecting rod 211 corresponds to the predetermined mounting position of the connecting rods 207 so as to allow the first and second connecting rods 207, 211 to be coupled to each other. In the various embodiments disclosed herein, the connection mechanism 23E includes the first and second connecting rods 207, 211 rotationally coupled to each other using a rotatable body 214, so as to rotationally couple the ladder sub-assembly 110 to the second ladder section 106. A support base 3D may also be incorporated and attached to the second ladder section 106. When the rotatable body 214 of the present invention is utilized, the fixing recesses 14 can be positioned so that they open counter-clockwise or clock-wise to allow the sub-assembly first and second rods 110A, 110B to exit as the sub-assembly 110 is rotated with respect to the second ladder section 106. As will be described in greater detail below, the fixing recesses 14 may have an "L" shape, such that the sub-assembly first and second rods 110A, 110B can be first pulled towards a user (and moved along fixing recess 14) before being rotated.

Figure 17:
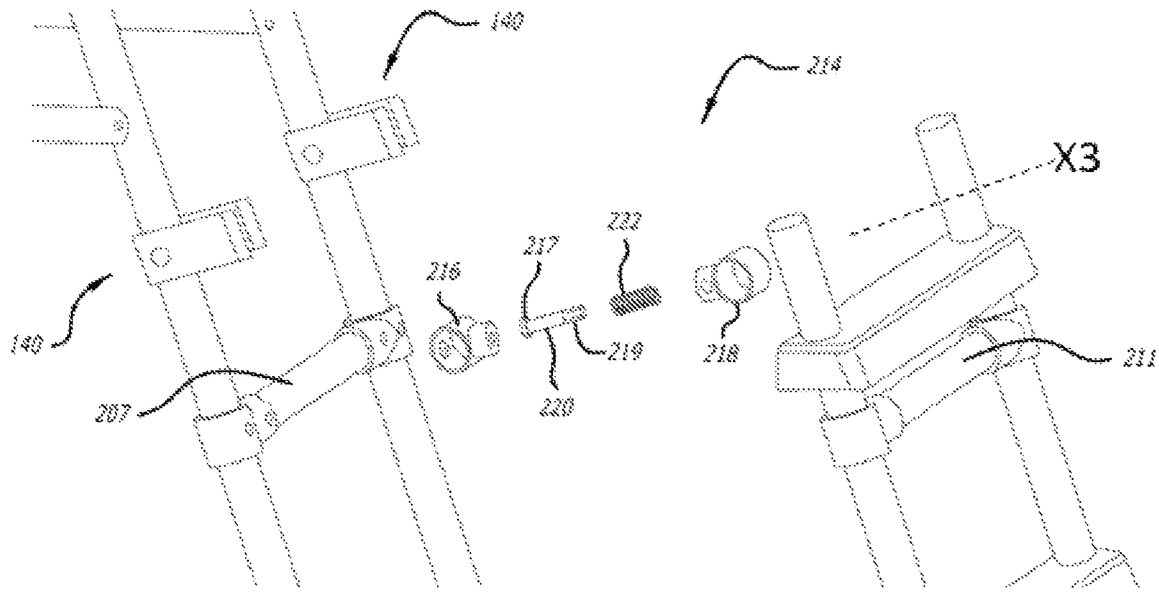
FIG. 17 is an exploded partial perspective view of an exemplary ladder sub-assembly, including a rotatable body of the safety ladder assembly of FIG. 16.

FIG. 17 is an exploded partial perspective view of connection mechanism 23E. As illustrated, the rotatable body 214 is coupled at a first end thereof to the first connecting rod 207 and coupled at a second end thereof to the second connecting rod 211. The aforementioned configuration allows the ladder sub-assembly 110 to be rotationally pivoted about a first axis X3 perpendicular to a longitudinal axis of the first connecting rod 207, to a position where the ladder sub-assembly 110 is inaccessible for use, as shall be described in further detail below.

In accordance with various embodiments of the present disclosure, the ladder assembly 200 may further include a snap-fit coupler 140 disposed along a length of at least one of the first and second supporting rods 106A, 106B of the second ladder section 106 to lock the movable ladder portion 110 in position. The snap-fit coupler is similar in structure to that of the snap-fit coupler 140 described with respect to FIGS. 7, 11, 12 and 13, therefore a detailed description thereof shall be omitted. The snap-fit coupler 140 may be provided on either one the first supporting rod 106A or the second supporting rod 106B, and in other embodiments, the snap-fit coupler 140 may be provided on both of the first supporting rod 106A or the second supporting rod 106B. The snap-fit coupler 140 functions to detachably couple the at least one of either of the sub-assembly first and second rods 110A, 110B to the respective first and second supporting rods 106A, 106B of the second ladder section 106 in a similar manner as the various embodiments described herein. To this effect, the snap-fit coupler 140 may be attached to either or both of the sub-assembly first and second rods 110A, 110B at positions corresponding to an upper portion of the ladder sub-assembly 110. The snap-fit coupler 140 may also further serve the function of preventing wobbling of the ladder as it is climbed in and out of the pool if rails/rods 110A, 110B extend above connecting rod 211. The snap-fit coupler 140 can also serve to lock the ladder in the inaccessible position at a height that it cannot be reached by children. The embodiment illustrated in FIGS. 16 through 19 may also include a coupling member 144 (as shown in FIG. 14) to lock the ladder into an inaccessible position.

According to various embodiments of the present disclosure, in an engaged configuration, the coupling shaft 154 of the snap-fit coupler 140 is disposed in the first groove 164 and the bump 156 is disposed in the second groove 166 and the slot 168. An "engaged configuration" as described herein, refers to a configuration in which the ladder sub-assembly 110 is engaged with or locked to the second ladder section 106. In particular, the engaged configuration refers to a configuration where either one or both of the sub-assembly first and second rods 110A, 110B are locked in engagement with the respective first and second supporting rods 106A, 106B through the snap-fit coupler 140. As previously discussed, in the engaged configuration, the movable member 152 is positioned in the housing portion 170, and the coupling shaft 154 with the spring 160 concentrically disposed thereon are disposed in the first groove 164. In this position, the bump 156 is positioned in the second groove 166 and slot 168 to encumber removal of rod 110A. Thus, in the engaged configuration, when the bump 156 is disposed in the second groove 166 and the slot 168, the button 162 can be actuated to displace the bump 156 out of the slot 168 to a disengaged configuration. A "disengaged configuration" as described herein, refers to a configuration in which the ladder sub-assembly 110 is disengaged or unlocked from the second ladder section 106. In particular, the disengaged configuration refers to a configuration where either one or both of the sub-assembly first and second rods 110A, 110B are detached or unlocked from engagement with the respective first and second supporting rods 106A, 106B. To unlock one or both of the sub-assembly first and second rods 110A, 110B, the snap-fit coupler 140 is operated to disengage or unlock either one or both of the sub-assembly first and second rods 110A, 110B from the respective first and second supporting rods 106A, 106B. In the disengaged position, the bump 156 is substantially removed from the slot 168 so that it no longer holds one of the first and second rods 110A, 110B in the slot 168.

Figure 18:
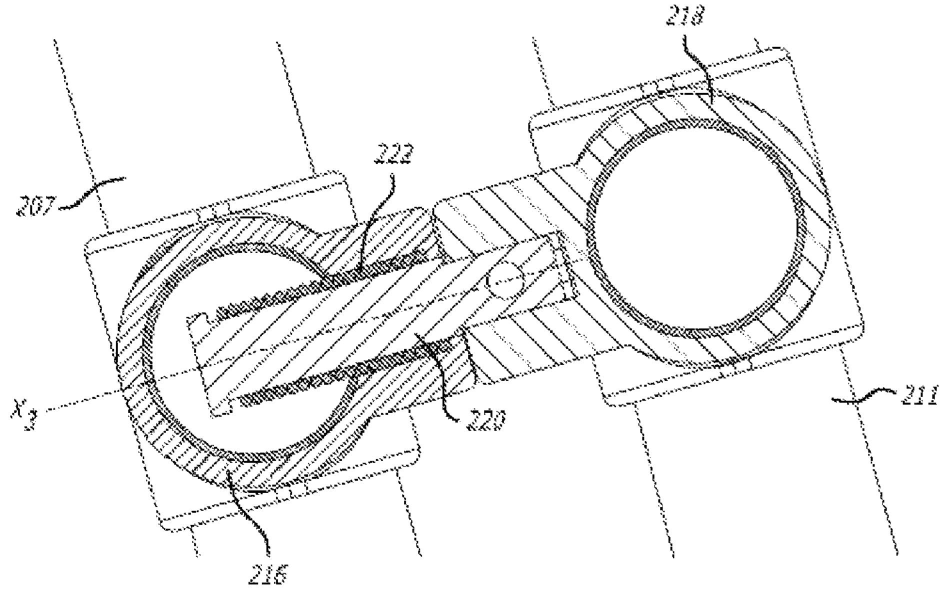
FIG. 18 is a cross-sectional view of the safety ladder assembly of FIG. 16, showing the rotatable body of FIG. 17 coupling a first connecting rod and a second connecting rod.

FIG. 18 is a cross-sectional view of the safety ladder assembly of FIG. 16, showing the connection mechanism 23E that includes a rotatable body coupling the first and second connecting rods 207, 211. In accordance with various embodiments of the present disclosure, the rotatable body 214 includes a first sleeved member 216 at the first end thereof for receiving the first connecting rod 207. The rotatable body 214 further includes a second sleeved member 218 at the second end thereof, for receiving the second connecting rod 211. As depicted, the rotatable body 214 may further include a rotating shaft 220 interposed between the first and second sleeved members 216, 218. Rotating shaft 220 may be operably coupled to a spring 222 which is concentrically disposed along the rotating shaft 220. The coupled configuration is depicted in FIG. 18 wherein the first and second connecting rods 207, 211 are rotationally coupled to each other and the sub-assembly first and second rods 110A, 110B are also disposed in fixing recesses 14 of base 3E. The spring 222 wraps around the shaft 220 and the shaft 220 includes a first end 217 that can be flanged for axially containing the spring 222. The first end 217 and spring 222 are disposed at least partially within the first sleeved member 216. As further depicted, the second end 219 of the rotating shaft 218 is disposed within the second sleeved member 216 and coupled thereto, for example via a nut and washer. The rotating shaft 220 thus connects the first and second sleeved members 216, 218 such that they are rotatable relative to each other about a longitudinal first axis X3 of the rotating shaft 220 and can also be pulled axially away from each other by overcoming the bias of spring 222. Since the first sleeved member 216 is coupled or otherwise attached to the first connecting rod 207, and the second sleeved member 218 is coupled or otherwise attached to the second connecting rod 211, the ladder sub-assembly 110 is similarly rotatable relative to the second ladder section 106, about the longitudinal first axis X3 of the rotating shaft 220. As such, the ladder sub-assembly 110 includes an operational position with the lower, i.e., base portion 276 of movable ladder portion on the ground, near the ground, or in the base support 3E. The ladder sub-assembly 110 is further rotatable to a non-operational position with the base portion 276 facing upwards, out of reach of children. Thus, in the disengaged configuration, the sub-assembly first and second rods 110A, 110B are pull outwardly from the respective first and second supporting rods 106A, 106B of the second ladder section 106, the ladder sub-assembly 110 can then be rotatable about the longitudinal first axis X3 of the rotating shaft 220, to the non-operational position. In the non-operational position, the ladder sub-assembly 110 is oriented with stairs of the movable ladder portion 110 thereof out of reach of unsupervised children such that they cannot be climbed. Accordingly, in the first or accessible position of this and other illustrated embodiments, the sub-assembly first rod 110A is disposed parallel and adjacent to the first supporting rod 106A so that the stairs on the movable ladder portion 110 can be vertically climbed. However, in the second or non-accessible position, the sub-assembly first rod 110A is disposed parallel and non-adjacent to the second supporting rod 106B such that the stairs of movable ladder portion 110 cannot be accessed.

A dampening member 25 can be utilized along the first axis X3 of connection mechanism 23E of FIGS. 17 and 18. In such arrangements, the dampening member 25 is preferably incorporated into contact with at least rotating shaft 220 to increase the force necessary to move the ladder sub-assembly, i.e., movable ladder along the first axis X3. The dampening member 25 can include the damper 10 of FIG. 2A wherein the pin 9 is replaced with the one of the aforementioned shafts, such as shaft 220. As such, the damper 10 can define the aforementioned counter bores in sleeves 216 and/or 218 and cause increased friction against the shaft 220. Alternatively, the shaft 220 may be attached to the damper 10 such as to rotate with shaft 220 and cause friction against the sleeves 216 and 218. Likewise, the rotational shaft 220 and sleeve damper configurations can include wear-resistant members 7 and an elastic fitting 6 is shown in FIG. 1. In such embodiments, the elastic fitting 6 replaces part of or is incorporated by the embodied shafts such as shaft 220 and/or at least one wear resistant member is disposed within sleeve 216 or sleeve 218 shown in FIG. 17 to further compress damper 10. Likewise, the aforementioned friction discs 27 may be incorporated into the present embodiment. In other words, any of the aforementioned dampening members 25A, 25B, 25C may be incorporated into the present embodiment to cause increased friction during rotational movement.

Figure 19:
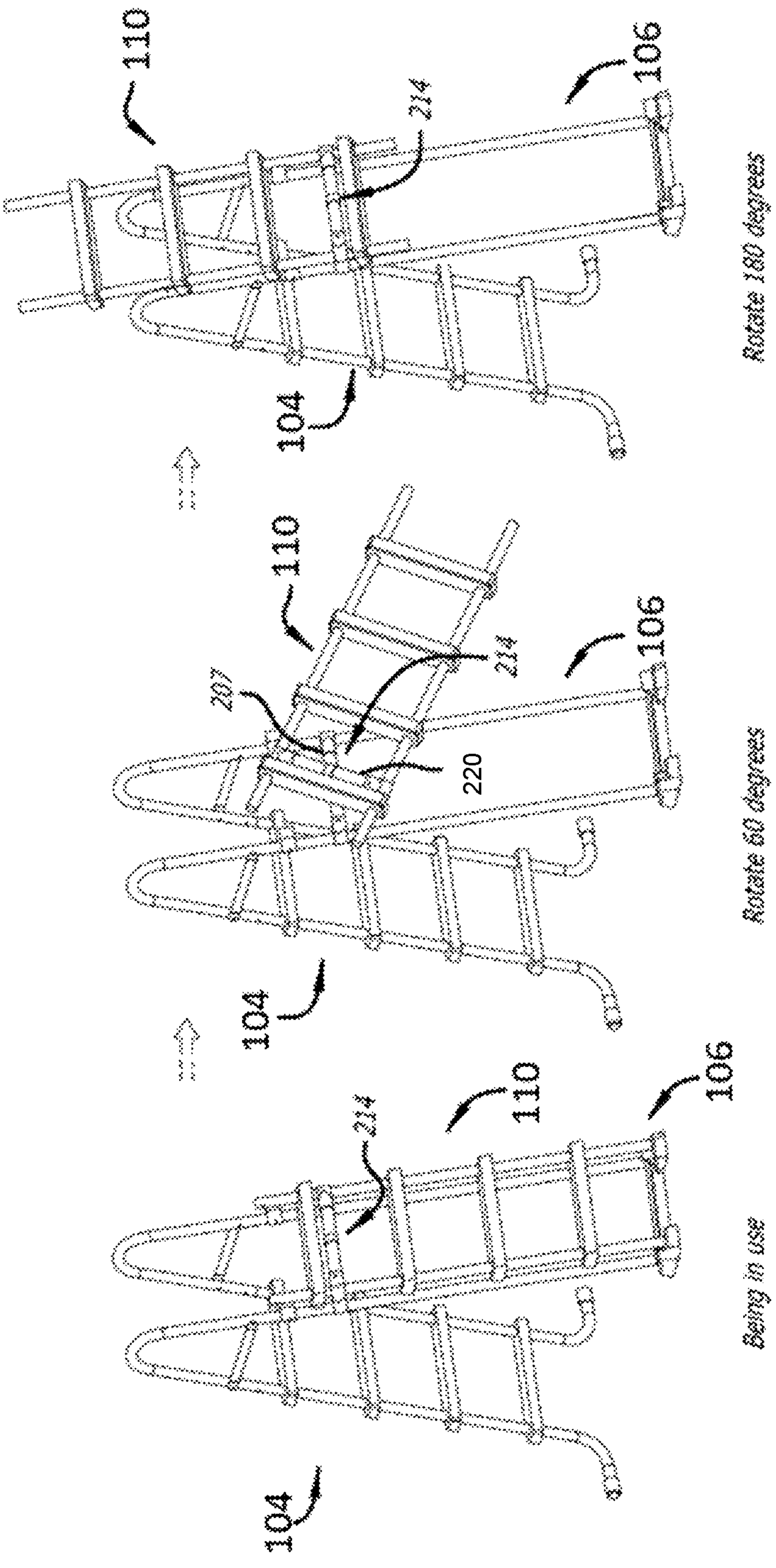
FIG. 19 is a series of perspective views of the safety ladder assembly of FIG. 16 being rotated from a first, operational position (the leftmost view) to a second, non-operational position (the rightmost view), according to exemplary implementations of the present disclosure.

FIG. 19 is a series of perspective views of the safety ladder assembly 110 of FIGS. 16, 17, and 18 being rotated from the first or operational position to the second or non-operational position according to exemplary implementations of the present disclosure. In operation, the ladder sub-assembly 110 (i.e., movable ladder portion) may be moved from the operational position to the non-operational position using the various connection assemblies of the various embodiments described herein, i.e., the snap fit couplers, and the rotatable body as summarized herein. In the operational position, the ladder sub-assembly 110 may be locked into engagement with the second ladder section 106, so as to keep the ladder sub-assembly 110 stable as users climb onto the ladder assembly 200 to access the pool. To achieve this, the exemplary snap-fit coupler 140 operates as previously described to lock either one or both of the sub-assembly first and second rods 110A, 110B to the respective first and second supporting rods 106A, 106B. When it is desired to move the ladder sub-assembly 110 to the non-operational position with a lower or base portion of the sub-assembly 110 facing upwards, the ladder sub-assembly 110 is then rotated for example, 60°, or any desired angle, up to, and including 180° about the longitudinal first axis X3 of the rotating shaft 220. The ladder sub-assembly 110 can then be locked into position at the non-operational position using the snap-fit coupler 140. In the example illustrated in FIG. 19, the ladder sub-assembly 110 is rotated counterclockwise, however the various embodiments described herein are not limited to the aforementioned configuration. The ladder sub-assembly 110 may instead be rotated clockwise or both to be placed in the non-operational position. Such variations can further be incorporated into the support base 3 and fixing recess 14 configuration.

Thus, the various embodiments of the present disclosure describe a manner of rotatably coupling the ladder sub-assembly 110 to the second ladder section 106 through a simple coupling mechanism, i.e., the rotatable body. As previously discussed, the coupling mechanisms described herein, e.g., the snap-fit couplers and the rotatable body all provide the advantage of having a simplified structure which is easy to use, and have a less complicated assembly process, thereby decreasing production costs of the overall ladder assembly.

According to one aspect, the present disclosure provides a safety ladder assembly as shown throughout the Figures for a swimming pool and more particularly an above-ground pool. The ladder assembly 100 comprises a ladder body 102 that includes a first ladder section 104 including first and second supporting rods 104A, 104B for placement in the swimming pool and a second ladder section 106 coupled to the first ladder section 104, and including first and second supporting rods 106A, 106B coupled to the first and second supporting rods 104A, 104B of the first ladder section 104. The second ladder section 106 is adapted for placement outside of the swimming pool. The first ladder section 104 includes a plurality of steps 112 each mounted at predetermined positions lengthwise along the first ladder section 104. The ladder assembly 100 further includes a ladder sub-assembly 110 (movable ladder portion) movably coupled to the second ladder section 106. The ladder sub-assembly 110 includes sub-assembly first and second rods 110A, 110B (movable pair of rails) and a plurality of sub-assembly steps 112 coupling the sub-assembly first and second rods 110A, 110B to each other at a plurality of corresponding positions along lengths of the sub-assembly first and second rods 110A, 110B. The sub-assembly first rod 110A is detachably coupled to the first supporting rod 106A of the second ladder section 106 and the sub-assembly second rod 110B is pivotally coupled to the second supporting rod 106B of the second ladder section 106. The ladder assembly 100 further comprises a rotation component 114 pivotally coupling the sub-assembly second rod 110B to the second supporting rod 106B of the second ladder section 106 for rotation of the ladder sub-assembly 110 between a first or operational position and a second or non-operational position.

In the non-operational or inaccessible position, the ladder sub-assembly 110 is inaccessible and thus the pool cannot be accessed. In the operational position, the ladder sub-assembly 110 can be climbed for access to the pool. The rotation component 114 includes a rotatable body 120 coupled to the second supporting rod 106B of the second ladder section 106. As illustrated in FIGS. 7 through 10, the rotation component 114 further includes a first rotating shaft 122 disposed on one of the rotatable body 120 and the sub-assembly second rod 110B. A connector 124 couples the rotatable body 120 to the second supporting rod 106B of the second ladder section 106, and a remaining one of the rotatable body 120 and the sub-assembly second rod 110B includes a first shaft bore 126 configured to receive the first rotating shaft 122. The sub-assembly second rod 110B can further include the first rotating shaft 122 extending from an upper portion of the sub-assembly second rod 110B along a longitudinal first axis X1 thereof. The rotatable body 120 can include the first shaft bore 126 configured to receive the first rotating shaft 122. The rotatable body 120 comprises the first rotating shaft 122 wherein the first axis extends axially therethrough. The sub-assembly second rod 110B comprises the first shaft bore 126 extending partially therethrough in a longitudinal direction thereof. The first rotating shaft 122 is rotationally mounted within the first shaft bore 126 to rotationally couple the sub-assembly second rod 110B about the first rotating shaft 122 first axis. When the sub-assembly first rod 110A is detached from the first supporting rod 106A of the second ladder section 106, the ladder sub-assembly 110 is rotatable about the first rotating shaft axis.

The safety ladder assembly 20B of FIGS. 7 through 10 further comprises a second rotating shaft 128 having a second axis X2 extending axially therethrough, the first rotational shaft and second rotational shaft axes being formed perpendicularly with respect to each other, wherein the first rotating shaft 122 is coupled to the second rotating shaft 128. The connector 124 comprises a connector bore 130 extending at least partially therethrough. The second rotating shaft 128 is rotationally mounted within the connector bore 130 to pivotally couple the sub-assembly second rod 110B about the second rotational shaft second axis X2. When the sub-assembly first rod 110A is detached from the first supporting rod 106A of the second ladder section 106, the ladder sub-assembly 110 is rotatable about the second rotational shaft second axis X2. The rotatable body 120 comprises at least one rotatable body bore 126 extending at least partially therethrough and the connector 124 comprises a second rotating shaft 128 extending from an outer surface thereof and mounted within the connector bore 130. The safety ladder assembly 20B may further include a spring 160 and a snap fastener 142 disposed at an upper end of the sub-assembly first rod 110A and a coupling member 144 comprising a slot 146 for receiving the spring 160 snap fastener 142. When the ladder sub-assembly 110 is rotated 180° degrees about the first rotational shaft axis X1 and 180° degrees about the second rotational shaft second axis X2 to the non-operational position, the ladder sub-assembly 110 is oriented with a base portion 176 thereof facing upwards. The snap fastener 142 is configured to fasten the sub-assembly first rod 110A within the slot 146 to maintain the orientation of the ladder sub-assembly 110 at the second or non-operational position, out of reach of children.

The ladder assembly may further include a snap-fit coupler 140 as shown in FIGS. 11, 12, and 13 disposed along a length of the first supporting rod 106A of the second ladder section 106, at a position corresponding to an upper portion of the sub-assembly first rod 110A, to detachably couple the sub-assembly first rod 110A to the first supporting rod 106A of the second ladder section 106. The snap-fit coupler 140 comprises a body 150 and a movable member 152 disposed in the snap-fit coupler body 150. The movable member 152 includes a coupling shaft 154 and a bump 156 protruding from an inner surface of the movable member 152. A spring 160 is concentrically disposed with respect to the coupling shaft 154 and a button 162 is operably coupled to the movable member 152. The body 150 includes first and second grooves 164, 166, and a slot 168 recessed therein. In an engaged configuration, the coupling shaft 154 is configured to be received in the first groove 164 and the bump 156 is configured to be received in the second groove 166 and the slot 168. When the bump 156 is disposed in the slot 168, the button 162 can be actuated to displace the bump 156 out of the slot 168 to a disengaged configuration. The snap-fit body 150 comprises a housing portion 170 protruding from an outer surface of the body 150. In the engaged configuration, the snap-fit coupler 140 couples the sub-assembly first rod 110A and the first supporting rod 106A of the second ladder section 106. The movable member 152 is positioned in the housing portion 170 and the coupling shaft 154 with the spring 160 concentrically disposed thereon is positioned in the first groove 164. The bump 156 is positioned in the second groove 166 and slot 168. In the disengaged configuration, the sub-assembly first rod 110A is decoupled from the first supporting rod 106A of the second ladder section 106 such that the ladder sub-assembly 110 is released from slot 168 and rotatable to a position where the ladder sub-assembly 110 is oriented with a base portion 176 thereof facing upwards, at the non-operational position.

Another embodiment of ladder assembly for a swimming pool is also herein disclosed. The ladder assembly is shown in FIGS. 16 through 19 and comprises a ladder body 102 having a first ladder section 104 including a first and second supporting rods 104A, 104B for placement in the swimming pool. The ladder assembly further comprises a second ladder section 106 coupled to the first ladder section 104 that includes first and second supporting rods 104A, 104B coupled to the first and second supporting rods 104A, 104B of the first ladder section 104. In operation, the second ladder section 106 is adopted for placement outside of the swimming pool and the first ladder section 104 comprises a plurality of steps 112 each mounted at predetermined positions lengthwise along the first ladder section 104. The second ladder section 106 further includes a first connecting rod 207 mounted at a predetermined position along the second ladder section 106 and a ladder sub-assembly 110 rotationally coupled to the second ladder section 106.

Still referring to FIGS. 16 through 19, the ladder sub-assembly 110 comprises a ladder sub-assembly 110 (movable ladder portion) having first and second rods 110A, 110B and a second connecting rod 211 mounted between the sub-assembly first and second rods 110A, 110B (movable pair of rails) at a predetermined position along the ladder sub-assembly 110. A connection mechanism 23E includes the first and second connecting rods 207, 211 that are rotationally coupled to each other. A plurality of sub-assembly steps 112 couple the sub-assembly first and second rods 100A, 100B to each other at a plurality of corresponding positions along the sub-assembly first and second rods 110A, 110B. The ladder assembly 100 further comprises a rotatable body 120 to rotationally couple the first and second connecting rods 207, 211 to each other. The rotatable body 120 is coupled at a first end 217 thereof to the first connecting rod 207 disposed on the second ladder section 106 and coupled at a second end 219 thereof to the second connecting rod 211 disposed on the ladder sub-assembly 110 for rotationally pivoting the ladder sub-assembly 110 about a longitudinal first axis X3 perpendicular to a longitudinal axis of the first connecting rod 207. The rotatable body 120 comprises a first sleeved member 216 at the first end 217 thereof for receiving the first connecting rod 207 therein and a second sleeved member 218 at the second end 219 thereof for receiving the second connecting rod 211 therein. A rotating shaft 220 is disposed between the first and second sleeved members 216, 218. The rotatable body 120 further comprises a spring 160 concentrically disposed along the rotating shaft 220. The spring 160 and a first end 217 of the rotating shaft 220 are disposed at least partially within the first sleeved member 216 and a second end 219 of the rotating shaft 220 is disposed within the second sleeved member 218 and coupled thereto.

Various embodiments of the ladder assembly may further include a snap-fit coupler 140 disposed along a length of at least one of the first and second supporting rods 106A, 106B of the second ladder section 106, at a position corresponding to an upper portion of the ladder sub-assembly 110. As best illustrated in FIGS. 11 through 13, the snap-fit coupler 140 detachably couples at least one or either of the sub-assembly first and second rods 110A, 110B to the respective first and second supporting rods 106A, 106B of the second ladder section 106. In certain embodiments, the snap-fit coupler 140 comprises a body 150, and a movable member 152 disposed in the snap-fit coupler body 150. The snap-fit coupler body 150 includes a coupling shaft 154 and a bump 156 protruding from an inner surface of the movable member 152. A spring 160 is concentrically disposed with respect to the coupling shaft 154 and a button 162 is operably coupled to the movable member 152. The body 150 includes first and second grooves 164, 166, and a slot 168 recessed therein. In an engaged configuration, the coupling shaft 154 is configured to be received in the first groove 164 and the bump 156 is configured to be received in the second groove 166 and the slot 168. When the bump 156 is disposed in the slot 168, the button 162 can be actuated to displace the bump 156 out of the slot 168 to a disengaged configuration. The snap-fit body 150 further comprises a housing portion 170 protruding from an outer surface of the body 150. In the engaged configuration, the at least one snap-fit coupler 140 couples the ladder sub-assembly 110 to at least one of the first and second supporting rods 106A, 106B of the second ladder section 106. The movable member 152 is positioned in the housing portion 170 and the coupling shaft 154 with the spring 160 concentrically disposed thereon. The movable member 152, the coupling shaft 154, and the bum 156 are respectively positioned in the first groove 164, the second groove 166, and the slot 168. In the disengaged configuration, the sub-assembly first and second rods 110A, 110B are decoupled from the respective first and second supporting rods 106A, 106B of the second ladder section 106 and the ladder sub-assembly 110 is rotatable about a longitudinal axis of the rotating shaft 220, to a non-operational position where the ladder sub-assembly 110 is oriented with a base portion 176 out of reach of children. In the disengaged position, the bump 156 is removed from slot 168 such that the rail 110A can also be removed from slot 168.

In accordance with these various aspects and embodiments, the ladder assembly illustrated in FIGS. 7 through 19 may include a ladder body 102 and a ladder sub-assembly 110 (movable ladder portion). The ladder body 102 includes a first ladder section 104 including first and second supporting rods 104A, 104B for placement in the pool and a second ladder section 106 coupled to the first ladder section 104, and being for placement outside of the pool. The second ladder section 106 is coupled to the first ladder section 104, and includes first and second supporting rods 104A, 104B coupled to the first and second supporting rods 104A, 104B of the first ladder section 104. The ladder sub-assembly 110 is movably coupled to the second ladder section 106, and includes sub-assembly first and second rods 110A, 110B, and a plurality of sub-assembly steps 112 coupling the sub-assembly first and second rods 110A, 110B to each other. The sub-assembly first rod 110A is detachably coupled to the first supporting rod 106A of the second ladder section 106, and the sub-assembly second rod 110B is pivotally coupled to the second supporting rod 106B of the second ladder section 106.

Referring now to FIGS. 20 through 32C various embodiments of a safety ladder assembly for a pool are shown. The ladder body comprises a first ladder portion 104, a second ladder portion 106, a third ladder portion 110 and a bridging portion. The first ladder portion 104 is adapted to be placed inside the pool and comprising a first pair of support rails. The second ladder portion 106 being adapted to be placed outside the pool. The safety ladder assembly further comprising a second pair of support rails connected to the first pair of support rails. The bridging portion 107 connects the first ladder portion 104 and the second ladder portion 106. The third ladder portion 110 (movable ladder portion) comprising a third pair of support rails and being movably connected with the second ladder portion 106. The connection mechanism is configured to allow the third ladder portion 110 to switch between an operational position and a non-operational position, and the connection structure fixedly connects the second ladder portion 106 and the third ladder portion 110 in the first or operational position and the second or non-operational position. An upper portion of the second ladder portion 106 is fixedly connected to a lower portion of the third ladder portion 110. Thus, when the third ladder portion 110 is in the operational position, the third ladder portion 110 is moved to a lower position, substantially vertically aligning ladder portions 110 and 106, to cooperate with the second ladder portion 106 for a user to enter and exit the pool. When the third ladder portion 110 is in the non-operational position, the third ladder portion 110 is moved to a higher position (i.e., the upper portion of the second ladder portion 106 is fixedly connected to the lower portion of the third ladder portion 110), which prevents the user from entering the pool, and in particular prevents children from climbing the ladder without authorization.

Figure 20:
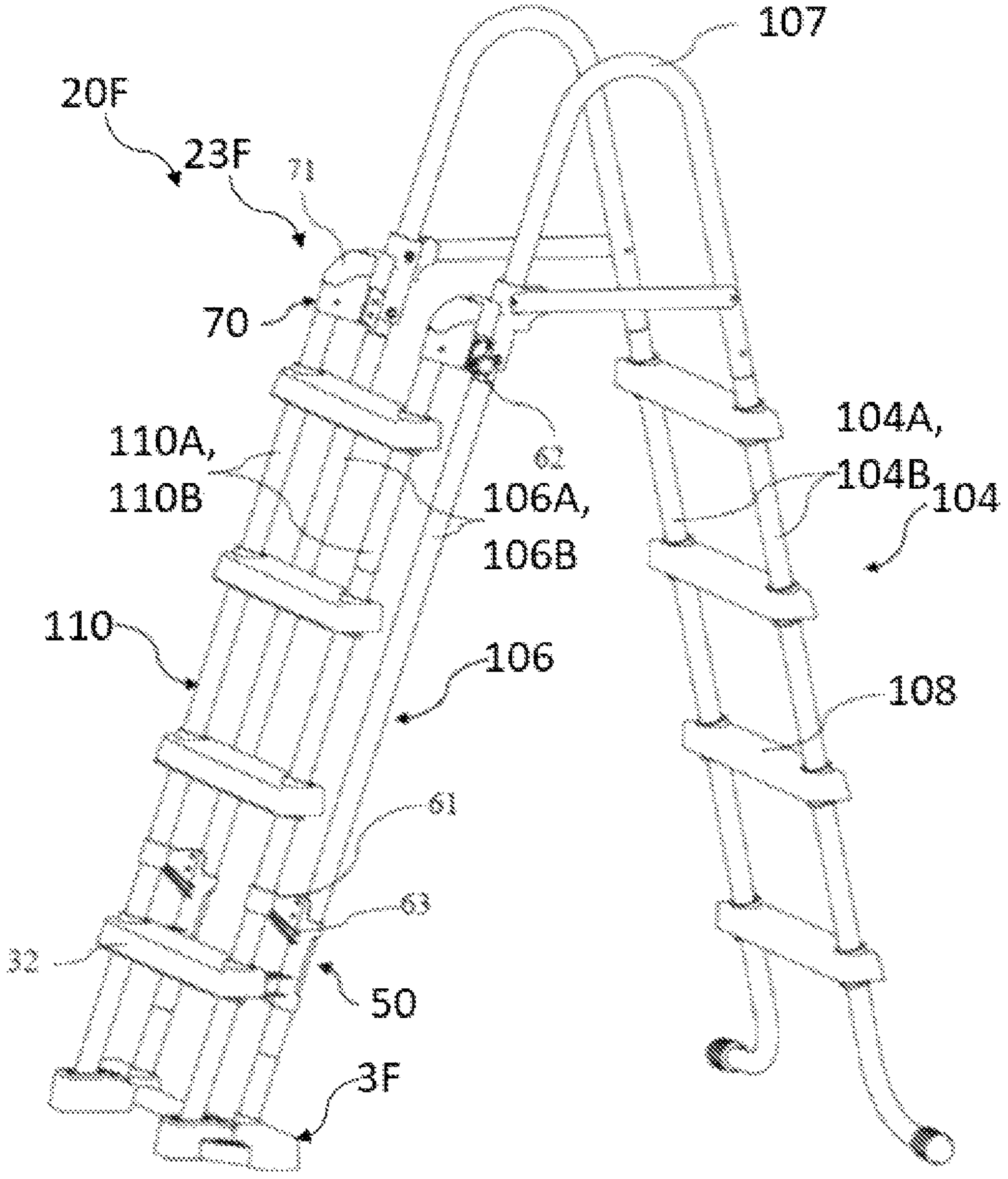
FIG. 20 is perspective view of a ladder assembly, in accordance with yet another embodiment of the present disclosure.

FIG. 20 shows a safety ladder assembly 20F in accordance with a first exemplary embodiment of the present utility model having a connection mechanism 23F. As shown in FIG. 20, in the present embodiment, the ladder assembly includes a ladder body and a connection mechanism 23F. The ladder body includes a first ladder portion 104, a second ladder portion 106, a third ladder portion 110, and a bridging portion 4. The connection mechanism 23F is configured to allow the third ladder portion 110 to be switched between a first or operational position and a second or non-operational position. More specifically, in the operational position, an upper portion of the second ladder portion 106 is fixedly connected to an upper portion of the third ladder portion 110. In the non-operational position, the upper portion of the second ladder portion 106 is fixedly connected to an lower portion of the third ladder portion 110 such that the entire movable ladder portion or third ladder portion 110 is raised to a height that it cannot be climbed. The shape of the ladder body may be V-shaped, U-shaped or any similar shape that can straddle a wall of the pool.

The first ladder portion 104 (i.e., the inner ladder) is placed inside the pool and includes a pair of parallel and vertically placed support rails 104A, 104B and a plurality of steps 108 connected between the pair of support rails 104A, 104B, wherein each step is mounted at a preset position along a length direction of the first ladder portion 104 and the plurality of steps can serve as surfaces on which the user can stand, and the user enters and exits the pool through the plurality of steps. The second ladder portion 106 (i.e., the outer ladder) is placed outside the pool, and the first ladder portion 104 and the second ladder portion 106 are connected by the bridging portion 107. The second ladder portion 106 includes a pair of support rails 106A, 106B connected to the pair of support rails 104A, 104B of the first ladder portion 104, and no steps are provided between the second pair of support rails. The third ladder portion 110 (movable ladder portion) is movably connected to the second ladder portion 106 and includes a pair of support rails 110A, 110B (movable pair of rails) and a plurality of steps 32 connected between the pair of support rails 110A, 110B.

Figure 27A:
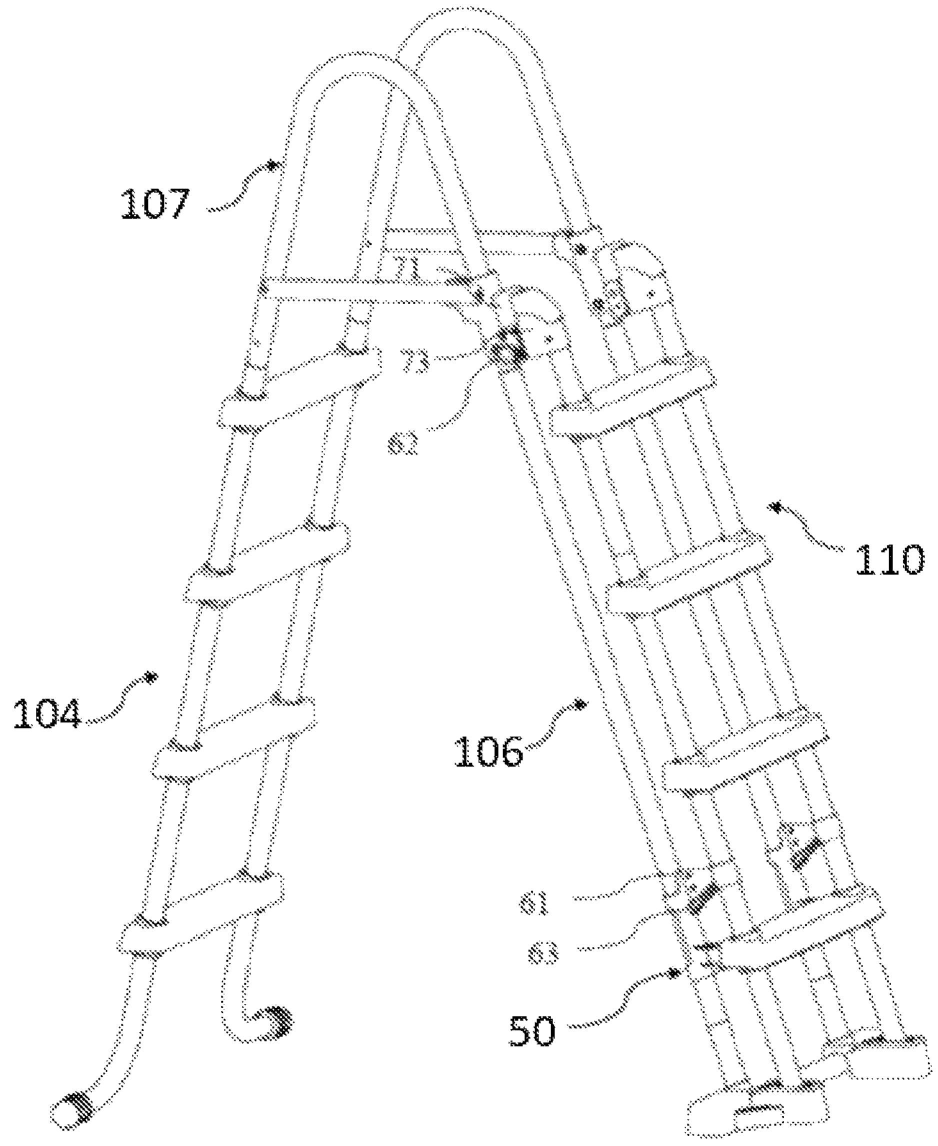
FIGS. 27A, 27B, and 27C are a series of perspective views of a movable ladder portion of the ladder assembly of FIG. 20 moving from a first, operational position (FIG. 27A) to a second, non-operational position (FIG. 27C) and including an intermediary position (FIG. 27B) therebetween.
Figure 27B:
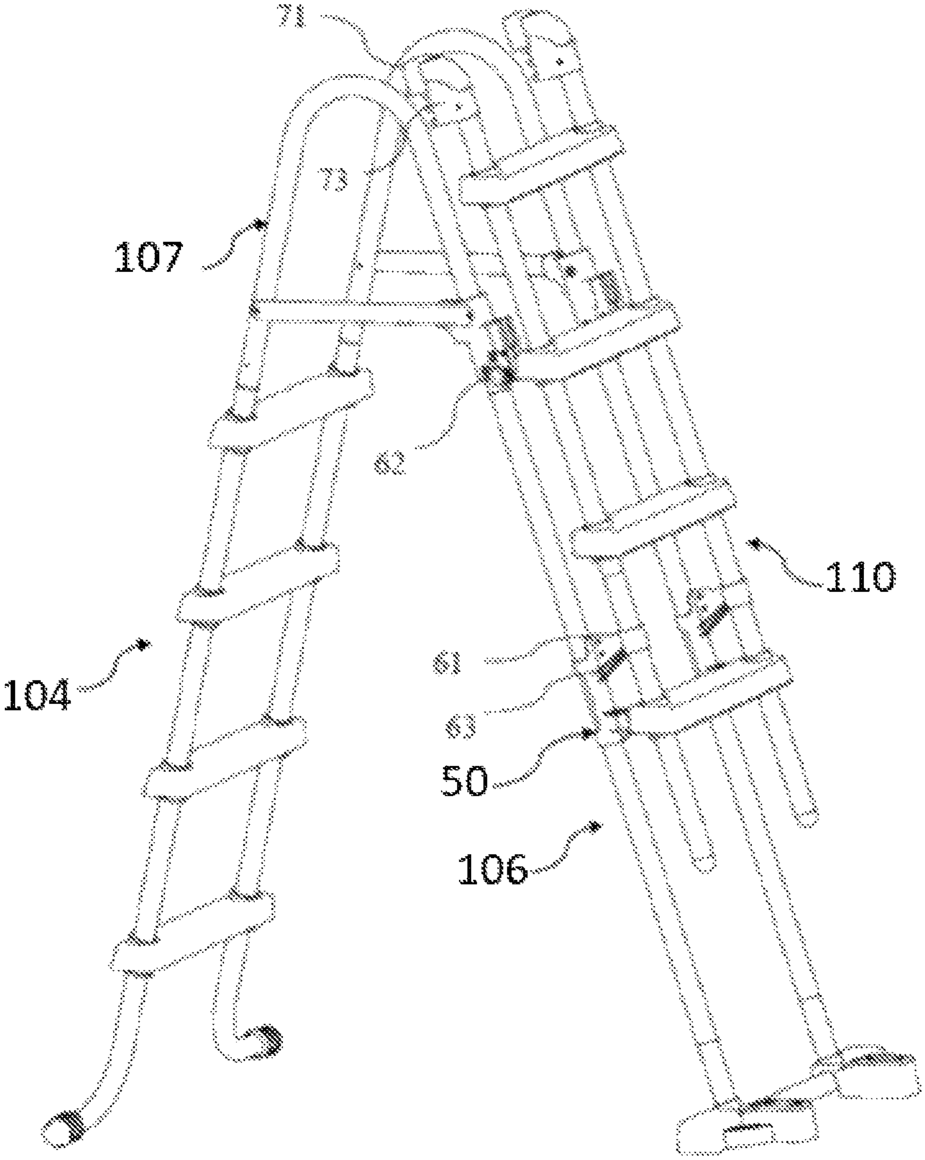
Figure 27C:
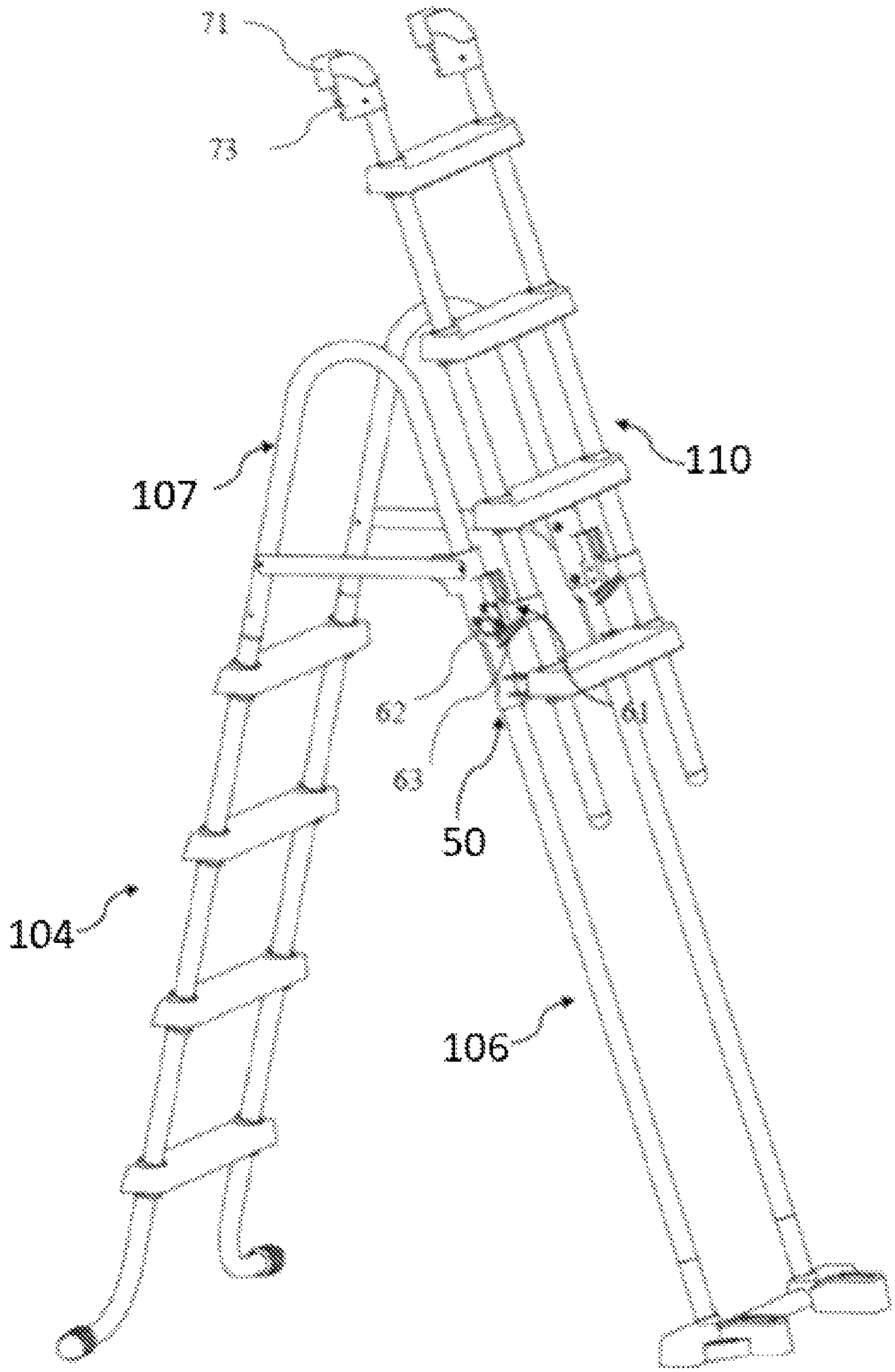

FIGS. 27A, 27B, and 27C are a series of perspective views of the third ladder portion 110 moving from the first or operational position to the second or non-operational position in accordance with one embodiment of the present disclosure. As can be seen from FIGS. 27A to 27C, when the third ladder portion 110 is in the operational position (i.e., the third ladder portion 110 is moved to the lower position as shown in FIG. 27A, for example, the upper portion of the third ladder portion 110 is connected to the upper portion of the second ladder portion 106), the user can climb the plurality of steps of the third ladder portion 110 for access into the pool. When the third ladder portion 110 is in the non-operational position, the third ladder portion 110 is moved to the higher position and the lower portion of the third ladder portion 110 is connected to the upper portion of the second ladder portion 106, such that the steps of third ladder portion 110 are too high to be climbed. Because the second ladder portion 106 is not provided with a step, the user cannot climb, so that the user can be prevented from entering the pool, and in particular, the children can be prevented from climbing the ladder without authorization. The third ladder portion 110 can be movably switched between the operational position and the non-operational position via the various connection mechanisms described herein (for example, shown in FIG. 27B wherein the third ladder portion 110 can be slid upwardly).

The connection mechanism will be specifically described below with reference to FIGS. 21 through 26. As can be seen from the embodiment illustrated in FIG. 21, the connection mechanism 23F includes a sliding member 50 that connects the second ladder portion 106 with the third ladder portion 110, so that the third ladder portion 110 can slide between the operational position and the non-operational position along a length direction of the second ladder portion 106. The sliding member 50 includes a sliding sleeve 51, and the sliding sleeve 51 is sleeved on one of the pair of support rails 106A, 106B of the second ladder portion 106, and is fixedly connected with a corresponding rail of the pair of support rails 110A, 110B of the third ladder portion 110. With the aid of the sliding member 50, the third ladder portion 110 can be slidably moved between the lower and higher positions (as shown in FIGS. 27A to 27C). Alternatively, a sliding sleeve 51 may be provided both of the pair of support rails 106A, 106B. Alternatively, other means may be selected to movably connect the second ladder portion 106 and the third ladder portion 110 such that the third ladder portion 110 is movable relative to the second ladder portion 106.

Figure 21:
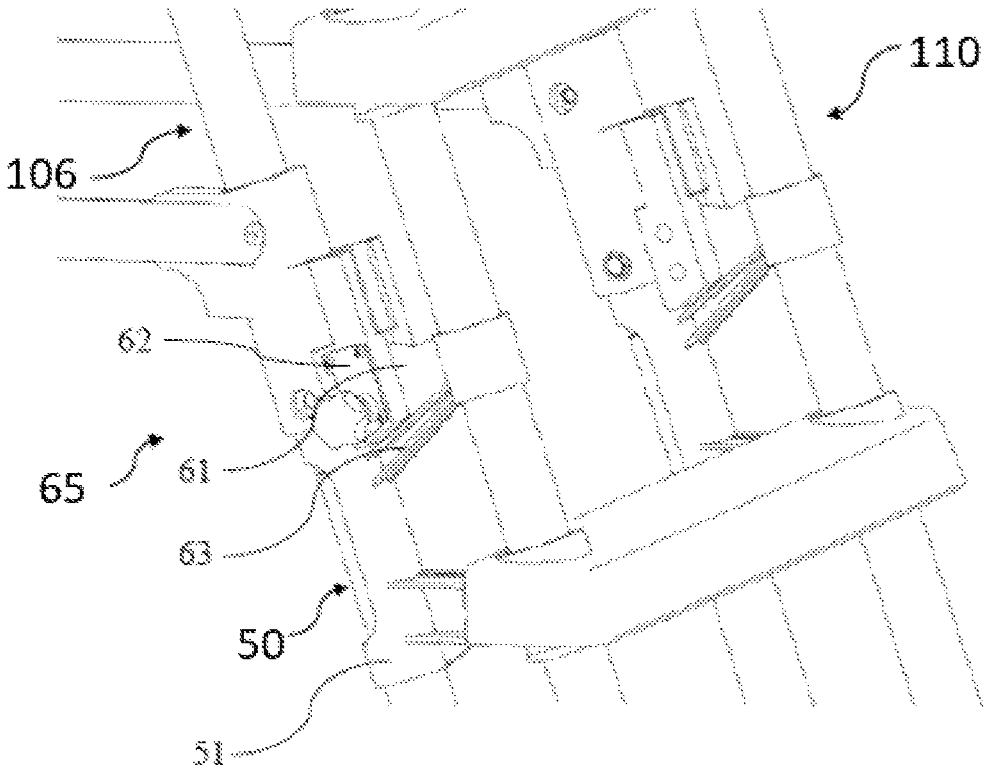
FIG. 21 is a partially enlarged perspective view showing the connection mechanism when a ladder portion of FIG. 20 is in a second, non-operational position.
Figure 22:
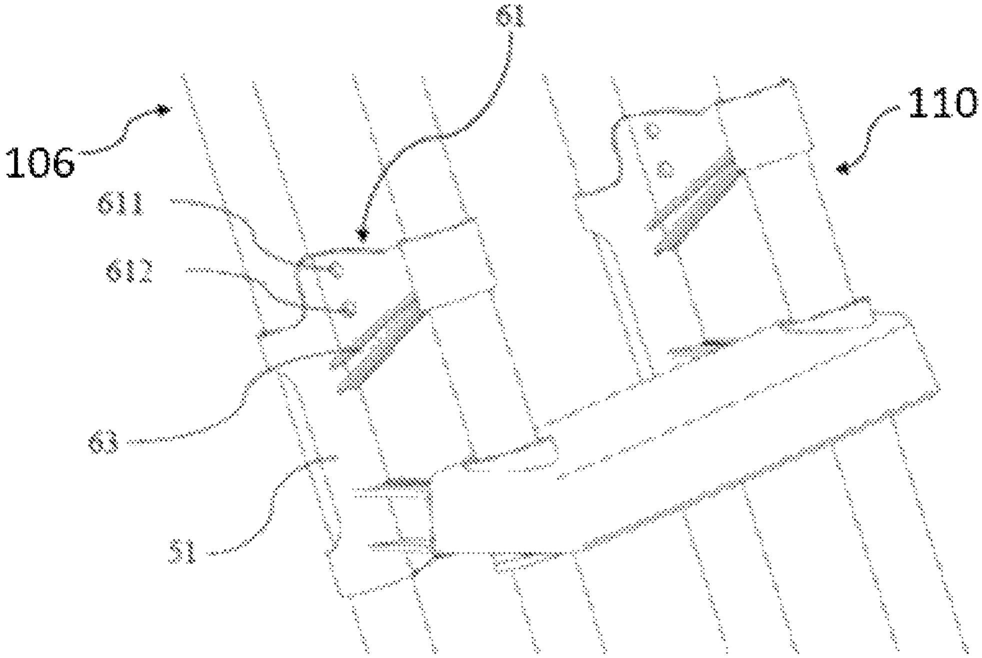
FIG. 22 is a partially enlarged perspective view showing the connection mechanism when the ladder portion of FIG. 20 is between a first, operational position and the second, non-operational position.

The connection mechanism 23F in FIG. 21 further includes a first sub-connection structure 65, primarily for the connection between the third ladder portion 110 and the second ladder portion 106 when the third ladder portion 110 is in the non-operational position. The first sub-connection structure 65 includes a first male connector 61 and a first female connector 62. The first male connector 61 is disposed at the lower portion of the third ladder portion 110 and the first female connector 62 is disposed at the upper portion of the second ladder portion 106. When the third ladder portion 110 is in the non-operational position, the first male connector and the first female connector engages to connect the lower portion of the third ladder portion 110 to the upper portion of the second ladder portion 106.

Still referring to FIG. 21, in order to define the relative position of the first male connector 61 with the first female connector 62, the first sub-connection structure 65 further includes a position limiting member 63. The position limiting member 63 is located between the second ladder portion 106 and the third ladder portion 110 and is disposed at a lower portion of the first male connector 61 along the length direction of the third ladder portion 110. Thus, when the third ladder portion 110 is in the non-operational position, the position limiting member 63 can define the relative position of the first male connector 61 with the first female connector 62 such that the first male connector 61 engages with the first female connector 62. For example, the position limiting member 63 may be a baffle or the like disposed at a lower portion of the first male connector 61 to prevent the first male connector 61 from directly sliding over the first female connector 62 without abutting engaging the first female connector 62, which can serve to the security purpose. For example, the first male connector 61 and the position limiting member 63 may be located at an upper portion of the sliding member 50 along the length direction of the third ladder portion 110, and the sliding member 50, the first male connector 61, and the position limiting member 63 may be integrally formed. Alternatively, the position limiting member may be omitted.

Figure 23:
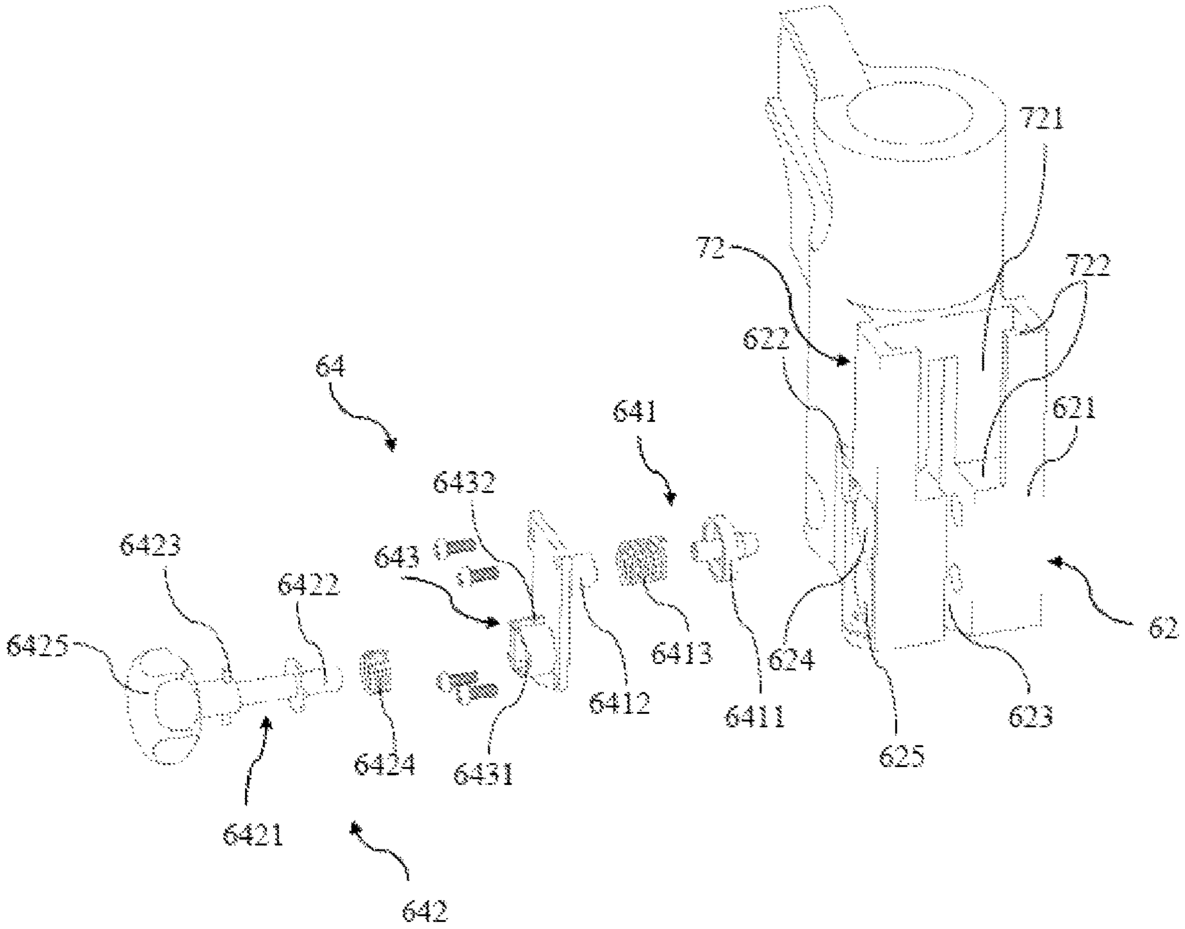
FIG. 23 is an enlarged exploded view of a first female connector and a corresponding fixing assembly of FIG. 20.
Figure 24:
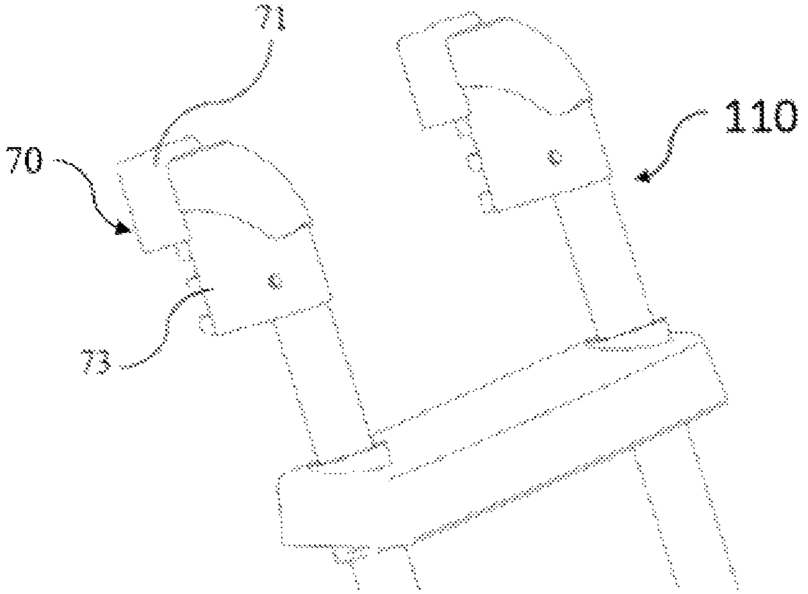
FIG. 24 is a partially enlarged perspective view showing a connector used in the ladder assembly illustrated in FIG. 20.

In order to fix the first male connector 61 to the first female connector 62, the first sub-connection structure 65 further includes a fixing assembly 64 as best shown in FIG. 23. The first male connector 61 is fixed to the first female connector 62 by the fixing assembly 64, wherein the fixing assembly 64 is disposed at the first female connector 62. The described dampening member 25 embodiments may located to add friction to the sliding motion of the present connection mechanism as the movable ladder portion is moved along the first axis.

Still referring to FIG. 23 that illustrates an enlarged exploded view of the first female connector 62 and the fixing assembly 64, the first female connector 62 includes a first face 621 and a second face 622. The first face 621 has a first elongated slot portion 623 extending at least partially through the first face. The second face 622 and the first face 621 are perpendicular to each other and the second face 622 has a first engaging aperture 624 and a second engaging aperture 625. The first engaging aperture 624 and the second engaging aperture 625 extend through the second face 622 and the first elongated slot portion 623. The first male connector 61 has a first aperture 611 and a second aperture 612 (shown in FIG. 22), and the fixing assembly 64 includes a first spring pin 641 and a second spring pin 642.

The first spring pin 641 (FIG. 23) is adapted to engage with the first engaging aperture 624, and an end of the first spring pin 641 has a guiding face. When the first male connector 61 is engaged with the first female connector 62, the first male connector 61 is located in the first elongated slot 623, and the first spring pin 641 passes through the first engaging aperture 624 and the first aperture 611 of the first male connector. When it is necessary to separate the first male connector 61 from the first female connector 62, the first male connector 61 is applied with a force in the direction of the lower portion of the third ladder portion 110. The first male connector 61 compresses the first spring pin 641 along the guiding face of the first spring pin 641 until the first spring pin 641 is separated from the first aperture 611 of the first male connector thus separating the first male connector 61 from the first elongated slot 623 and resulting in allowing separation of the first male connector 61 from the first female connector 62. For example, the first spring pin 641 includes a resilient plug 6411, a hollow boss 6412, and a first spring 6413, wherein the resilient plug 6411 can engage the first engaging aperture 624 and the hollow boss 6412 is used for receiving at least a portion of the resilient plug 6411. When the first male connector 61 is located in the first elongated slot 623, the hollow boss 6412 supports the elastic plug 6411, and the elastic plug 6411 is engaged with the first engaging aperture 624, and can be inserted into the first engaging aperture 624 and the first aperture 611 of the first male connector.

The second spring pin 642 (FIG. 23) is adapted to engage with the second engaging aperture 625. When the first male connector 61 is engaged with the first female connector 62, and while the first male connector 61 is located in the first elongated slot 623, the second spring pin 642 is inserted into the second engaging aperture 625 and the second aperture 612 of the first male connector, so as to fix the first male connector 61 in the first elongated slot 623. As such, the movable ladder portion 110 is held in place by spring pin 642. As illustrated, the second spring pin 642 includes a knob 6421 and a second spring 6424. The knob includes a protruding shaft 6422, a position limiting rod 6423, and a handle 6425. The shaft 6422 is used for engaging with the second engaging aperture 625, and can be inserted into the second engaging aperture 625 and the second aperture 612 of the first male connector.

Still referring to FIG. 23, the fixing assembly 64 may further include a position limiting member 643. The position limiting member 643 is disposed on the second face 622 of the first female connector and the position of the position limiting member 643 corresponds to the second engaging aperture 625. The position limiting member 643 includes a movement limiting face 6431 and a position limiting slot 6432. The movement limiting face is formed on the position limiting member, and the position limiting slot extends through the movement limiting face. In the state where the first male connector 61 is fixed with the first female connector 62, the position limiting rod 6423 is snapped in the position limiting slot 6432, and the shaft 6422 is located in the second aperture 612 of the first male connector, so that the first male connector 31 is locked in the first elongated slot 623. When it is necessary to separate the first male connector 61 from the first female connector 62, the handle 6425 is applied with a force (e.g., pulling) to deviate the shaft 6422 away from the second aperture 612 of the first male connector 61, and then the handle 6425 is rotated to cause the position limiting rod 6423 to deviate from the position limiting slot 6432 such that the first male connector 61 separates from the first female connector 62. At this time, the position limiting rod 6423 abuts against the movement limiting face 6431.

Figure 26:
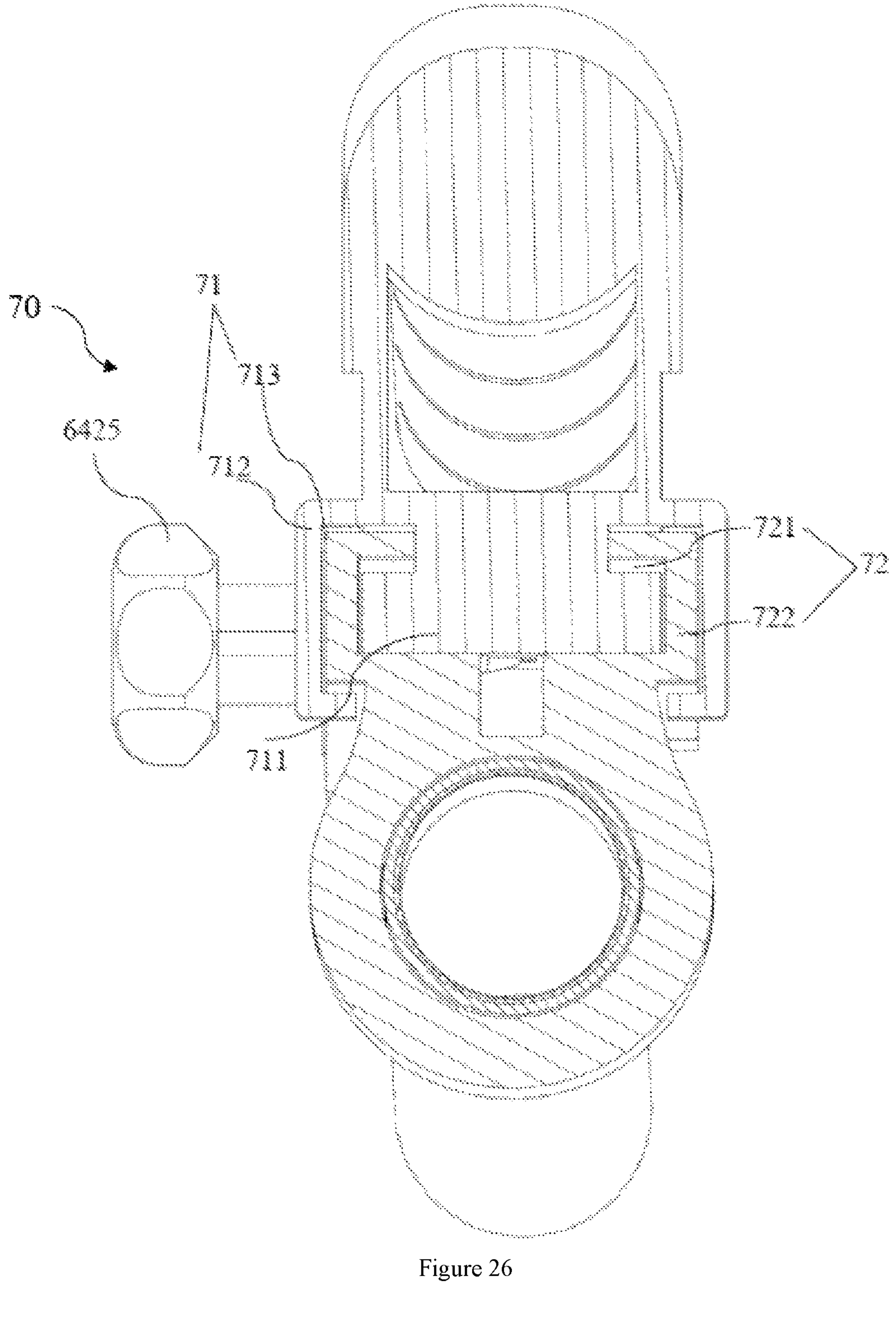
FIG. 26 is a cross-sectional view of the second male connector engaging with a second female connector in FIG. 20.

As best seen in FIG. 26, the connection mechanism 23F further includes a second sub-connection structure 70, mainly for the connection between the third ladder portion 110 and the second ladder portion 106 when the third ladder portion 110 is in the operational position. The second sub-connection structure 70 includes a second male connector 71 and a second female connector 72. The second male connector 71 is located at an upper portion of the third ladder portion 110, and the second female connector 72 is located at an upper portion of the second ladder portion 106, for fixing the upper portion of the third ladder portion 110 to the upper portion of the second ladder portion 106.

The second female connector 72 has a second elongated slot 721 and a movement restricting member 722. When the second male connector 71 and the second female connector 72 are engaged, the movement restricting member 722 restricts the movement of the second male connector 71 in the second elongated slot 721, so as to prevent movement of the third ladder portion 110 relative to the second ladder portion 106 such that the third ladder portion 110 is fixed in the operational position without displacement. The second male connector 71 is a two-layer structure, including a first blocking portion 711 and a second blocking portion 712. The first blocking portion 711 and the second blocking portion 712 define a male connector elongated slot 713. The blocking portion 711 can be snapped in the second elongated slot 721 and cooperates with the movement restricting member 722 to prevent the movement of the second male connector 71 (see FIG. 26), and the movement restricting member 722 snaps into the male connector elongated slot 713 to further prevent the movement of the second male connector 71.

The second sub-connection structure 70 further includes a third male connector 73 (see FIG. 24) for connecting the third ladder portion 110 and the second ladder portion 106. The third male connector 73 is adapted to engage the first female connector 62, and when the third ladder portion 110 is in the first or operational position, the third male connector 73 and the first female connector 62 engage to connect the upper portion of the third ladder portion 110 to the upper portion of the second ladder portion 106. Thus, in the operational position, the third male connector 73 and the first female connector 62 are engaged, the second male connector 71 and the second female connector 72 are engaged, and the upper portion of the third ladder portion 110 and the upper portion of the second ladder portion 106 can be connected and fixed. When not engaged, the third ladder portion 110 and the second ladder portion 106 are connected together only by the sliding member 50, thus allowing movement between operational and non-operational positions.

In order to engage the third male connector 73 with the first female connector 62, the second sub-connection structure 70 further includes a fixing assembly. The second sub-connection structure 70 may share the fixing assembly with the first sub-connection structure 65, or may use a separate fixing assembly. In this embodiment, the second sub-connection structure 70 shares a fixing assembly with the first sub-connection structure 65. Alternatively, a positioning design of the same or different design as the fixing assembly of the first sub-connection structure 65 may be used alone.

Figure 25:
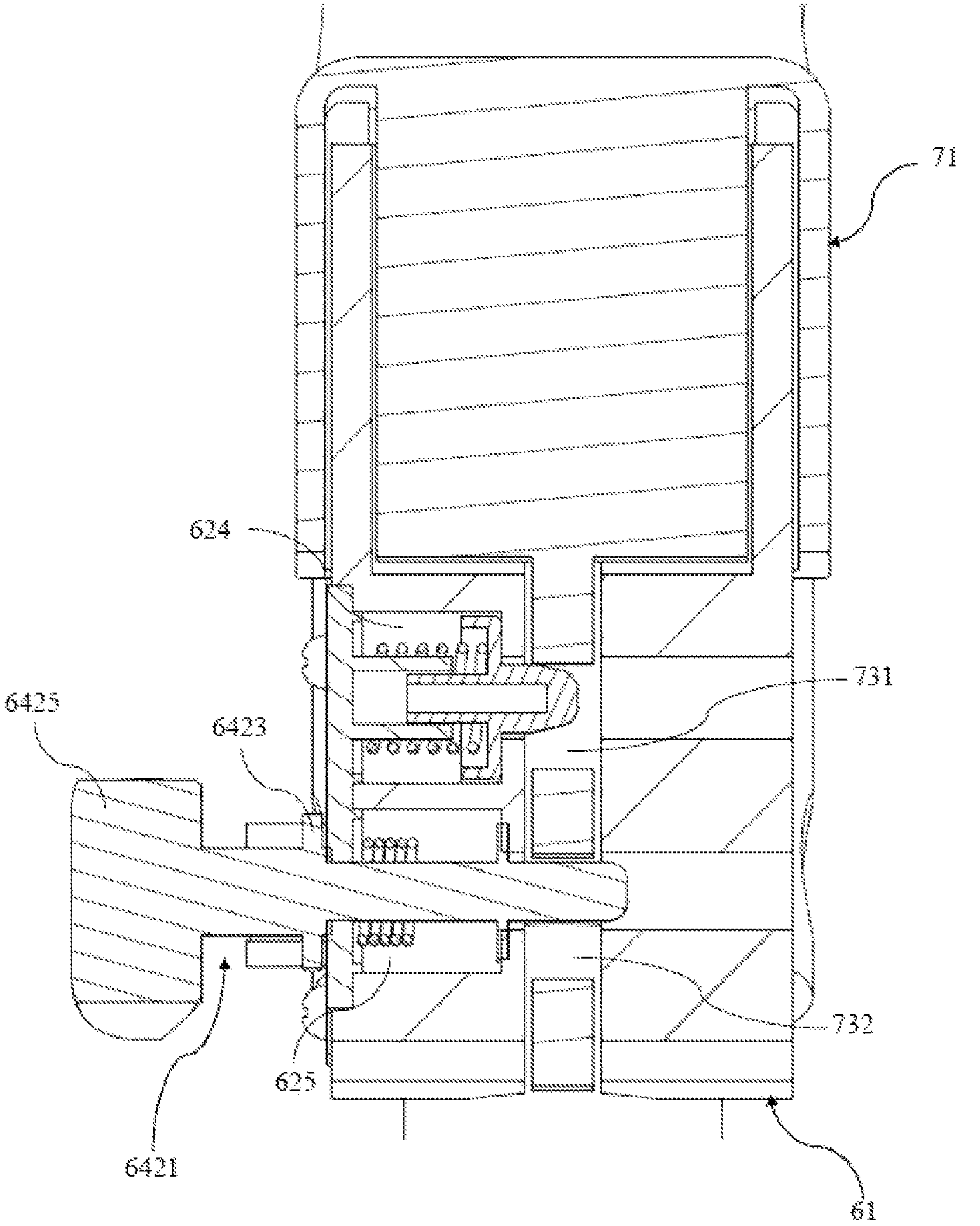
FIG. 25 is a cross-sectional view of the third male connector engaging with the first female connector in FIG. 20.

The third male connector 73 may include a first aperture 731 and a second aperture 732 (shown in FIG. 25). When the third male connector 73 is located in the first elongated slot of the first female connector to engage the first female connector, the first spring pin 641 passes through the first engaging aperture 624 and the first aperture 731 of the third male connector. When it is necessary to separate the third male connector 73 from the first female connector 62, the third male connector 73 is applied with a force in the direction of the lower portion of the third ladder portion 110, and the third male connector 73 compresses the first spring pin 641 along the guiding face of the first spring pin 641 until the first spring pin 641 is separated from the first aperture 731 of the third male connector, to separate the third male connector 73 from the first elongated slot 623.

The second spring pin 642 (FIG. 23) of the fixing assembly is adapted to engage with the second engaging aperture 625. When the third male connector 73 is engaged with the first female connector 62 and is located in the first elongated slot 623 of the first female connector 62, the second spring pin 642 is inserted into the second engaging apertures 625 and the second aperture 732 of the third male connector 73, to fix the third male connector 73 in the first elongated slot 623.

In the state where the third male connector 73 is engaged with the first female connector 62 (FIG. 27A), the position limiting rod 6423 is engaged with the position limiting slot 6432, and the shaft 6422 is located in the second aperture 732 of the third male connector such that the first male connector 61 is locked within the first elongated slot 623. When it is necessary to separate the third male connector 73 from the first female connector 62, the handle 6425 is applied with a force to deviate the shaft 6422 away from the second aperture 732 of the third male connector, and then the handle 6425 is rotated to cause the position limiting rod 6423 to deviate from the position limiting slot 6432 such that the third male connector 73 separates from the first female connector 62. At this time, the position limiting rod 6423 abuts against the movement limiting face 6431.

Figure 28:
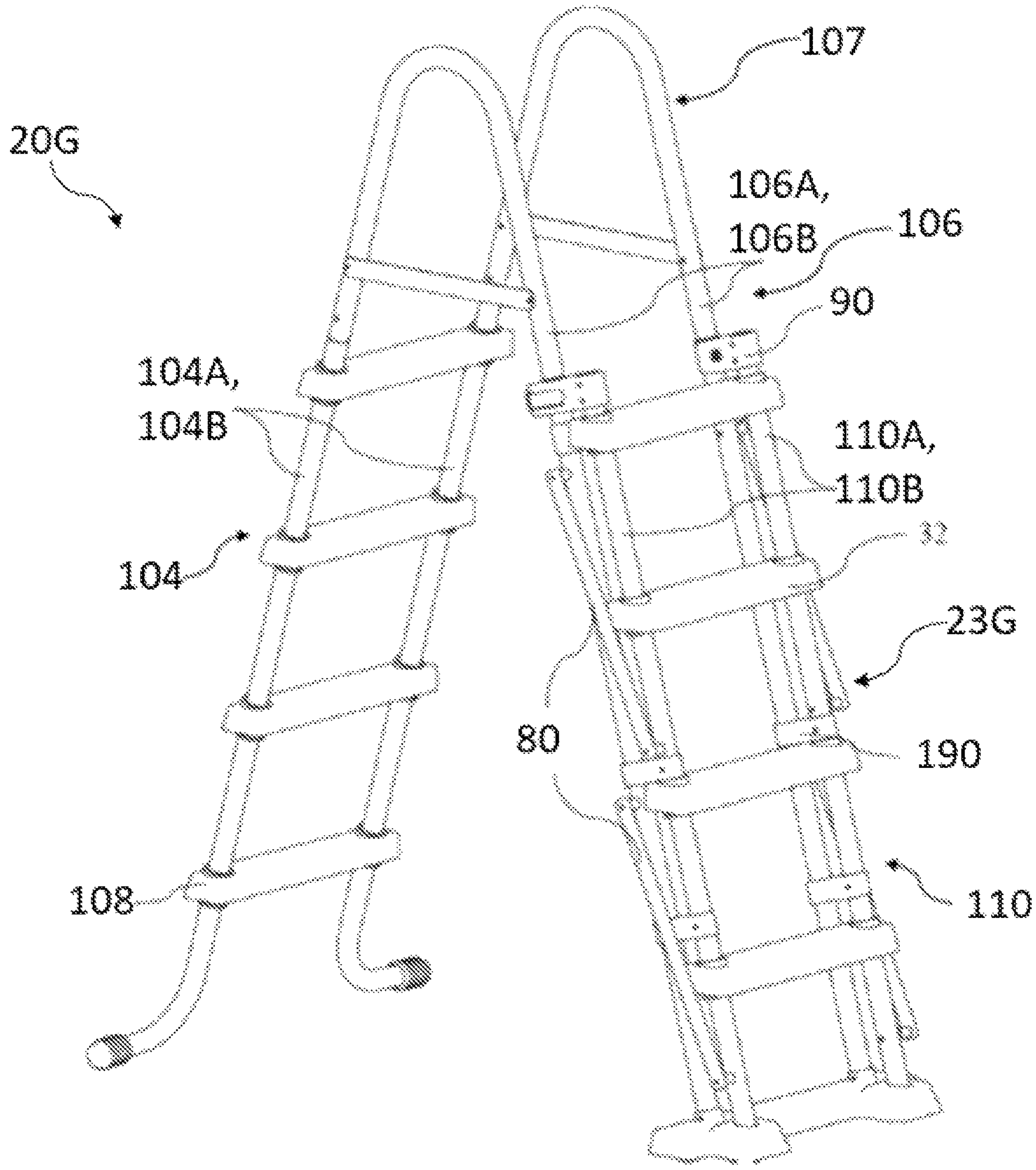
FIG. 28 is a perspective view of a ladder assembly, in accordance with another embodiment of the present disclosure.

FIG. 28 shows a perspective view of a safety ladder assembly 20G and connection mechanism 23G according to another exemplary embodiment of the present utility model. The second exemplary embodiment is identical to the first exemplary embodiment in the ladder body, with the main difference being the structure of the connection mechanism 23G. In the present embodiment, the connection mechanism 23G does not include the sliding member 50. Instead, the connection mechanism 23G includes a connecting rod 80, a first snap connector 90 and a second snap connector 190. Two ends of the connecting rod 80 are rotatably connected to the support rails 106A, 106B of the second ladder portion 106 and the corresponding support rails 110A, 110B of the third ladder portion 110, respectively. The position of the third ladder portion 110 is moved by the connecting rod 80, and the second ladder portion 106 and the third ladder portion 110 are fixed by the snap connectors as previously described. FIGS. 28 to 31C illustrate various aspects of the ladder assembly in the present embodiment. Rotatable connections between the connecting rods 80 and ladder portions can include any of the afore described dampening members 25A, 25B, 25C for rotational dampening.

The connecting rod 80 movably connects the second ladder portion 106 and the third ladder portion 110. The first snap connector 90 (FIGS. 29 and 30) is used for detachably connecting the second ladder portion 106 and the third ladder portion 110 when the third ladder portion 110 is in the operational position (lower position) and the second snap connector 190 is used for connecting the lower portion of the third ladder portion 110 to the bridging portion 107 when the third ladder portion 110 is in the non-operational position (higher position).

Figure 31A:
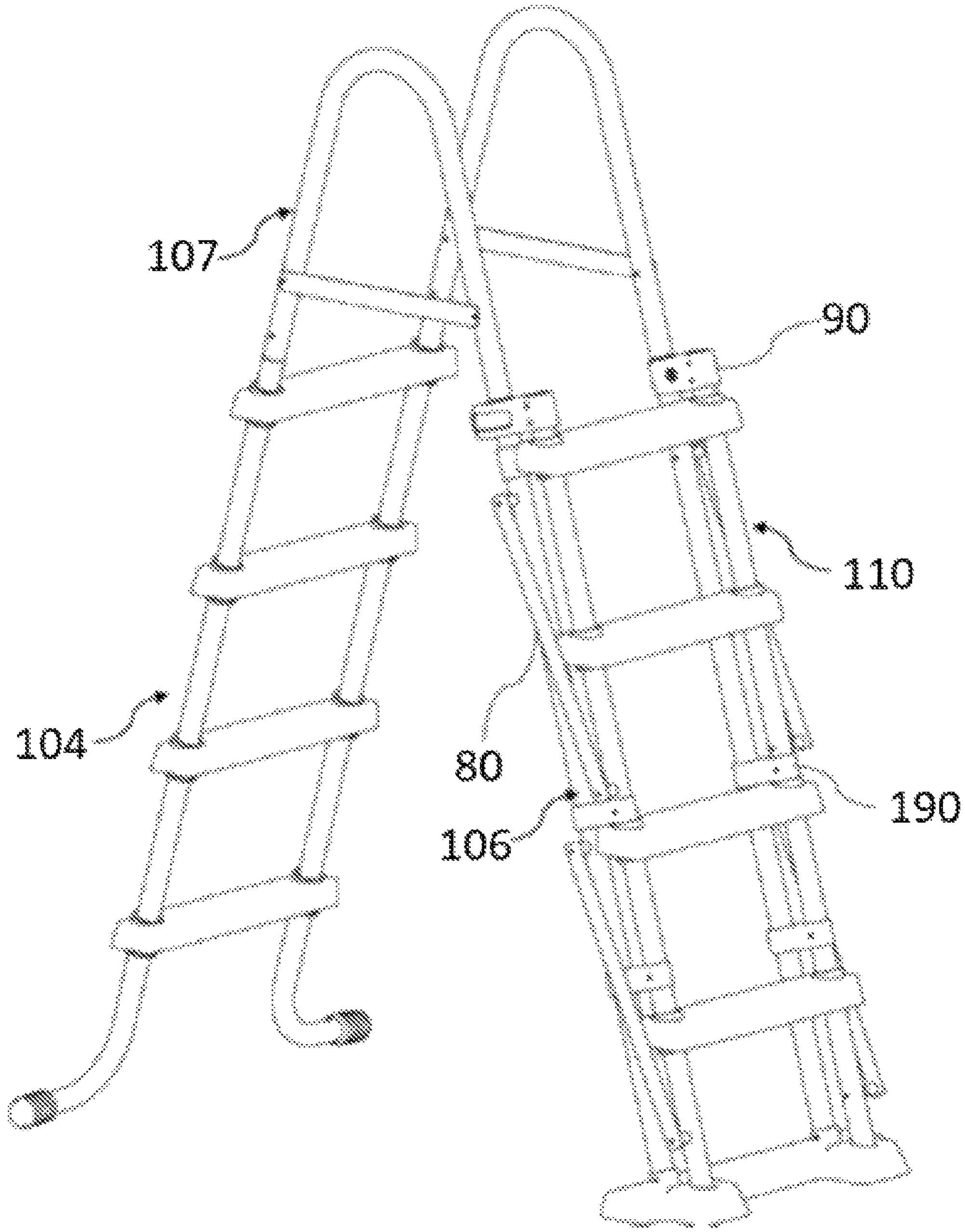
FIGS. 31A, 31B, and 31C are a series of perspective views of a movable ladder portion of the ladder assembly of FIG. 28 moving from a first, operational position (FIG. 31A) to a second, non-operational position (FIG. 31C) and including an intermediary position (FIG. 31B) therebetween.
Figure 31B:
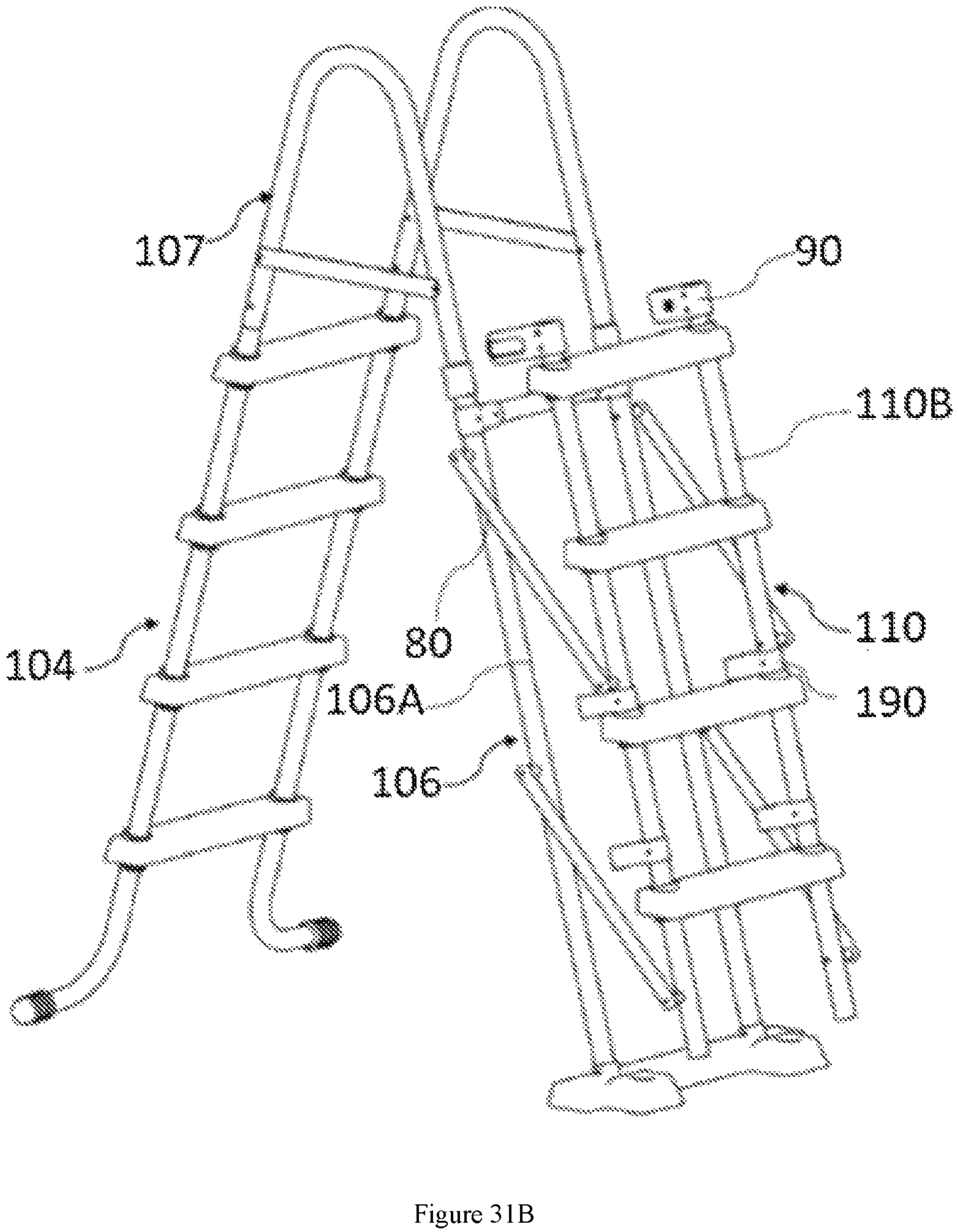
Figure 31C:
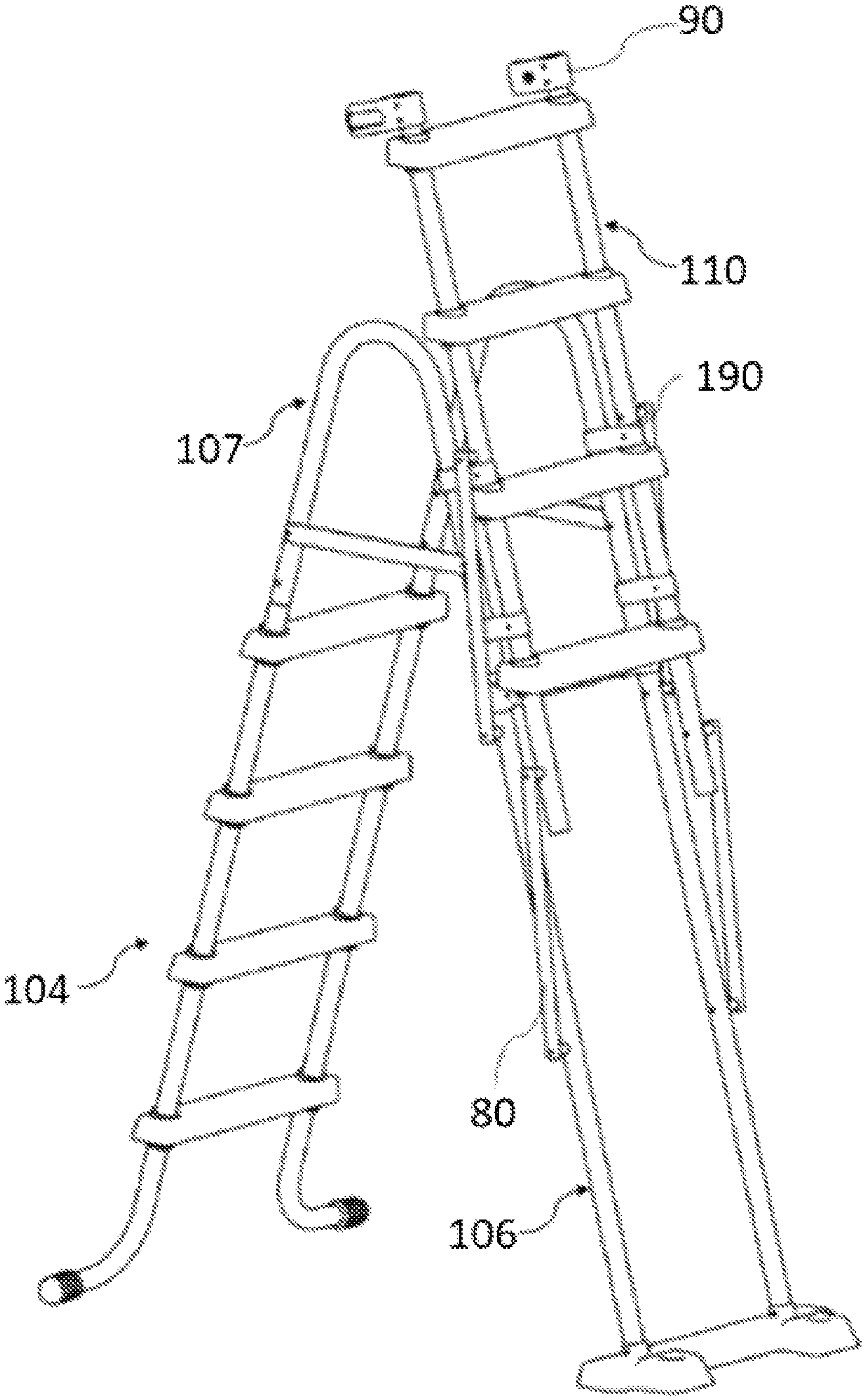

As can be seen from FIG. 31A through 31C, when the pool needs to be accessed, the third ladder portion 110 is in the operational position (i.e., the third ladder portion 110 is in a lower position as shown in FIG. 31A), and the first snap connector 90 causes the second ladder portion 106 to be connected with the third ladder portion 110, at which point the user can climb with a plurality of steps of the third ladder portion 110. By means of the connecting rod 80, the third ladder portion 110 can be switched from the operational position to the non-operational position (as shown in FIG. 31B, at this time, the third ladder portion 110 is between the operational position and the non-operational position, e.g., in the intermediary position, neither the first snap connector 90 nor the second snap connector 190 is connected, and the third ladder portion 110 is moved by rotating the connecting rod 80). The connecting rod 80 can also be used to switch the third ladder portion 110 to the second or non-operational position. When it is not required to be used, the third ladder portion 110 is in the non-operational position (i.e., as shown in FIG. 31C, higher position), and the second snap connector 190 connects the lower portion of the third ladder portion 110 to the bridging portion 107. Since there are no steps in the second ladder portion 106, the user cannot climb the ladder with steps.

Figure 29:
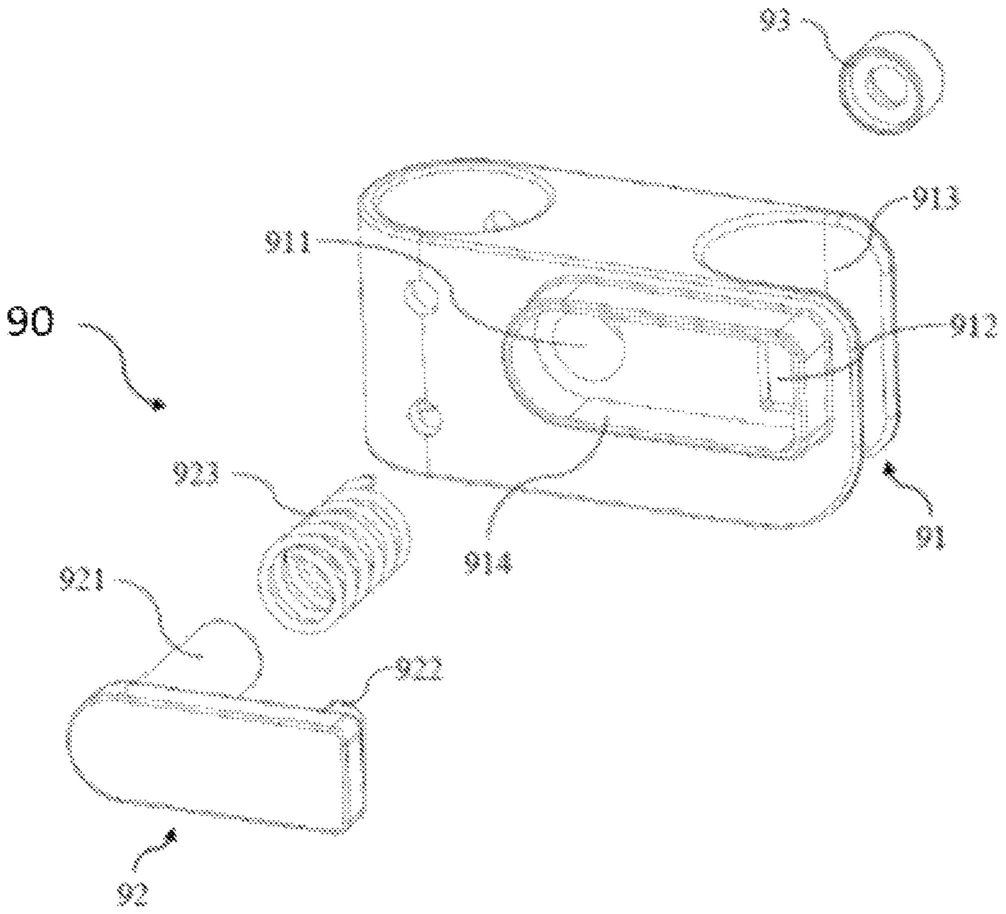
FIG. 29 is an enlarged exploded view of a first snap connector used in the ladder assembly illustrated in FIG. 28.
Figure 30:
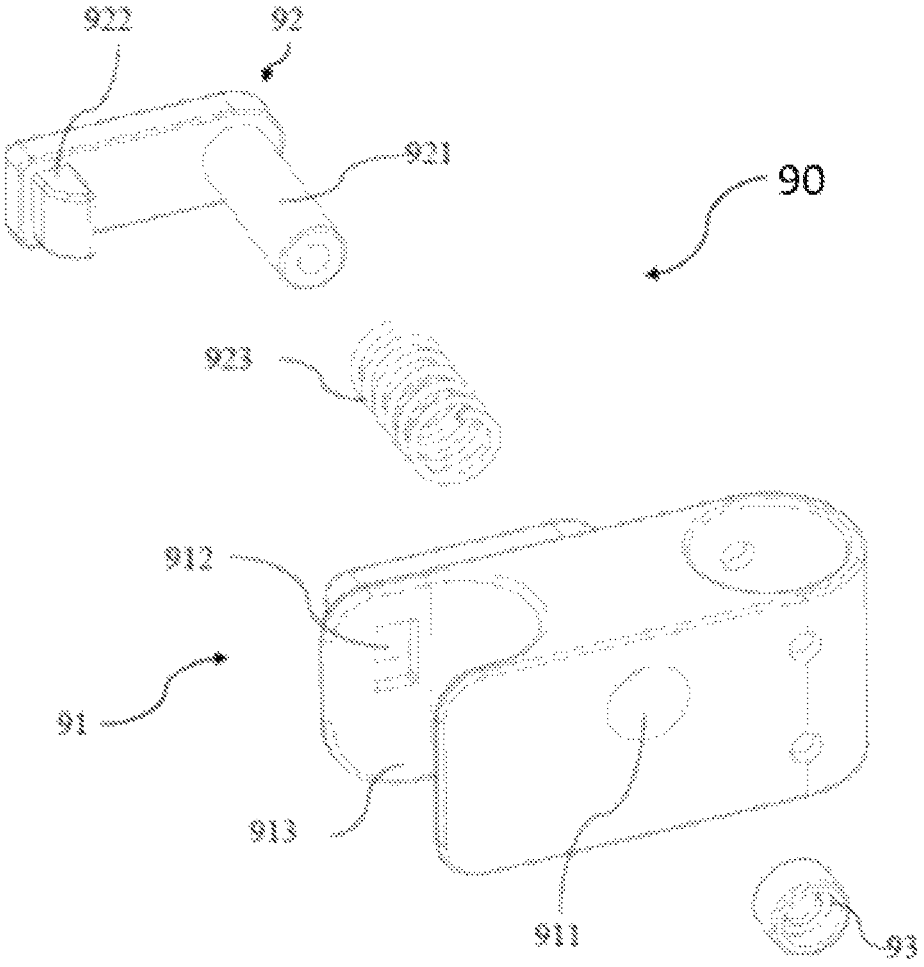
FIG. 30 is another exploded view of the first snap connector of FIG. 28 taken from another perspective.

As shown in FIGS. 29 and 30, a connector 90 similar to the previously described snap-fit coupler 140 is illustrated. The connector 90 includes a snap body 91, a movable member 92, and a button 93. The movable member 92 is disposed to the snap body 91 and includes a connecting shaft 921, a lug 922 and a spring 923. The lug 922 protrudes from the inner surface of the movable member 92, and the spring 923 is sleeved concentrically over the connecting shaft 921. The button 93 is operably connected to the movable member 92, for example, to the connecting shaft 921.

The snap body 91 is similar and/or identical to the embodiments shown in FIGS. 11 and 12 and includes a first channel 911, a second channel 912, and a snap channel 913 embedded therein. The connecting shaft 921 is adapted to be received in the first channel 911, and the lug 922 is adapted to be received in the second channel 912 and the snap channel 913. The snap body 91 further includes a housing portion 914 that protrudes from an outer surface of the snap body.

In the engaged configuration in which the snap connector 90 connects the second ladder portion 106 with the third ladder portion 110, the movable member 92 is located in the housing portion 914, at which time the connecting shaft 921 and the spring 923 are located in the first channel 911, and the lug 922 is located within second channel 912 and snap channel 913. When the lug 922 is located in the snap channel 913, the button 93 can drive the movable member 92, for example, pressing connection shaft displaces the movable member by the spring 923, so that the lug 922 withdraws from the snap channel such that the lug and the snap channel are in a withdrawn state. At this time, the first snap connector 90 can be separated from the second ladder portion 106. The third ladder portion 110 can then be switched between the operational position and the non-operational position by means of the connecting rod 80.

The second snap connector 190 has a position limiting groove (not shown) adapted to receive and fix the support rail 110A, 110B of the third ladder portion 110 to a corresponding support rail 106A, 106B of the second ladder portion 106. To establish a press-fit connection, the diameter of the opening portion of the position limiting groove is slightly less than the diameter of the support rail 106A, 106B of the second ladder portion 106, and the diameter of the inner hollow portion of the position limiting groove is approximately equal to the diameter of the support rail 106A, 106B of the second ladder portion 106. Accordingly, when the support rail of the third ladder portion 110 is applied with an external force to cause a corresponding support rail 106A, 106B of the second ladder portion 106 to be snapped into the position limiting groove, the opening portion of the position limiting groove limits the corresponding support rail 106A, 106B of the second ladder portion 106 to within the inner hollow portion of the position limit groove. As such, it is preferable that the snap connector 190 is at least partially flexible. In an alternative embodiment, the second snap connector 190 can also take other configurations to connect the lower portion of the third ladder portion 110 to the bridging portion 107.

Figure 32A:
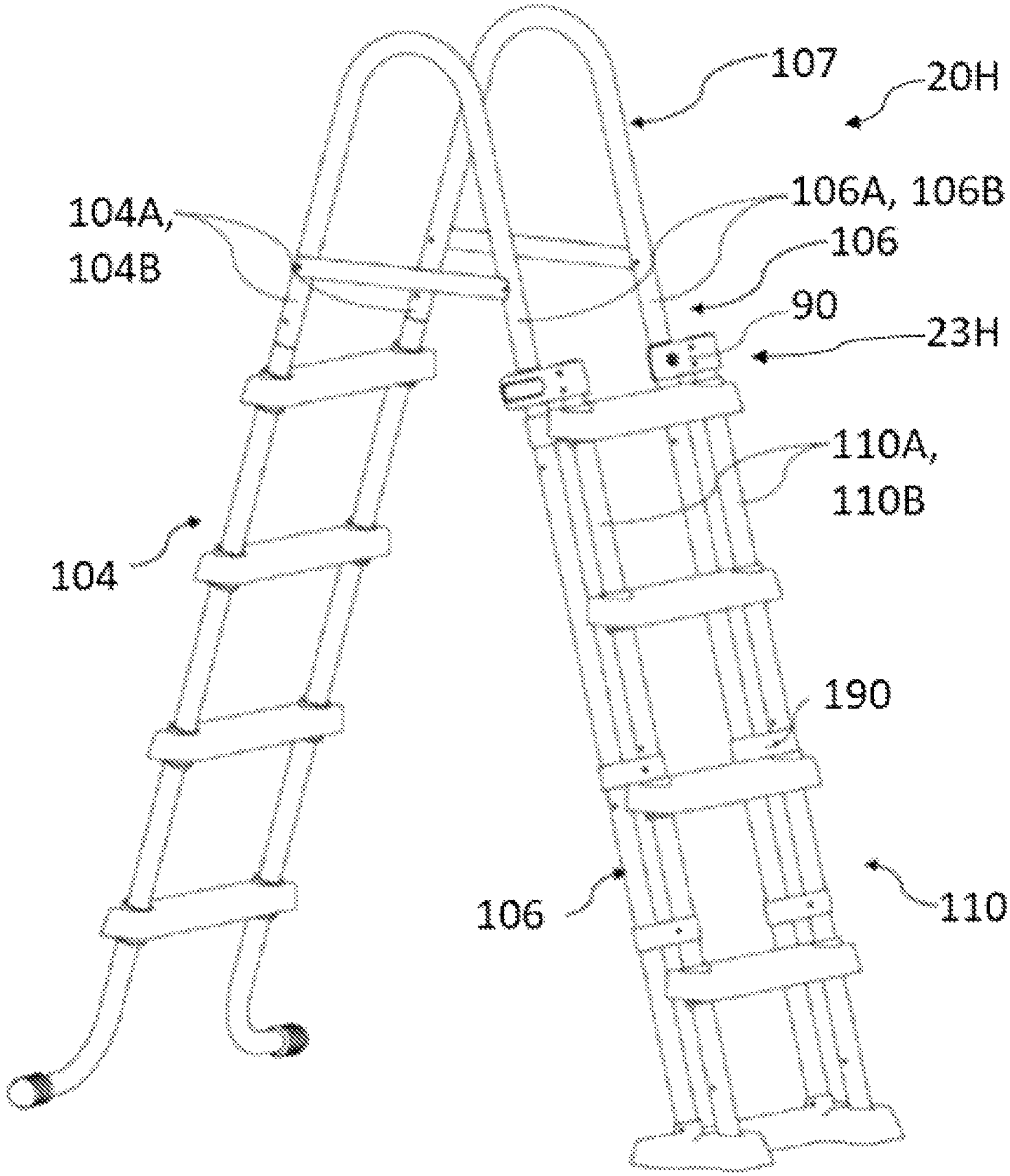
FIGS. 32A, 32B, and 32C each illustrate yet another embodiment of a ladder assembly and show a series of perspective views of a movable ladder portion of the ladder assembly moving from a first, operational position (FIG. 32A) to a second, non-operational position (FIG. 32C) and including an intermediary position (FIG. 32B) therebetween.
Figure 32B:
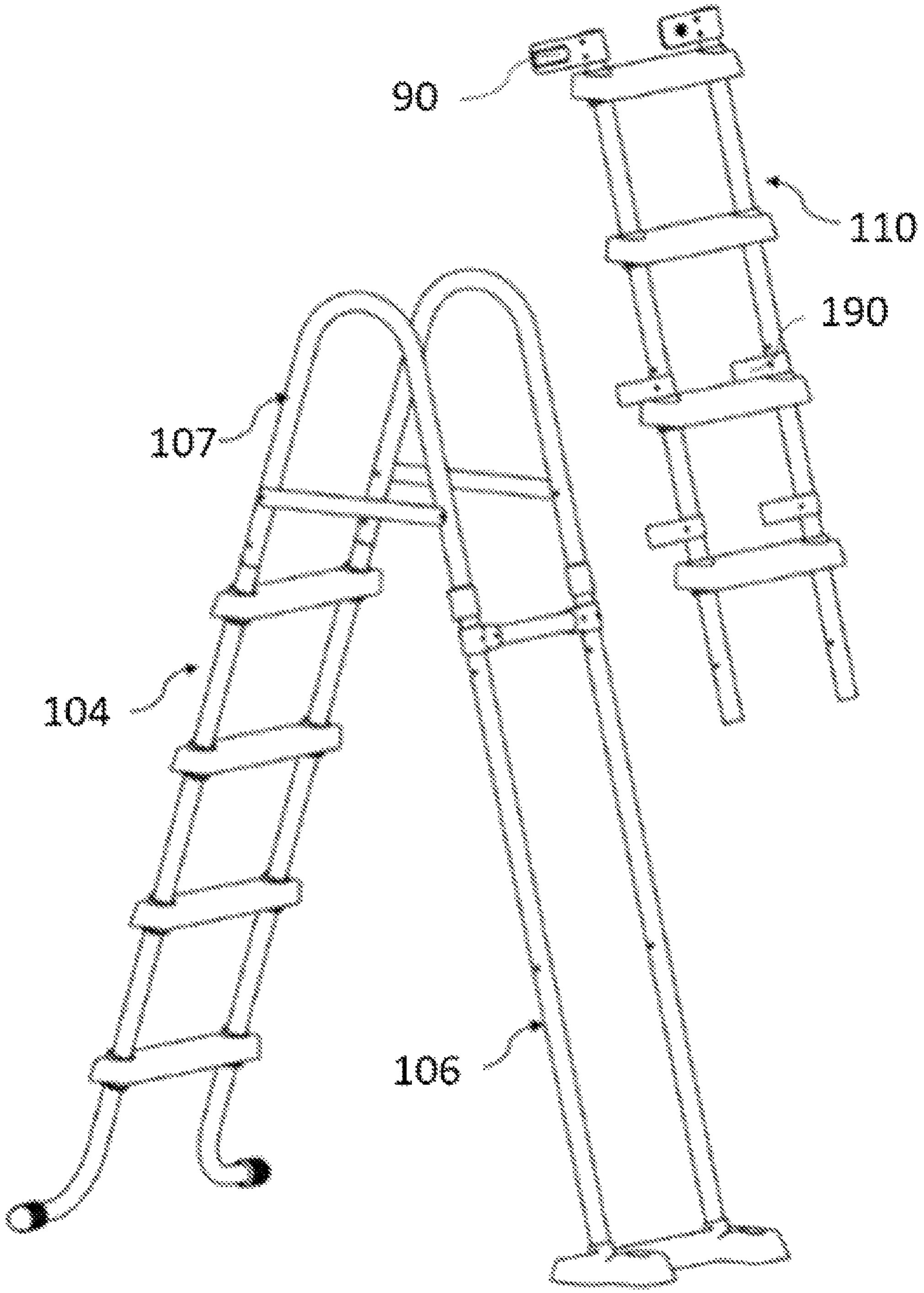
Figure 32C:
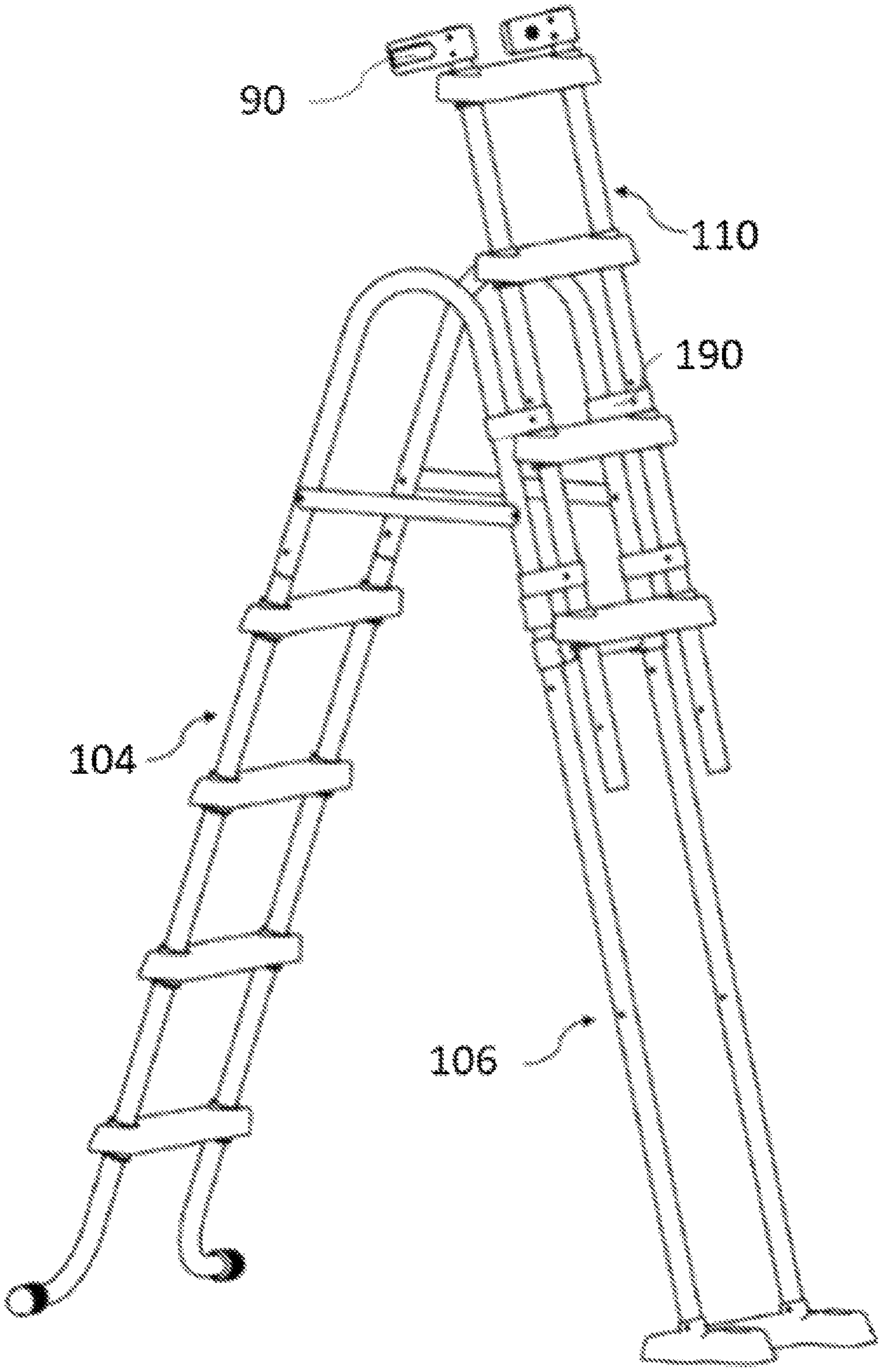

FIGS. 32A to 32C show a series of perspective views of a safety ladder assembly 20H with a connection mechanism 23H according to another exemplary embodiment of the present utility model. Except the main difference being that the provision of the connection rod is omitted (the third ladder portion 110 is connected to the second ladder portion 106 and the bridging portion 107 only by the first snap connector 90 and the second snap connector 190), the other configurations of third exemplary embodiment are the same as the other configurations of the second exemplary embodiment.

As shown in the figures, when it is required to be used, the third ladder portion 110 is in the operational position (i.e., the third ladder portion 110 is in a lower position, as shown in FIG. 32A), at which time the first snap connector 90 causes the second ladder portion 106 to be connected with the third ladder portion 110, and the user can climb the ladder with a plurality of steps of the third ladder portion 110. When it is not required to be used, the first snap connector 90 can be separated from the second ladder portion 106, and the third ladder portion 110 can be removed and switched from the operational position to the non-operational position (as shown in FIG. 32B, at this time, the third ladder portion 110 are located in the intermediary position, neither the first snap connector 90 nor the second snap connector 190 is connected), or vice versa, switched from the non-operational position to the operational position. When not in use, the third ladder portion 110 is in the non-operational position (i.e., as shown in FIG. 32C, that is, in a higher position), the second snap connector 190 connects the lower portion of the third ladder portion 110 to the bridging portion 107. Since the second ladder portion 106 is not provided with steps, the user cannot climb the ladder with the steps.

In accordance with certain embodiments of the present disclosure, a ladder assembly for a pool is presented. The ladder assembly comprises a ladder body that includes a first ladder portion 104 having a first pair of support rails 104A, 104B that is adapted to be placed inside the pool. The ladder assembly further comprises a second ladder portion 106 including a second pair of support rails 106A, 106B connected to the first pair of support rails 104A, 104B. The second ladder portion 106 is adapted to be placed outside the pool. A bridging portion 107 connects the first ladder portion 104 to the second ladder portion 106. The ladder assembly further comprises a third ladder portion 110 that includes a third pair of support rails 110A, 110B. A the third ladder portion 110 is movably connected to the second ladder portion 106 via a connection structure configured to allow the third ladder portion 110 to be switched between an operational position and a non-operational position. The connection structure fixedly connects the second ladder portion 106 with the third ladder portion 110 in the operational position to allow entry into the pool whereas in the non-operational position, an upper portion of the second ladder portion 106 is fixedly connected to a lower portion of the third ladder portion 110.

The connection mechanism includes a sliding member 50 (FIGS. 27A through 27C) that connects the second ladder portion 106 to the third ladder portion 110 and is configured to allow the third ladder portion 110 to slide between the operational position and the non-operational position along a length direction of the second ladder portion 106. The sliding member 50 comprises a sliding sleeve 51, the sliding sleeve 51 being sleeved on at least one of the second pair of support rails 106A, 106B, and being fixedly connected to a corresponding one of the third pair of support rails 110A, 110B. The connection structure further comprises a first sub-connection structure 65 (FIG. 21), the first sub-connection structure 65 includes a first male connector 61 and a first female connector 62. The first male connector 61 being located at the lower portion of the third ladder portion 110 and the first female connector 62 being located at the upper portion of the second ladder portion 106 such that when the third ladder portion 110 is in the non-operational position, the first male connector 61 and the first female connector 62 are engaged to connect the lower portion of the third ladder portion 110 to the upper portion of the second ladder portion 106. The first sub-connection structure 65 further comprises a position limiting member 63, the position limiting member 63 being located between the second ladder portion 106 and the third ladder portion 110, and being disposed at a lower portion of the first male connector 61 along a length direction of the third ladder portion 110. When the third ladder portion 110 is in the non-operational position, the position limiting member 63 is adapted to define a relative position of the first male connector 61 with the first female connector 62 such that the first male connector 61 engages and preferably is locked with the first female connector 62. It is preferably that the first male connector 61 and the position limiting member 63 are located at the upper portion of the sliding member 50 along a length direction of the third ladder portion 110, and the sliding member 50, the first male connector 61, and the position limiting member 63 are integrally formed.

As best shown in FIG. 23, the first female connector 62 includes a first face 621 with a first elongated slot 623 portion 623. The first elongated slot 623 portion 623 extends at least partially through the first face 621 and a second face 622. The second face 622 is perpendicular to the first face 621 and has a first engaging aperture 624 and a second engaging aperture 625. The first engaging aperture 624 and the second engaging aperture 625 extend through the second face 622 and the first elongated slot 623 portion 623. The first sub-connection structure 65 further comprises a fixing assembly 64 located on the first female connector 62, and when the third ladder portion 110 is in the non-operational position, the fixing assembly 64 is adapted to fix the first male connector 61 to the first female connector 62. The first male connector 61 has a first aperture 611.

Still referring to FIG. 23, the fixing assembly 64 comprises a first spring pin 641 adapted to engage with the first engaging aperture 624. The first spring pin 641 having an end defining a guiding surface. In a configuration where the first male connector 61 is located in the first elongated slot 623 to engage the first female connector 62, the first spring pin 641 passes through the first engaging aperture 624 and the first aperture 611 of the first male connector 61. When the first male connector 61 is applied with a force in a direction of the lower portion of the third ladder portion 110, the first male connector 61 compresses the first spring pin 641 along the guiding face of the first spring pin 641 until the first spring pin 641 is separated from the first aperture 611 of the first male connector 61, to separate the first male connector 61 from the first elongated slot 623. The first male connector 61 further has a second aperture 732. The fixing assembly 64 includes a second spring pin 642 adapted to engage with the second engaging aperture 625. In a configuration where the first male connector 61 is located in the first elongated slot 623 to engage the female connector, the second spring pin 642 is inserted into the second engaging aperture 625 and the second aperture 732 of the first male connector 61, so as to fix the first male connector 61 in the first elongated slot 623. The second spring pin 642 further includes a knob 6421, wherein the knob 6421 includes a protruding shaft 6422 and a position limiting rod 6423. The shaft 6422 is adapted to engage with the second engaging aperture 625. The fixing assembly 64 further includes a position limiting member 63, wherein the position limiting member 63 is disposed on the second face 622 of the first female connector 62 and the position of the position limiting member 63 corresponds to the second engaging aperture 625.

The position limiting member 63 comprises a movement limiting face 6431 formed on the position limiting member 63 and a position limiting slot 6432 extending through the movement limiting surface. In the engagement configuration, the position limiting rod 6423 is engaged with the position limiting slot 6432, and the shaft 6422 is located in the second aperture 732 of the first male connector 61 such that the first male connector 61 is locked in the first elongated slot 623. When the knob 6421 and the shaft 6422 are applied with a force to deviate the shaft 6422 away from the second aperture 732 of the first male connector 61, and then the knob 6421 is rotated to cause the position limiting rod 6423 to deviate from the position limiting slot 6432 such that the first male connector 61 separates from the first female connector 62 and the position limiting rod 6423 abuts against the movement limiting face 6431.

The connection structure further comprises a second sub-connection structure 70, the second sub-connection structure 70 comprising a second male connector 71 and a second female connector 72. The second male connector 71 is located at the upper portion of the third ladder portion 110, and the second female connector 72 is located at the upper portion of the second ladder portion 106 to fix the upper portion of third ladder portion 110 (movable ladder portion) to the upper portion of the second ladder portion 106 when the third ladder portion 110 is in the operational position. The second female connector 72 has a second elongated slot 721 and a movement restricting member 722. In an configuration where the second male connector 71 and the second female connector 72 are engaged, the movement restricting member 722 restricts the movement of the second male connector 71 in the second elongated slot 721, so as to prevent movement of the third ladder portion 110 relative to the second ladder portion 106. The second sub-connection structure 70 further comprises a third male connector 73 adapted to engage the first female connector 62 such that when the third ladder portion 110 is in the operational position, the upper portion of the third ladder portion 110 is connected to the upper portion of the second ladder portion 106. The third male connector 73 has a first aperture 611. The fixing assembly 64 includes a first spring pin 641 adapted to engage with the first engaging aperture 624, the first spring pin 641 having an end defining a guiding face. In a configuration where the third male connector 73 is located in the first elongated slot 623 to engage the first female connector 62, the first spring pin 641 passes through the first engaging aperture 624 and the first aperture 611 of the third male connector 73. When the third male connector 73 is applied with a force in a direction of the lower portion of the third ladder portion 110, the third male connector 73 compresses the first spring pin 641 along the guiding face of the first spring pin 641 until the first spring pin 641 is separated from the first aperture 611 of the third male connector 73, to separate the third male connector 73 from the first elongated slot 623. The third male connector 73 has a second aperture 732.

As shown in FIG. 23, the fixing assembly 64 can include a second spring pin 642 adapted to engage with the second engaging aperture 625. In a configuration where the third male connector 73 is located in the first elongated slot 623 to engage the first female connector 62, the second spring pin 642 is inserted into the second engaging aperture 625 and the second aperture 732 of the third male connector 73 to fix the third male connector 73 in the first elongated slot 623. The second spring pin 642 includes a knob 6421, wherein the knob 6421 includes an protruding shaft 6422 and a position limiting rod 6423, the shaft being adapted to engage with the second engaging aperture 625. The fixing assembly 64 further includes a position limiting member 63, wherein the position limiting member 63 is disposed on the second face 622 of the first female connector 62 and the position of the position limiting member 63 corresponds to the second engaging aperture 625. The position limiting member 63 comprises a movement limiting face 6431 formed on the position limiting member 63. A position limiting slot 6432 extends through the movement limiting surface. In the engagement configuration, the position limiting rod 6423 is engaged with the position limiting slot 6432, and the shaft is located in the second aperture 732 of the third male connector 73 such that the third male connector 73 is locked in the first elongated slot 623. When the knob 6421 and the shaft are applied with a force to deviate the shaft away from the second aperture 732 of the third male connector 73, and then the knob 6421 is rotated to cause the position limiting rod 6423 to deviate from the position limiting slot 6432 such that the third male connector 73 separates from the first female connector 62, the position limiting rod 6423 abuts against the movement limiting face 6431.

In other various embodiments, the connection structure includes a connecting rod 80 (FIGS. 28 through 31C) movably connecting the second ladder portion 106 with the third ladder portion 110. Further, the connection structure can include a first snap connector 90, the first snap connector 90 detachably connecting the second ladder portion 106 with the third ladder portion 110 when the third ladder portion 110 is in the operational position. The first snap connector 90 comprises a snap body 91 and a movable member 92 disposed to the snap body 91. A connecting shaft 921, a lug 922 protruding from an inner surface of the movable member 92. A spring 923 is sleeved concentrically over the connecting shaft 921, and a button 93 operably connected to the movable member 92. The snap body 91 includes a first channel 911, a second channel 912 and a snap channel 913 embedded therein. The connecting shaft 921 is adapted to be received in the first channel 911, and the lug 922 is adapted to be received in the second channel 912 and the snap channel 913. When the lug 922 is located in the snap channel 913, the button 93 can drive the movable member 92 to withdraw the lug 922 from the snap channel 913 such that the lug 922 and the snap channel 913 are in a withdrawn state. The snap body 91 includes a housing portion 914 protruding from an outer surface of the snap body 91. In a configuration where the snap connector 90 connects the second ladder portion 106 to the third ladder portion 110, the movable member 92 is located in the housing portion 914. The connecting shaft 921, and the spring 923 are located in the first channel 911, and the lug 922 is located in the second channel 912 and the snap channel 913. The third ladder portion 110 is adapted to be switched between the operational position and the non-operational position when the first snap connector 90 is separated from the second ladder portion 106. The connection structure further comprises a second snap connector 190, the second snap connector 190 connecting the lower portion of the third ladder portion 110 to the bridging portion 107 when the third ladder portion 110 is in the non-operational position.

As described above, for any sliding or rotational movement a dampening member 25A, 25B, 25C as described herein may be utilized for cause friction between movable members and increase the force necessary to move the third or movable ladder portion relative to the above-ground pool and/or other portion of the ladder assembly.

While various modifications and implementations are possible in view of the present disclosure, many of the embodiments are directed to a ladder assembly for a pool, comprising a ladder body and a connection mechanism. The ladder body comprises a first ladder portion 104 comprising a first pair of support rails 104A, 104B and adapted to be placed inside the pool. A second ladder portion 106 includes a second pair of support rails 106A, 106B connected to the first pair of support rails and adapted to be placed outside the pool. A bridging portion 107 connects the first ladder portion 104 with the second ladder portion 106. A third ladder portion 110 includes a third pair of support rails 110A, 110B and movably connected to the second ladder portion 106. The connection mechanism is configured to allow the third ladder portion 110 to be switched between an operational position and a non-operational position. In the operational position, the connection structure fixedly connects the second ladder portion 106 with the third ladder portion 110. In the non-operational position, and in the non-operational position, an upper portion of the second ladder portion 106 is fixedly connected to a lower portion of the third ladder portion 110. The ladder assembly of the utility model is simple in structure and is convenient to operate.

Figure 33:
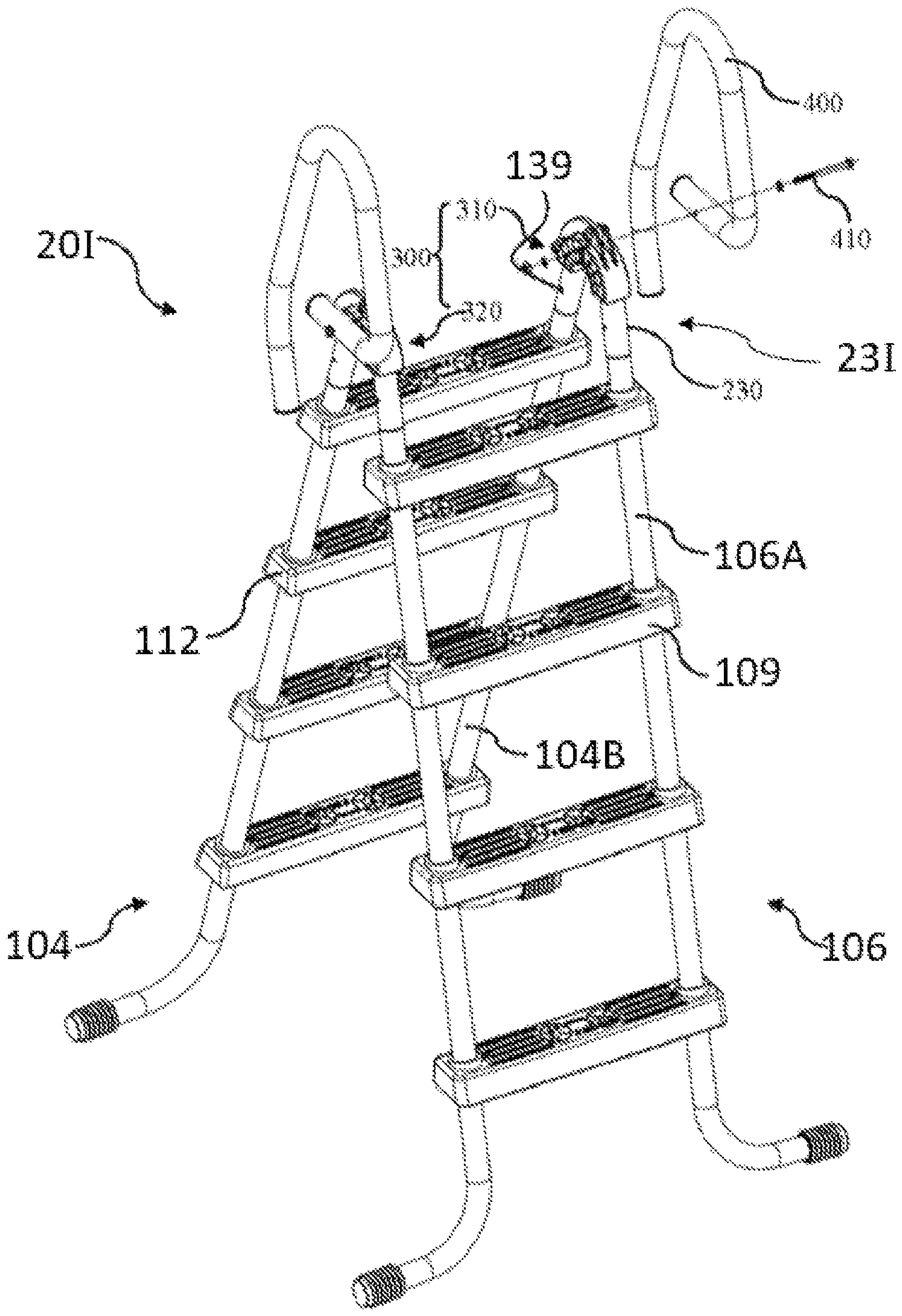
FIG. 33 is an perspective view of a ladder assembly, according to yet another embodiment of the present disclosure and including a connection mechanism having connecting armrests.

Looking now to FIG. 33, another embodiment of the safety ladder assembly 20I and connection mechanism 23I is shown. Although the ladder assembly 20I of the present invention can be implemented in various ways, the exemplary embodiments will be described in detail herein with reference to the accompanying drawings. It should be understood that the description herein should be considered as an exemplary illustration of the structural principle of the ladder assembly 20I, and should not intend to limit the main aspects herein to the exemplary embodiments.

Figure 36:
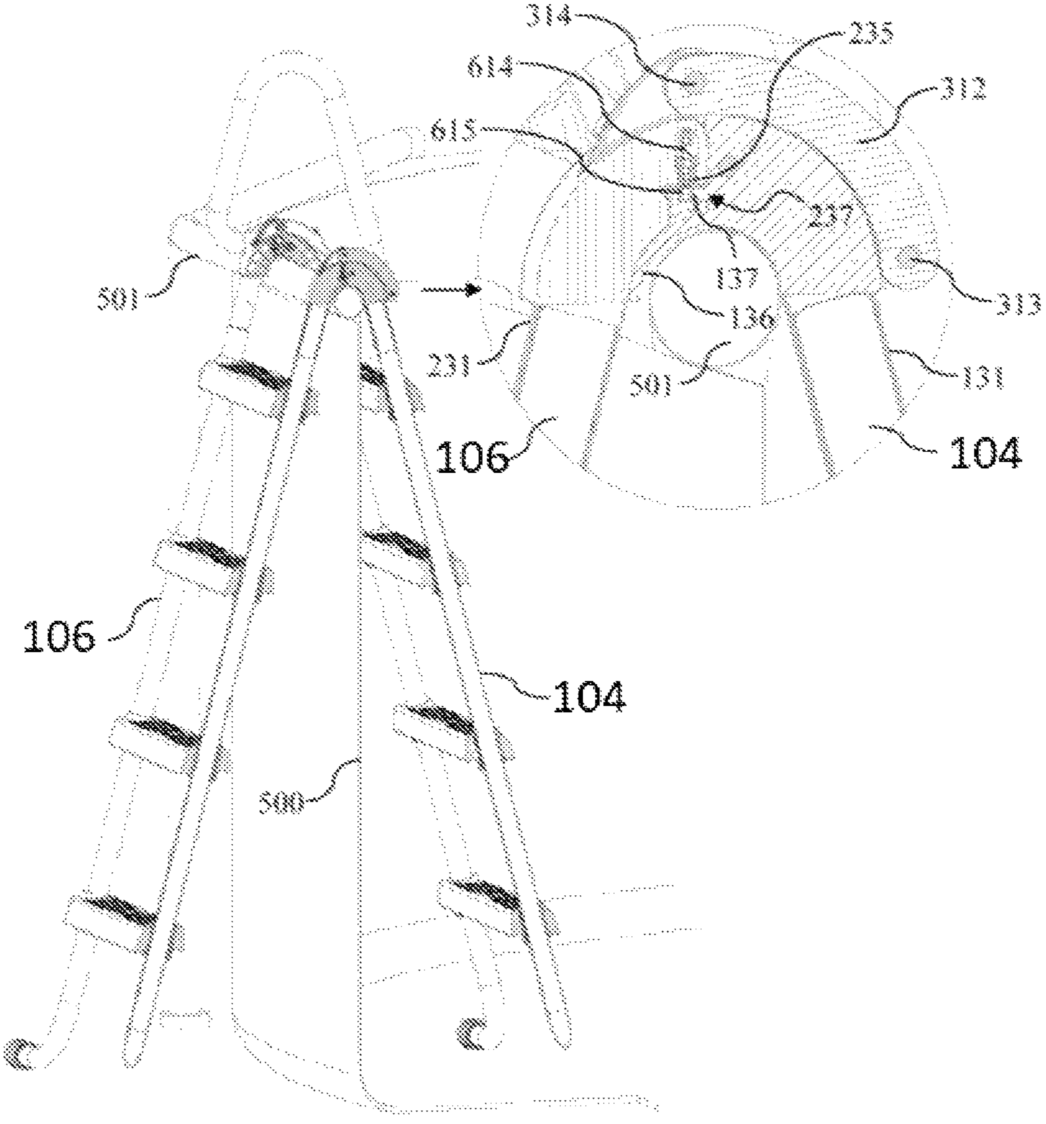
FIG. 36 is a perspective view and a partial enlarged cross-sectional view showing the ladder assembly of FIG. 33.
Figure 37:
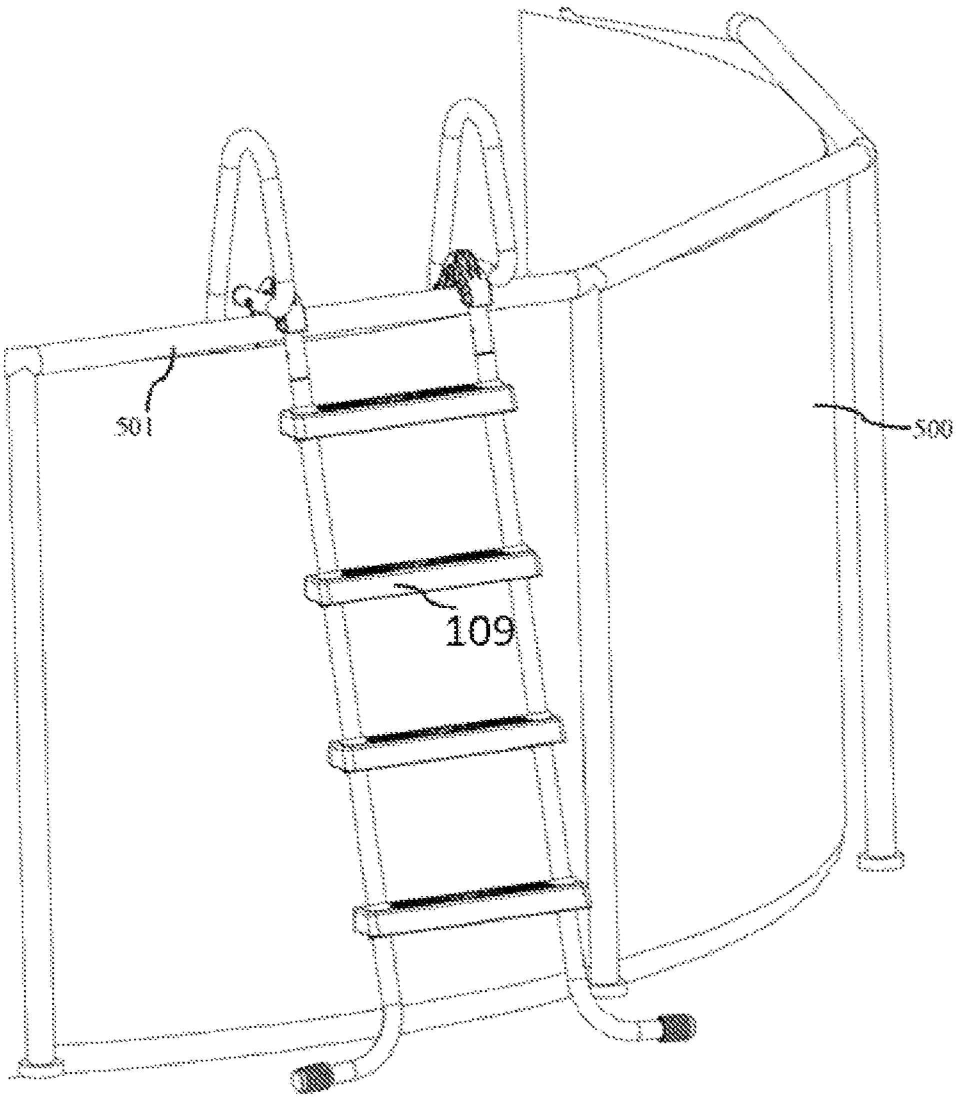
FIG. 37 is a perspective view showing the ladder assembly of FIG. 33 in a first, operational position.
Figure 38:
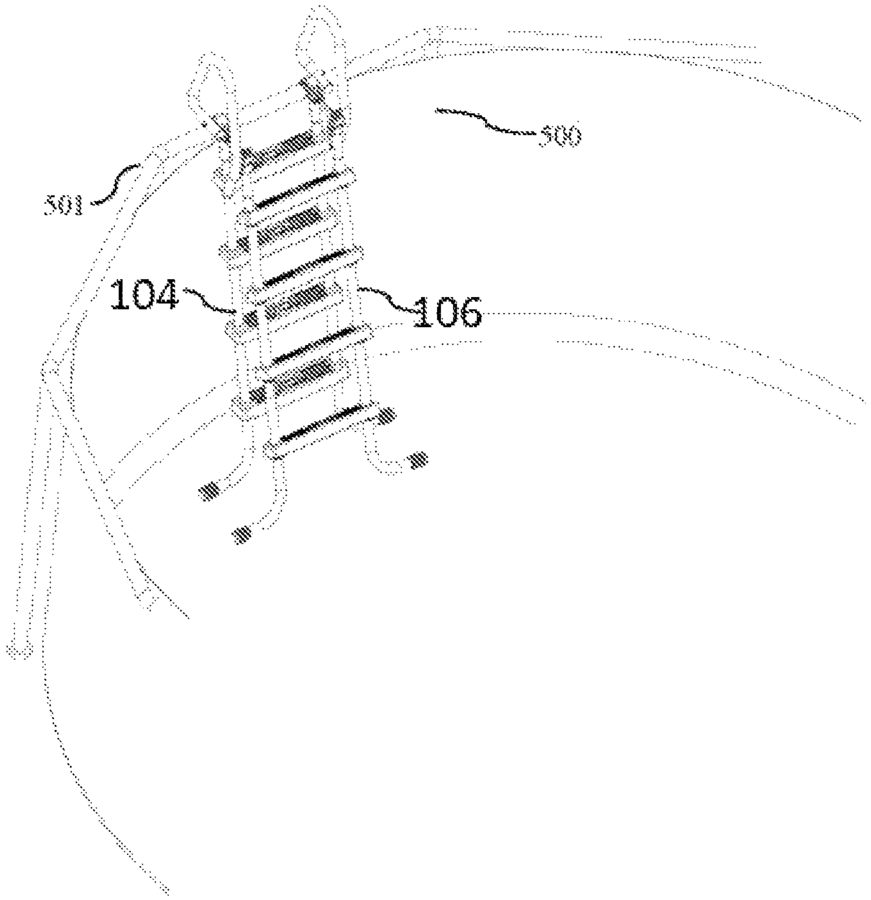
FIG. 38 is a perspective view showing the ladder assembly of FIG. 33 in a second, non-operational (or safety) position.

In one embodiment of the present invention, the ladder assembly 20I suitable for use in a pool includes a first ladder portion 104 or an inner ladder portion 104 and a second ladder portion 106 or an outer ladder portion 106. The first ladder portion 104 can be secured to a transverse frame 501 at the top of the wall 500 of the pool and located in the inner side or interior of the pool. The second ladder portion 106 is configured to have a use state and a safety state. In the use state or operational state, as shown in FIGS. 36 and 37, the second ladder portion 106 is fixed at the outer side or outside of the pool, and is available for the user to enter into and exit out of the pool. In the safety state or non-operational position, as shown in FIG. 38, the second ladder portion 106 is fixed at the inner side of the pool to prevent the user from entering the pool, and in particular to prevent the children from climbing without permission.

In the present embodiment, as shown in FIG. 33, the second ladder portion 106 may be connected to the first ladder portion 104 by a connection mechanism 23I that includes a rotating structure 300. The rotating structure 300 is disposed between the first ladder portion 104 and the second ladder portion 106 and is configured to enable the second ladder portion 106 to be completely turned to the inner side of the pool from the outside of the pool. In the non-operational position, the second ladder portion 106 is arranged in parallel with the first ladder portion 104 and supported at the bottom of the pool (as shown in FIG. 38). In the operational position, the second ladder portion may be flipped about a first axis to the outer side of the pool from the inner side of the pool (as shown in FIG. 37).

The structure of the ladder assembly 20I will be specifically described below with reference to FIGS. 33 through 36. As shown in FIG. 33, the first ladder portion 104 comprises two vertical rails or rods 104A, 104B parallel to each other and placed vertically and a plurality of steps 112 horizontally connected between the two vertical rods 104A, 104B. The second ladder portion 106 comprises two vertical rods 106A, 106B parallel to each other and placed vertically and a plurality of steps 109 horizontally connected between the two vertical rods 106A, 106B. The upper end portions of the first ladder portion 104 and the second ladder portion 106 are connected by the rotating structure 300. In particular, an upper end portion 139 of one vertical rod 104A, 104B is connected to an upper end portion 230 of one vertical rod 106A, 106B by a first rotating substructure 310, and an upper end portion 139 of the other vertical rod 104A, 104B is connected to an upper end portion 230 of the other vertical rod 106A, 106B by a second rotating substructure 320. The first rotating substructure 310 and the second rotating substructure 320 have the same configuration, and both are configured such that the vertical rods 104A, 104B, 106A, 106B can rotate relative to the first rotating substructure 310 and the second rotating substructure 320 about the first axis. In other words, the rotating structure 300 comprises the first rotating substructure 310 and the second rotating substructure 320. In an alternative embodiment, the rotating structure 300 can comprise any one of the first rotating substructure 310 and the second rotating substructure 320.

Figure 34A:
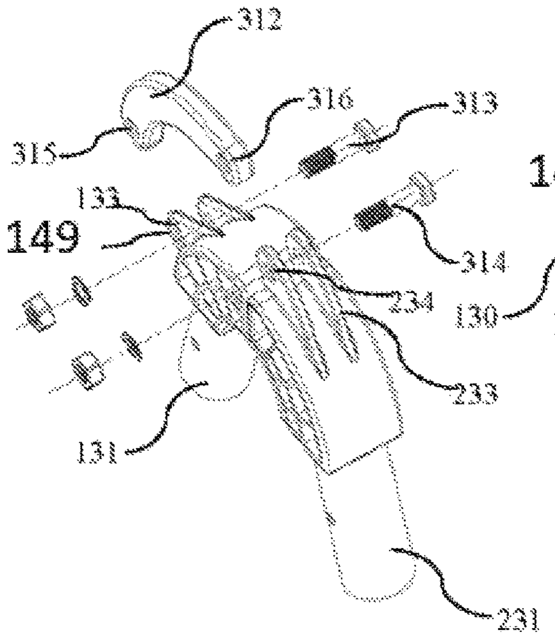
FIG. 34A is an exploded view showing the connection relationship between a rotating structure and a top of the ladder assembly, according to the ladder assembly embodiment illustrated in FIG. 33.
Figure 34B:
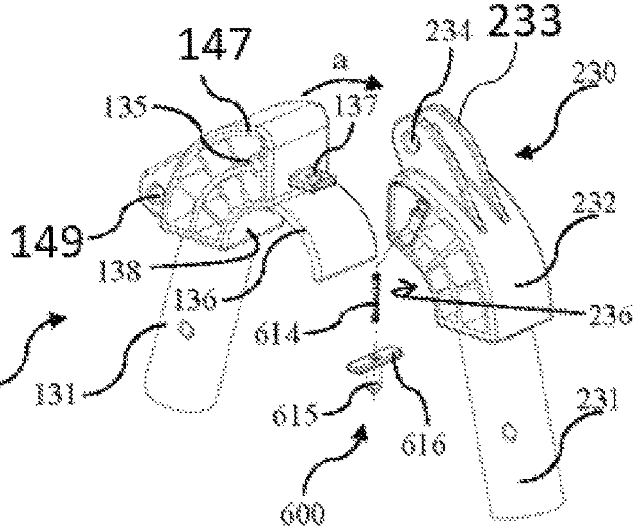
FIG. 34B is an exploded view showing the connection relationship between an upper end portion of a first ladder portion and an upper end portion of a second ladder portion, according to the ladder assembly in FIG. 33.

In the present embodiment, as shown in FIGS. 34A, 34B, and 36, in the first ladder portion 104, the upper end portion 139 on the upper end of the vertical rod 104A, 104B may have a sleeve portion 131 which is fitted over the vertical rod 104A, 104B. In other words, the vertical rods 104A, 104B may be inserted into the sleeve portion 131. Optionally, a bolt may pass through and protrude from a hole provided in the sleeve portion 131 and a corresponding hole provided in the vertical rod 104A, 104B, and the protruding portion is engaged and fixed with a nut to secure the upper end portion 139 to the vertical rod 104A, 104B. As previously discussed, the various dampening members 25A, 25B, and 25C may be incorporated and/or attached to the hole or bolt to increase rotational friction and thus increase the force necessary to move the second or movable ladder portion 106. In an alternative embodiment, the upper end portion 139 can be integrally formed with the vertical rod 104A, 104B or can be integrally connected by other connection means. As shown in FIG. 34B, in the upper end portion 139, a curved portion 147 is curved in a direction indicated by an arrow "a" that extends over the sleeve portion 131. Two projections 133 extend from one end of the upper surface of the curved portion 147 close to the sleeve portion 131. Each projection 133 is provided with a shaft hole 149, and the other end of the curved portion 147 is provided with a through hole 135. As shown in FIG. 33, the ladder assembly 20I comprises an armrest 400 at the top of the first ladder portion 104. Specifically, a bolt 410 passes through a through hole in the armrest 400 and the through hole 135 of the curved portion 147 to engage with a nut so as to secure the armrest 400 to the top of the first ladder portion 104. Alternatively, the armrest 400 can be omitted or the armrest 400 can be directly secured to the top of the wall 500 of the pool. In the upper end portion 139, an extension portion 136 extends from a bottom portion 138 of the curved portion 147, and the extension portion 136 is continuous with the bottom portion 138 to form a hook shape, as shown in FIG. 36. Such hook shape structure is adapted to be hung on the transverse frame 501 at the top of the wall 500 of the pool to secure the first ladder portion 104 to the wall 500 of the pool. In the upper end portion 139, a pin hole 137 is protruded and disposed in a side surface of the curved portion 147 above the extension portion 136.

Figure 35A:
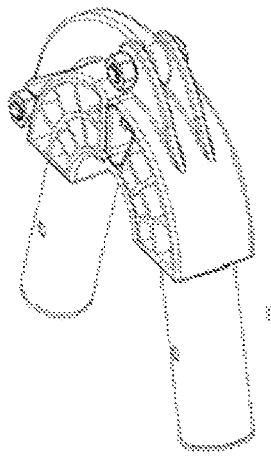
FIG. 35A is a perspective view showing the upper end portion of the first ladder portion and the upper end portion of the second ladder portion which are connected together, according to the ladder assembly shown in FIG. 33.
Figure 35B:
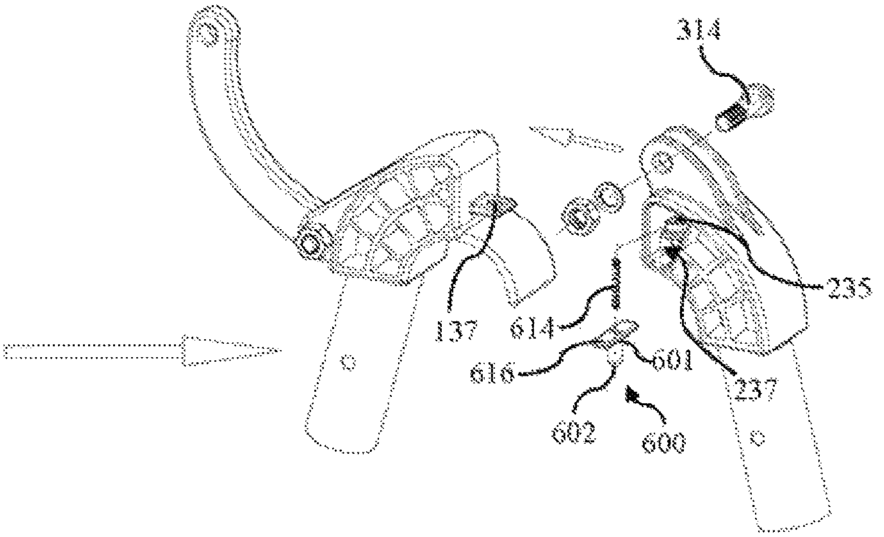
FIG. 35B is an exploded view showing the structure of a spring pin used with the ladder assembly shown in FIG. 33.

Also, as shown in FIGS. 34A, 34B, and 36, in the second ladder portion 106, the upper end portion 230 on the upper end of the vertical rod 106A, 106B also has a sleeve portion 231 which is fitted over the vertical rod 106A, 106B, that is, the vertical rod 106A, 106B is inserted into the sleeve portion 231. Optionally, the upper end portion 230 can be secured to the vertical rod 106A, 106B via a bolt passing through a hole in the sleeve portion 231 and a corresponding hole in the vertical rod 106A, 106B together with a nut. In an alternative embodiment, the upper end portion 230 may be integrally formed with the vertical rod 106A, 106B or integrally connected by other connection manners. In the upper end portion 230, an curved portion 232 curved in a direction opposite to the direction indicated by the arrow a extends over the sleeve portion 231, that is, the curved portion 232 is combined with the curved portion 232 to constitute an arch shape, as shown in FIG. 35A. In the upper end portion 230, two projections 233 extend from one end of the upper surface of the curved portion 232 opposite to the sleeve portion 231. Each projection 233 is provided with a shaft hole 234, and the interior of the curved portion 232 is provided with a mounting hole 235 (as shown in FIG. 35B) below the two projections 233. In the upper end portion 230, a bottom portion 236 of the curved portion 232 has a shape that matches the extension portion 136, so that the upper end portion 230 can be properly mated with the upper end portion 139 when the ladder assembly 20I is in the use state, and forms a substantially arch shape, as shown in FIGS. 35A and 36. The arch structure is just locked on the transverse frame 501 of the wall 500 of the pool, thus it is helpful to stably secure the first ladder portion 104 and the second ladder portion 106 to the wall 500 of the pool.

As best shown in FIGS. 34A through 35B, the connection mechanism 23I may comprise any one of the first rotating substructure 310 and the second rotating substructure 320, which both have the same configuration. Therefore, as shown in FIGS. 34A, 34B, the first rotating substructure 310 will be described as an example. The first rotating substructure 310 can comprise a connecting member 312, a first rotating shaft 313 and a second rotating shaft 314. Two ends of the connecting member 312 have a first shaft hole 315 and a second shaft hole 316, respectively. The first rotating shaft 313 is adapted to pass through the first shaft hole 315 and the shaft hole 149 in the upper end portion 139 of the vertical rod 104A, 104B of the first ladder portion 104, thereby rotatably connecting the connecting member 312 with the vertical rod 104A, 104B of the first ladder portion 104. The second rotating shaft 314 is adapted to pass through the second shaft hole 233 and the shaft hole 234 in the upper end portion 230 of the vertical rod 106A, 106B of the second ladder portion 106, thereby rotatably connecting the connecting member 312 with the vertical rod 106A, 106B of the second ladder portion 106. The first rotating shaft 313 and the second rotating shaft 314 may be a bolt that is fixed by a locking nut. In an alternative embodiment, the first rotating shaft 313 and the second rotating shaft 314 can be any mechanical connection mechanism that can be used for pivotal connections. The rotational and/or pivotal movement can be encumbered via adoption of various afore described dampening members 25A, 25B, 25C.

In the ladder assembly 20I, the second ladder portion 106 (or movable ladder portion) is rotated about the second rotating shaft 314 relative to the connecting member 312. The connecting member 312 is rotated about the first rotating shaft 313 relative to the first ladder portion 104, thereby enabling the ladder assembly 20I to be switched from the use state as shown in FIGS. 36 and 37 to the safety state as shown in FIG. 38. In other words, the second ladder portion 106 is turned to the inner side of the pool from the outer side of the pool. Additionally, the ladder assembly 20I can be switched from the safety state as shown in FIG. 38 to the use state as shown in FIGS. 36 and 37, wherein the second ladder portion 106 is turned to the outer side of the pool from the inner side of the pool.

In certain embodiments, in order to prevent the second ladder portion 106 (movable ladder portion) from moving during use, the ladder assembly 20I further comprises a first fixing mating member and a second fixing mating member cooperated with each other. The first and second fixing members must be actuated in order to rotate the second ladder portion. The first fixing mating member includes the pin hole 137 protruded and disposed in the upper end portion 139 of the first ladder portion 104. The pin hole 137 or female locking member corresponds to the second fixing mating member (or male locking member) that includes a spring pin 600 disposed in the mounting hole 235 of the upper end portion 230 of the second ladder portion 106. When the female locking member and the male locking member are engaged, the second ladder portion 106 can be fixed at the outer side of the pool to prevent the second ladder portion 106 from moving when in use. Specifically, as shown in FIGS. 35B and 36, the bottom of the mounting hole 235 of the upper end portion 230 of the second ladder portion 106 has an opening 237 overlapping pin hole 137.

In use, when the upper end portion 139 of the first ladder portion 104 and the upper end portion 230 of the second ladder portion 106 are joined, the pin hole 137 defined in the upper end portion 139 is adapted to be located in the opening 237, and the spring pin 600 is adapted to be inserted into the pin hole 137, thereby securing the first ladder portion 104 and the second ladder portion 106. As shown in FIGS. 34A, 35A, and 36, the spring pin 600 comprises a rod 615 disposed in the mounting hole 235 in the upper end of the second ladder portion 106. Referring to FIGS. 35B and 36, the rod 615 may be a hollow structure and have a base 601 and an end portion 602. A handle 616 is attached to the base 601 and protrudes from the side of the mounting hole 235. A spring 614 is accommodated in the hollow interior of the rod 615, wherein one end of the spring 614 abuts against the inner wall of the mounting hole 235, and the other end abuts against the interior of the rod 615 via the opening of the base 601. When the second ladder portion 106 is turned to the outer side of the pool by the rotating structure 300, the end portion 602 of the rod 615 is inserted into the pin hole 137, thereby preventing horizontal movement of the second ladder portion 106. When it is necessary to turn the second ladder portion 106 to the inner side of the pool from the outer side of the pool, the user lifts the handle 616 to disengage the rod 615 from the pin hole 137 against the spring force of the spring 614, thereby allowing the second ladder portion 106 to be rotate about a first axis. In an alternative embodiment, the rod 615 can be a solid rod and the spring 614 can directly abut against the base 601 of the rod 615. In an alternative embodiment, the structure formed by the spring pin 600 and the pin hole 137 may be replaced by a snap-fit structure as previously described.

According to another embodiment of the present invention, the rotating structure connecting the first ladder portion 104 and the second ladder portion 106 may comprise at least one flexible connecting member wherein one end of the flexible connecting member is connected to the first ladder portion 104 and the other end is connected to the second ladder portion 106. For example, the flexible connecting member may comprise at least one of a strap, a string and a chain. The flexible connecting member may increase the force necessary to move second ladder portion 110 between positions, via biasing in one or more directions.

According to still another embodiment of the present invention, the upper end portion of the second ladder portion 106 has a connection structure adapted to be detachably connected to the top of the wall of the pool at the outer side of the wall of the pool and the second ladder portion 106 has a connection structure adapted to be detachably connected to the first ladder portion 104 at the inner side of the wall of the pool.

According to still another embodiment of the present invention, the upper end portion of the second ladder portion 106 has a connection structure adapted to be detachably connected to the armrest 400 at the outer side of the wall of the pool. The upper end portion of the second ladder portion 106 has a connection structure adapted to be detachably connected to the armrest 400 at the inner side of the wall of the pool, or the second ladder portion 106 has a connection structure adapted to be detachably connected to the first ladder portion 104 at the inner side of the wall of the pool.

In one embodiment of the ladder assembly illustrated in FIGS. 33 through 38, the invention provides a ladder assembly 20I for a pool, wherein the ladder assembly 20I comprises a first ladder portion 104 adapted to be disposed at a first side of a wall of the pool and an upper end portion of the first ladder portion 104 being adapted to be secured to a top of the wall of the pool via mechanical connection or connection via gravitational weight of the assembly. The ladder assembly 20I further includes a second ladder portion 106 adapted to be disposed at the first side of the wall of the pool when not in use and be disposed at a second side of the wall of the pool when in use, the second side being an opposite side of the first side. The ladder assembly 20I can further include a rotating structure 300, wherein the rotating structure 300 connects the first ladder portion 104 and the second ladder portion 106, and is configured to enable the second ladder portion to switch between the first side and the second side of the wall of the pool relative to the first ladder portion. The rotating structure 300 comprises at least one flexible connecting member 312, wherein one end of the flexible connecting member 312 is connected to the first ladder portion 104 and the other end is connected to the second ladder portion 106 (FIG. 34A). The flexible connecting member 312 can include at least one of a strap, a string, or a chain. The rotating structure 300 may further include a first rotating substructure 310 having one end pivotally connected to an upper end of a first vertical rod 104A, 104B of the first ladder portion 104 and the other end pivotally connected to an upper end of a first vertical rod 106A, 106B of the second ladder portion 106 (movable ladder portion). The rotating structure 300 may further yet include a second rotating substructure 320 having one end pivotally connected to an upper end of a second vertical rod 104A, 104B of the first ladder portion 104 and the other end pivotally connected to an upper end of a second vertical rod 106A, 106B of the second ladder portion 106.

The first rotating substructure 310 and the second rotating substructure 320 may further respectively comprise a connecting member 312 having a first shaft hole 315 at one end and a second shaft hole 316 at the other end. A first rotating shaft 313 is provided that is adapted to pass through the first shaft hole 315 and a through hole 135 provided in the first vertical rod 104A and/or the second vertical rod 104B of the first ladder portion 104 to pivotally connect the connecting member 312 with the first vertical rod and/or the second vertical rod of the first ladder portion 104. A second rotating shaft 314 is further provided that is adapted to pass through the second shaft hole 316 and a through hole 135 provided in the first vertical rod 106A and/or the second vertical rod 106B of the second ladder portion 106 to pivotally connect the connecting member 312 with the first vertical rod 106A and/or the second vertical rod 106B of the second ladder portion 106. The ladder assembly 20I may further include an armrest 400 adapted to be secured to the upper end portion of the first ladder portion 104 or the top of the wall. Any one of the previously described dampening members 25A, 25B, 25C may be included to increase friction between rotating parts, namely shafts 313 and 314.

The ladder assembly 20I may further include an upper end portion 230 of the second ladder portion 106 that has a connection structure or connection mechanism 23I that is adapted to be detachably connected to the top of the wall of the pool at the second side of the wall of the pool. The second ladder portion 106 has a connection structure or adapted to be detachably connected to the first ladder portion 104 at the first side of the wall of the pool. For example, the second ladder portion 106 may be completely removed and stored elsewhere when not in use.

As best shown in FIG. 33, the ladder assembly 20I may further yet include an armrest 400 adapted to be secured to the upper end portion 139 of the first ladder portion 104 or the top of the wall. The upper end portion 230 of the second ladder portion 106 has a connection structure adapted to be detachably connected to the armrest 400 at the second side of the wall of the pool. The upper end portion 230 of the second ladder portion 106 has a connection structure adapted to be detachably connected to the armrest 400 at the first side of the wall of the pool and/or the second ladder portion 106 has a connection structure adapted to be detachably connected to the first ladder portion 104 at the first side of the wall of the pool.

The upper end portion 139 of the first ladder portion 104 may further be configured as a hook shape adapted to be hung on the top of the wall of the pool to secure the first ladder portion 104 to the top of the wall of the pool (FIG. 33). The upper end portion 139 of the first ladder portion 104 has a first fixing mating member, and an upper end portion of the second ladder portion 106 has a second fixing mating member. The first fixing mating member is mated with the second fixing mating member to prevent the second ladder portion 106 from moving during use when the second ladder portion 106 is in an operational position. The first fixing mating member includes a pin hole 137 provided in the upper end portion 139 of the first ladder portion 104 and the second fixing mating member includes a spring pin 600 provided in the upper end portion of the second ladder portion 106. The spring pin 600 may comprise a rod 615 mounted in a mounting hole of the upper end portion of the second ladder portion 106. A best shown in FIGS. 34B and 35B, the rod 615 includes a base and an end portion, the end portion being adapted to protrude from the mounting hole 235 and into the pin hole 137. A spring 614 mounted in the mounting hole 235 and having one end abutting against an inner wall of the mounting hole 235 and the other end abutting against the base 601 of the rod 615 or abutting against an interior of the rod 615. The ladder assembly 20I may further yet include a handle 616 connected to the base 601 of the rod 615 and configured to be pulled to move the rod 615 away from the pin hole.

In certain aspects, the invention provides a ladder assembly 20I for a pool, wherein the ladder assembly 20I comprises a first ladder portion 104 adapted to be disposed at a first side of a wall of the pool, an upper end portion of the first ladder portion 104 being adapted to be secured to a top of the wall of the pool. A second ladder portion 106 is adapted to be disposed at the first side of the wall of the pool when not in use and is adapted to be disposed at a second side of the wall of the pool when in use, the second side being an opposite side of the first side. The first ladder portion 104 is always secured to the wall of the pool and located in the pool, and the second ladder portion 106 has a use state and a safety state. In the use state, the second ladder portion 106 is fixed at the outer side of the pool and can be used for the user to enter into and exit out of the pool. In the safety state (first position), the second ladder portion 106 (movable ladder portion) is fixed at the inner side of the pool to prevent the user from entering into the pool and effectively prevent the children from climbing thereon. Moreover, the ladder assembly 20I of the present invention has simple structure and convenient operation. Comparing to the open type buckle securing, the present invention enables the outer ladder 106 to be completely placed into the pool through a multi-segment connection structure and thus has higher security.

Figure 39:
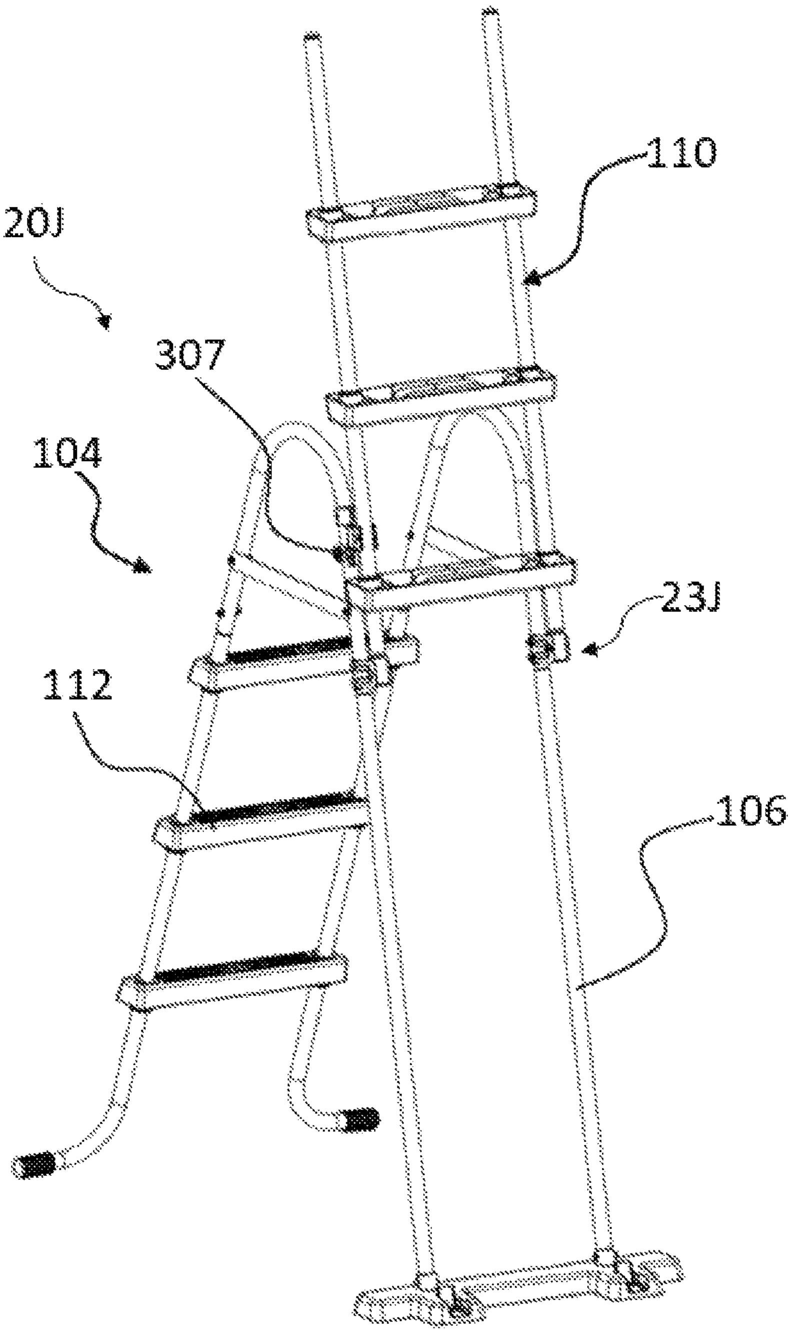
FIG. 39 is a perspective view of a mortise lock structure used with a safety ladder, in accordance with one embodiment of the present disclosure.

In accordance with other aspects of the present disclosure, a safety ladder assembly 20J is provided with an connection mechanism 23J. The connection mechanism 23J includes a mortise lock structure. FIG. 39 shows a schematic view of an exemplary application scenario of a mortise lock structure according to an embodiment of the present invention. Specifically, the mortise lock structure of the present invention can be used to lock an inner ladder 104 and an outer ladder 110 of a pool safety ladder. The above-ground pool is generally provided with a pool safety ladder 10, and the pool safety ladder 10 generally comprises an inner ladder 104 and an outer ladder 110. Two support rods of the inner ladder 104 are disposed across the pool wall, and only the support rods at the inner side of the pool are provided with steps 112, while there is no step on the support rods 106 at the outer side. When in use, at the outer side of the pool, the outer ladder 110 (movable ladder portion) is fixedly connected to the support rods 106, so that the user can climb over the outer ladder 110 and the inner ladder 104 to enter into the pool. To exit the pool, the user may then climb over the inner ladder 104 and the outer ladder 110 to exit out of the pool. When not in use, the outer ladder 110 is fixed above the outer side support rods 106 of the inner ladder 104 by the mortise lock structure 307. In this way, it is possible to effectively prevent the children from accidentally removing the outer ladder 110 or prevent the outer ladder 110 from accidentally dropping and injuring people. It should be appreciated that any of the afore described dampening members 25A, 25B, 25C may be used in conjunction with rotatable connection mechanism 23J.

Figure 40:
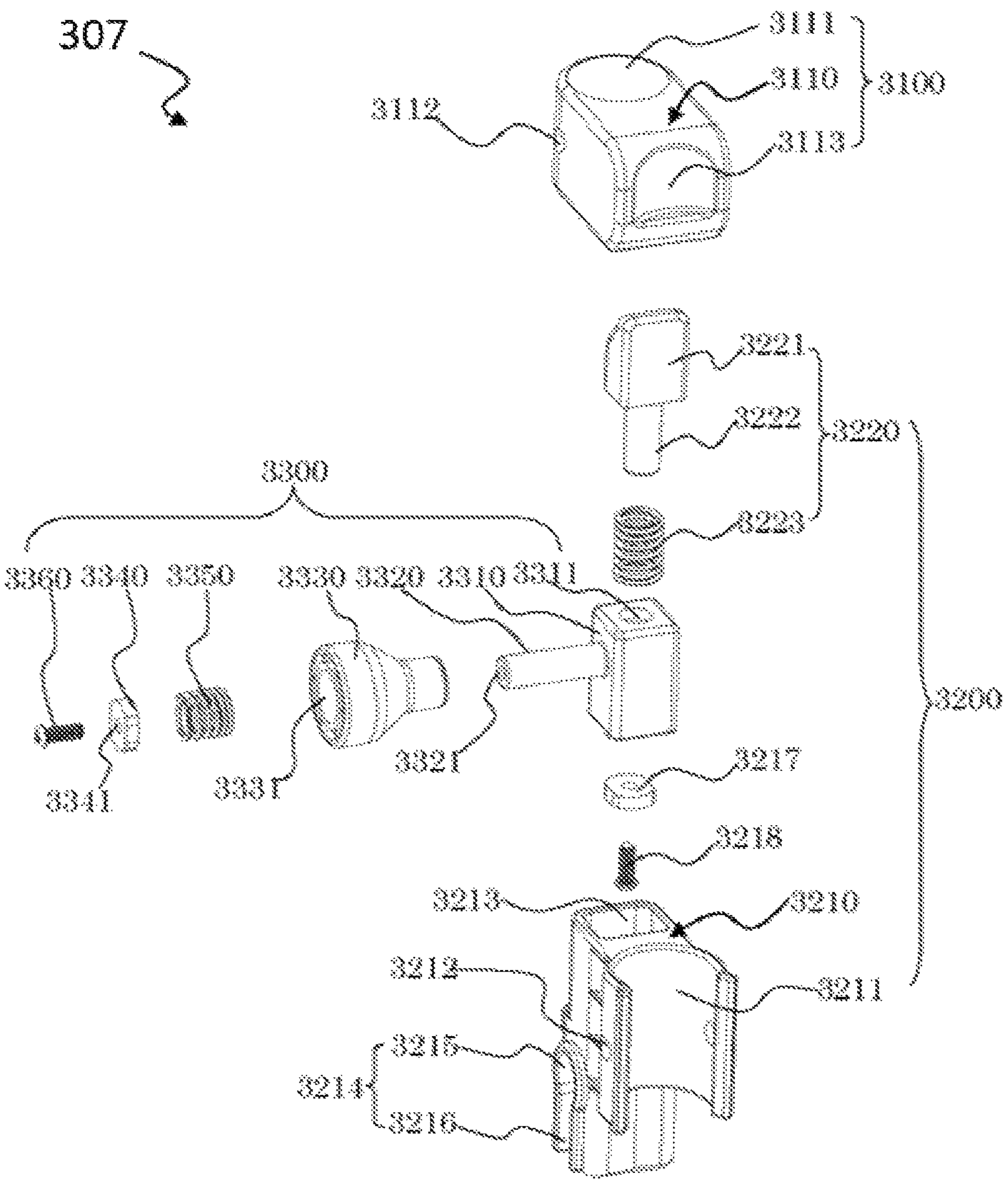
FIG. 40 is an exploded perspective view of the mortise lock structure of FIG. 39.
Figure 41:
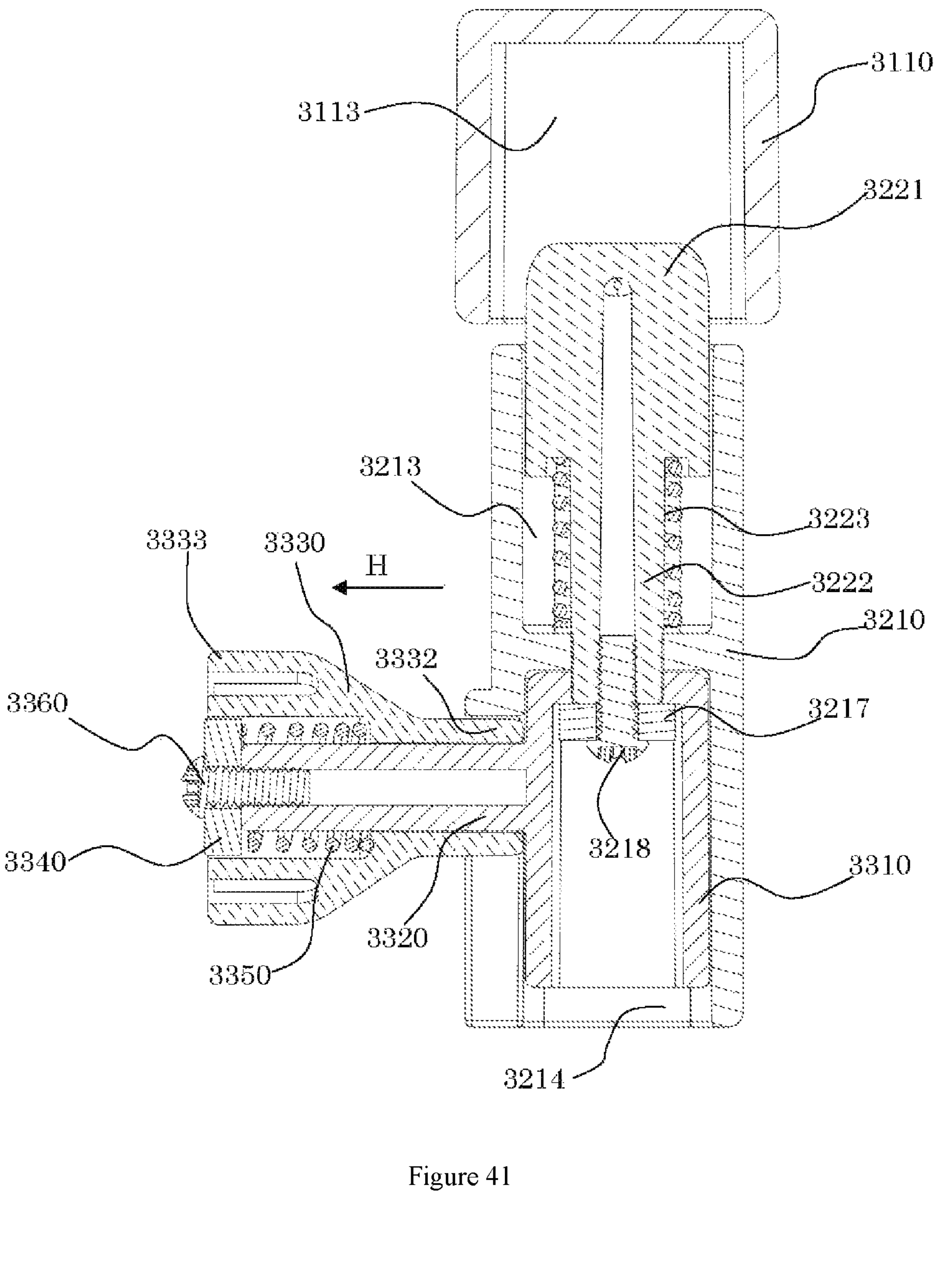
FIG. 41 is a cross-sectional view of the mortise lock structure of FIG. 39 in a locked state.

As illustrated in FIGS. 40 and 41, the mortise lock structure 307 of the present embodiment will be specifically described below with reference to FIGS. 40 through 44. The mortise lock structure 307 of the present embodiment may comprise a first mating member 3100 adapted to be fixed to a first object (i.e., the outer side support rods 106 of the inner ladder 104), which may be a female component. The mortise lock structure 307 further comprises a second mating member 3200 adapted to be fixed to a second object (i.e., the outer ladder 110 or movable ladder portion 110) and adapted to be engaged with the first mating member 3100, i.e., locked, and the second mating member 3200 may be a male component. Further, the mortise lock structure 307 further comprises a stopping assembly 3307 adapted to be operated to selectively prevent the first mating member 3100 and the second mating member 3200 from disengaging from an engaged state. In addition, the first mating member 3100 and the second mating member 3200 may be held in a locked state, or disengaged from the engaged state, such that the first mating member 3100 and the second mating member 3200 are in an unlocked state. Specifically, when the outer ladder 110 is not used, the outer ladder 110 is fixed and locked above the inner ladder 104 by the mortise lock structure 307, so that the children cannot remove the outer ladder 110 and the outer ladder 110 is also prevented from dropping accidentally, thereby enhancing the safety of the entire pool safety ladder. When in use, the mortise lock structure 307 can be manually unlocked, and the outer ladder 110 is removed. Then, the outer ladder 110 is supported on the ground while being fixed to the outer side support rods 106 of the inner ladder 104, so that the pool safety ladder can be used normally. The mortise lock structure is preferably located in an upper portion of the ladder assembly so that it cannot be reached by children.

In the present embodiment, the first mating member 3100 comprises a first body 3110 adapted to be fixed to the inner ladder 104. Specifically, the support rods 106 of the inner ladder 104 can pass through a fixing hole 3111 provided in the first body 3110. Opposite side walls of the fixing hole 3111 respectively have a shaft hole 3112, and an upper end portion of the support rod 110 has a shaft hole corresponding to the shaft hole 3112. A bolt passes through the shaft hole 3112 in one side wall and the shaft hole of the support rod 110 and protrudes from the shaft hole 3112 in the other side wall, and then is engaged with a nut and fixed, so that the first mating member 3100 and the upper end portion of the inner ladder 104 are fixed together. However, the present invention is not limited to this specific configuration, and can employ other fixing methods. For example, the bolt may be replaced by a pin. In the present embodiment, a locking groove 3113 is provided on one side of the first body 3110 opposite to the fixing hole 3111.

As shown in FIGS. 40 and 41, the second mating member 3200 comprises a second body 3210 adapted to be fixed to the outer ladder 110. Specifically, the second body 3210 is provided with a groove 3211 adapted to snap the support rod of the outer ladder 110, and opposite side walls of the groove 3211 respectively have a shaft hole 3212, and a lower end portion of the support rod of the outer ladder 110 or a portion near the lower end portion has a shaft hole corresponding to the shaft hole 3212. A bolt passes through the shaft hole 3212 in one side wall and the shaft hole of the support rod and protrudes from the shaft hole 3212 in the other side wall, and then is engaged with a nut and fixed, thereby fixing the second mating member 3200 and the outer ladder 110. Certainly, the present invention is not limited thereto, and can employ other fixing methods. For example, the bolt may be replaced by a pin. In the present embodiment, the second body 3210 is provided with a lock tongue assembly 3220 that can be at least partially engaged with or disengaged from the locking groove 3113.

In the present embodiment, the second body 3210 has a lock tongue mounting hole 3213 and a sliding groove 3214 disposed below the lock tongue mounting hole 3213. The lock tongue mounting hole 3213 is in the same direction as the sliding groove 3214 and communicated with the sliding groove 3214. The lock tongue assembly 3220 is partially disposed in the lock tongue mounting hole 3213 and partially extends to the sliding groove 3214, and the lock tongue assembly 3220 is configured to be movable in the lock tongue mounting hole 3213 to force a portion protruding from the lock tongue mounting hole 3213 to enter into or exit out of the locking groove 3113. Also, the stopping assembly 3307 is partially disposed in the sliding groove 3214 and configured to be movable in the sliding groove 3214 to be engaged with or disengaged from the lock tongue assembly 3220 to block or allow the movement of the lock tongue assembly 3220.

Figure 42:
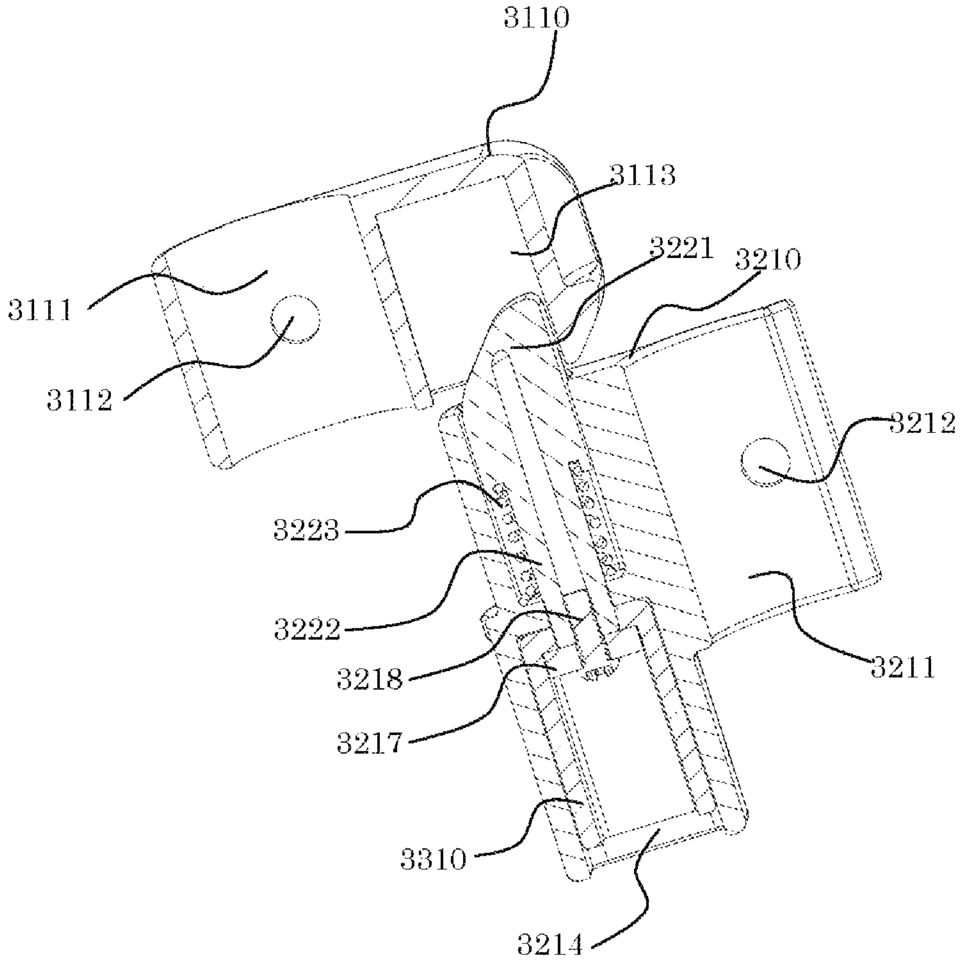
FIG. 42 is a partial cross-sectional view of the mortise lock structure of FIG. 39 in the locked state and shown from another angle.
Figure 43:
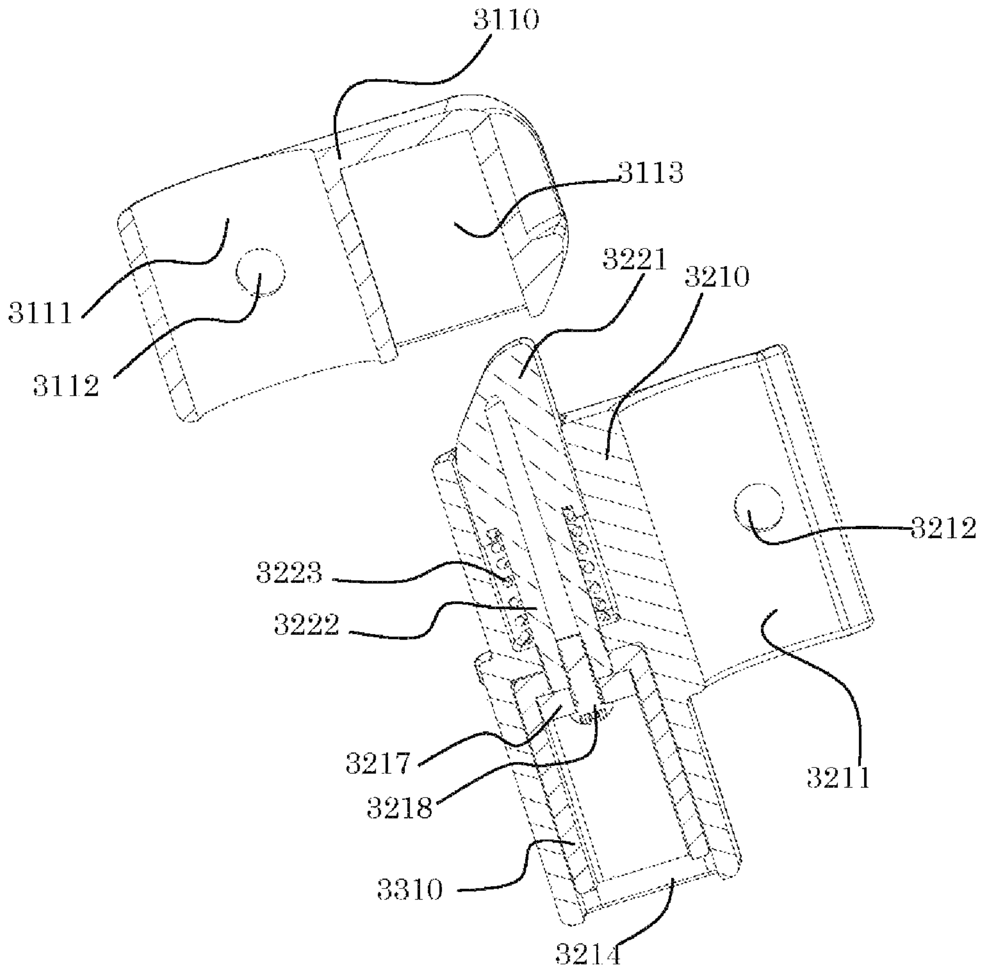
FIG. 43 is another partial cross-sectional view of the mortise lock structure of FIG. 39 in an unlocked state.

Still referring to FIGS. 40 and 41, the lock tongue assembly 3220 may comprise a lock tongue 3221 that is at least partially disposed outside the lock tongue 3221 mounting hole 3213 and adapted to be engaged and mated with the locking groove 3113. The lock tongue 3221 and the locking groove 3113 can be any structure of the lock tongue and the locking groove 3113 known in the art. The lock tongue assembly 3220 may further include a connecting rod 3222 connected to the lock tongue 3221, disposed in the lock tongue mounting hole 3213 and extending partially to the sliding groove 3214. The connecting rod 3222 is configured to be movable in the lock tongue mounting hole 3213 to force the lock tongue 3221 to enter into the locking groove 3113 (as shown in FIGS. 41 and 42) or exit out of the locking groove 3113 (as shown in FIG. 43). The lock tongue assembly 3220 further comprises a lock tongue spring 3223 disposed between the lock tongue 3221 and a bottom of the lock tongue mounting hole 3213 and surrounding the connecting rod 3222, adapted to force the lock tongue 3221 to enter into the locking groove 3113.

As shown in FIGS. 40 and 41, a longitudinal direction of the lock tongue mounting hole 3213 extends in the same direction as a longitudinal direction of the sliding groove 3214. A snapping groove 3215 and a guiding groove 3216 are provided on a side wall of the sliding groove 3214, wherein the snapping groove 3215 is adjacent to the lock tongue mounting hole 3213, and the guiding groove 3216 is connected and communicated with the snapping groove 3215. As illustrated, the guiding groove 3216 extends from the snapping groove 3215, and the size of the guiding groove 3216 is smaller than the size of the snapping groove 3215.

With reference to FIGS. 40 and 41, the stopping assembly 3307 comprises a sliding portion 3310, a guiding rod 3320, a handle 3330, a blocking piece 3340, a stopping spring 3350 and a bolt 3360. The sliding portion 3310 is disposed in the sliding groove 3214 and is connected to an end portion of the connecting rod 3222 that extends to the sliding groove 3214. For example, the sliding portion 3310 is a hollow structure and has an opening at one end and a bottom at the other end. The bottom has a hole into which the connecting rod 3222 can extend. The end portion of the connecting rod 3222 extending to the sliding portion 3310 has a threaded hole, and a bolt 3218 passes through a hole in the blocking piece 3217 and is engaged with the threaded hole of the end portion of the connecting rod 3222, and the size of the blocking piece 3217 is larger than the diameter of the hole in the bottom of the sliding portion 3310. Accordingly, the connecting rod 3222 and the sliding portion 3310 are fixedly connected by the bolt 3218 and the blocking piece 3217. One side of the sliding portion 3310 is connected to one end of the guiding rod 3320. For example, the sliding portion 3310 and the guiding rod 3320 may be integrally formed or may be joined by welding or the like. The other end of the guiding rod 3320 passes through the guiding groove 3216 and extends to the outside of the sliding groove 3214, and is connected to the handle 3330. The handle 3330 has a hollow structure configured to receive the guiding rod 3320 and move relative to the guiding rod 3320 to expose or cover the guiding rod 3320. The exposed guiding rod 3320 is adapted to slide along the guiding groove 3216, that is, the size of the guiding rod 3320 is smaller than the size of the guiding groove 3216. However, the size of a tail end 3332 of the handle 3330 is smaller than the size of the snapping groove 3215, but larger than the size of the guiding groove 3216. In other words, the tail end 3332 of the handle 3330 can be accommodated in the snapping groove 3215, but cannot be accommodated in the guiding groove 3216, that is, the handle 3330 can be locked in the snapping groove 3215, thereby locking the mortise lock structure 307, as shown in FIG. 41. The blocking piece 3340 is fixedly connected to the end portion of the guiding rod 3320 protruding from the sliding groove 3214 at a head 3333 of the handle 3330. Specifically, the end portion of the guiding rod 3320 has a threaded hole, and the blocking piece 3340 is fixed to the guiding rod 3320 by the bolt 3360. A stopping spring 3350 is disposed between the blocking piece 3340 and the handle 3330, and the stopping spring 3350 may be disposed around the guiding rod 3320 to force the handle 3330 to enter into the snapping groove 3215.

Figure 44:
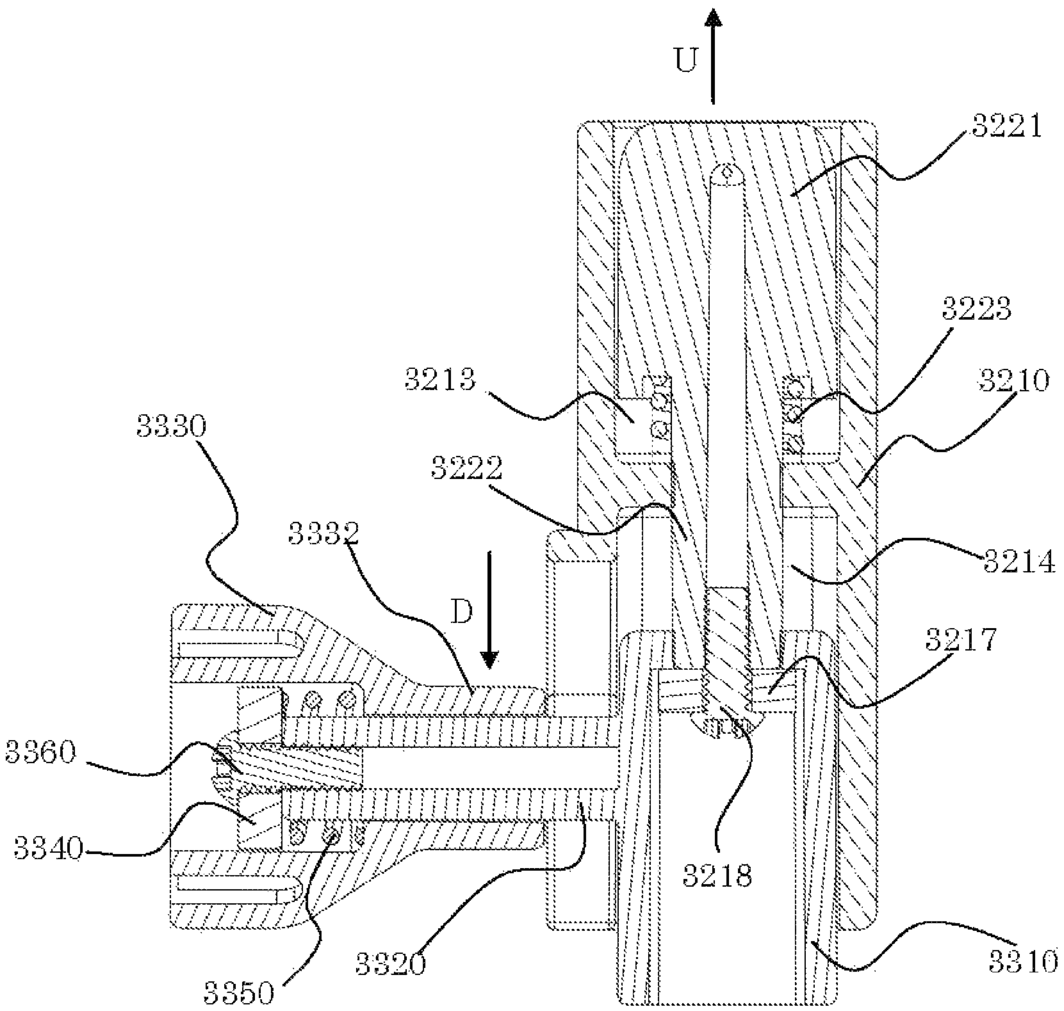
FIG. 44 is a cross-sectional view of the mortise lock structure in the unlocked state, wherein portions of the mortise lock structure are omitted.

When the handle 3330 is pulled in the horizontal direction, as shown in FIG. 41, the handle 3330 is pulled in a direction indicated by an arrow H to overcome the elastic force of the stopping spring 3320, so that the tail end 3332 of the handle 3330 is withdrawn from the snapping groove 3215. As such, the locked state is released and the guiding rod 3320 is exposed. At this time, the tail end 3332 of the handle 3330 abuts against the outside of the sliding groove 3214 by the action of the stopping spring 3350, as shown in FIG. 44. In this state, the handle 3330 is pulled down, and the guiding rod 3320 is driven to move downward along the guiding groove 3216 in a direction indicated by an arrow D (FIG. 44). The guiding rod 3320 further drives the sliding portion 3310 to move downward along the sliding groove 3214, and the sliding portion 3310 further drives the lock tongue 3221 to move against the elastic force of the lock tongue spring 3223 by the connecting rod 3222. During movement, the lock tongue 3221 exits out of the locking groove 3113, and the mortise lock structure 307 is unlocked. In this way, the outer ladder 110 can be removed from the inner ladder 104. However, in the unlocked state shown in FIG. 44, the user releases the handle 3330, and under the elastic force of the lock tongue spring 3223, the lock tongue 3221 is automatically driven to move upward (as indicated by an arrow U), and then the sliding portion 3310 is driven to move upward by the connecting rod 3222. When the lock tongue 3221 enters into the locking groove 3113, the sliding portion 3310 drives the guiding rod 3320 to enter into the snapping groove 3215. Since the size of the tail end 3332 of the handle 3330 is smaller than the size of the snapping groove 3215, the tail end 3332 of the handle 3330 automatically enters into the snapping groove 3215 (in a direction opposite to the arrow H). The handle 3330 then is locked in the snapping groove 3215 under the elastic force of the stopping spring 3350, in the locked state shown in FIG. 41. It can be seen that the function of automatic locking can be realized by the lock tongue spring 3223 and the stopping spring 3350. Certainly, the present invention is not limited thereto, and can omit one or both of the lock tongue spring 3223 and the stopping spring 3350 to achieve a semi-automatic or pure manual locking operation.

Figure 45:
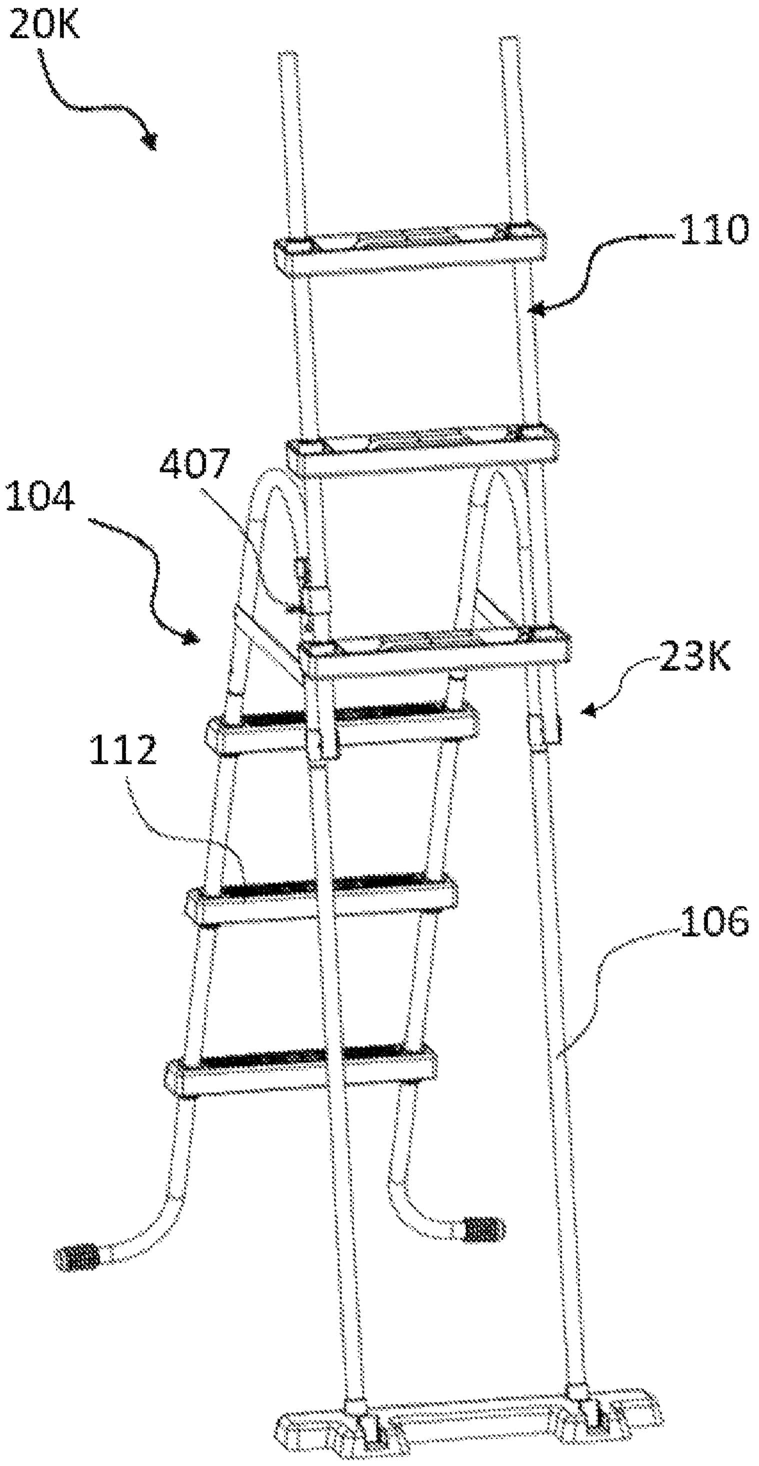
FIG. 45 is a perspective view of another embodiment of a ladder assembly with a modified mortise lock structure, according to the present disclosure.

FIG. 45 illustrates an exemplary application scenario of a mortise lock structure in accordance with another embodiment of the present invention. In this embodiment, a pool safety ladder 20K and connection mechanism 23K equipped for the above-ground pool is provided, in which the two support rods 106 of the inner ladder 104 span across the pool wall, only the support rods 106 at the inner side of the pool are provided with steps 112, while there is no step on the outer side support rods 106. When in use, the outer ladder 110 is fixedly connected to the support rods 106, so that the user can climb over the outer ladder 110 and the inner ladder 104 to enter into the pool. Simultaneously, a user may climb over the inner ladder 104 and the outer ladder 110 to exit out of the pool. When not in use, the outer ladder 110 is fixed above the outside support rods 106 of the inner ladder 104 by the mortise lock structure 407. In this way, it is possible to effectively prevent the children from accidentally removing the outer ladder 110 or prevent the outer ladder 110 from accidentally dropping and injuring people.

Another mortise lock structure 407 of the present disclosure will be specifically described below with reference to FIGS. 46 through 52. Similar to the mortise lock structure 307, the mortise lock structure 407 of the present embodiment may comprise a first mating member 4100 adapted to be fixed to the first object (i.e., the outer side support rods 106 of the inner ladder 104), and the first mating member 4100 may be a female component. The mortise lock structure 407 further comprises a second mating member 4200 as a male component that is adapted to be fixed to the second object (i.e., the outer ladder 110) and adapted to be engaged with the first mating member 4100, i.e., locked. Further, the mortise lock structure 407 comprises a stopping assembly 4307 adapted to be operated to selectively prevent the first mating member 4100 and the second mating member 4200 from disengaging from the engaged state. In other words, the first mating member 4100 and the second mating member 4200 may be held in a locked state or actuated to allow the first mating member 4100 and the second mating member 4200 to disengage from the engaged state. When disengaged, the first mating member 4100 and the second mating member 4200 are in an unlocked state. Specifically, when the outer ladder 110 is not used, the outer ladder 110 is fixed and locked above the inner ladder 104 by the mortise lock structure 407, so that the children cannot remove the outer ladder 110, and the outer ladder 110 can be prevented from accidentally dropping, thereby enhancing the safety of the entire pool safety ladder. When in use, the mortise lock structure 407 is unlocked, and the outer ladder 110 is removed. Then, the outer ladder 110 is supported on the ground while being fixed to the outer side support rods 106 of the inner ladder 104, so that the pool safety ladder can be used normally.

Figure 46:
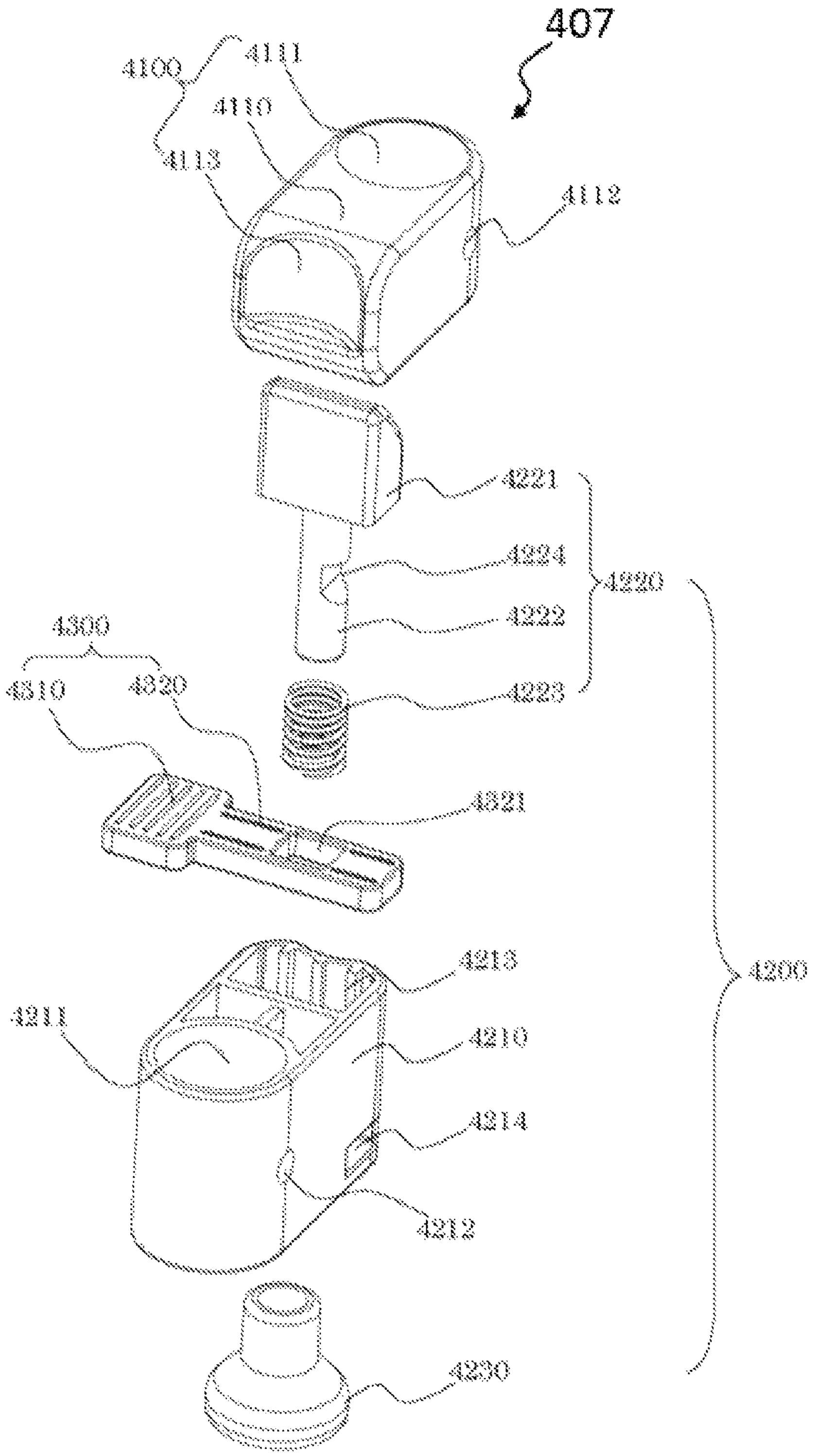
FIG. 46 is an exploded perspective view of the mortise lock structure of FIG. 45.
Figure 47:
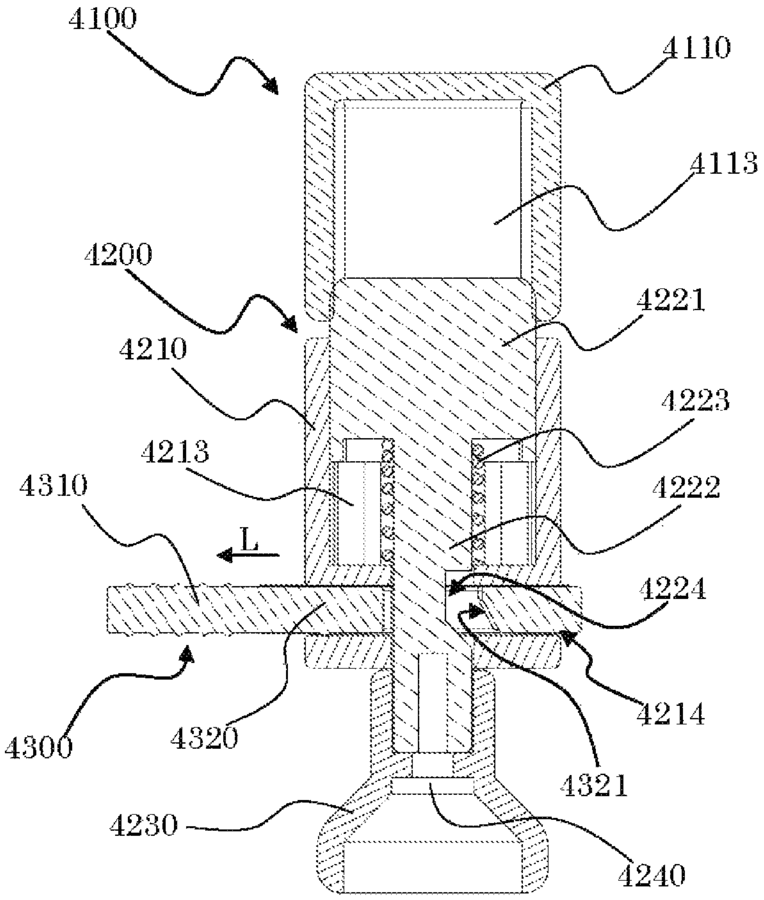
FIG. 47 is a cross-sectional view of the mortise lock structure of FIG. 45 in a locked state.
Figure 48:
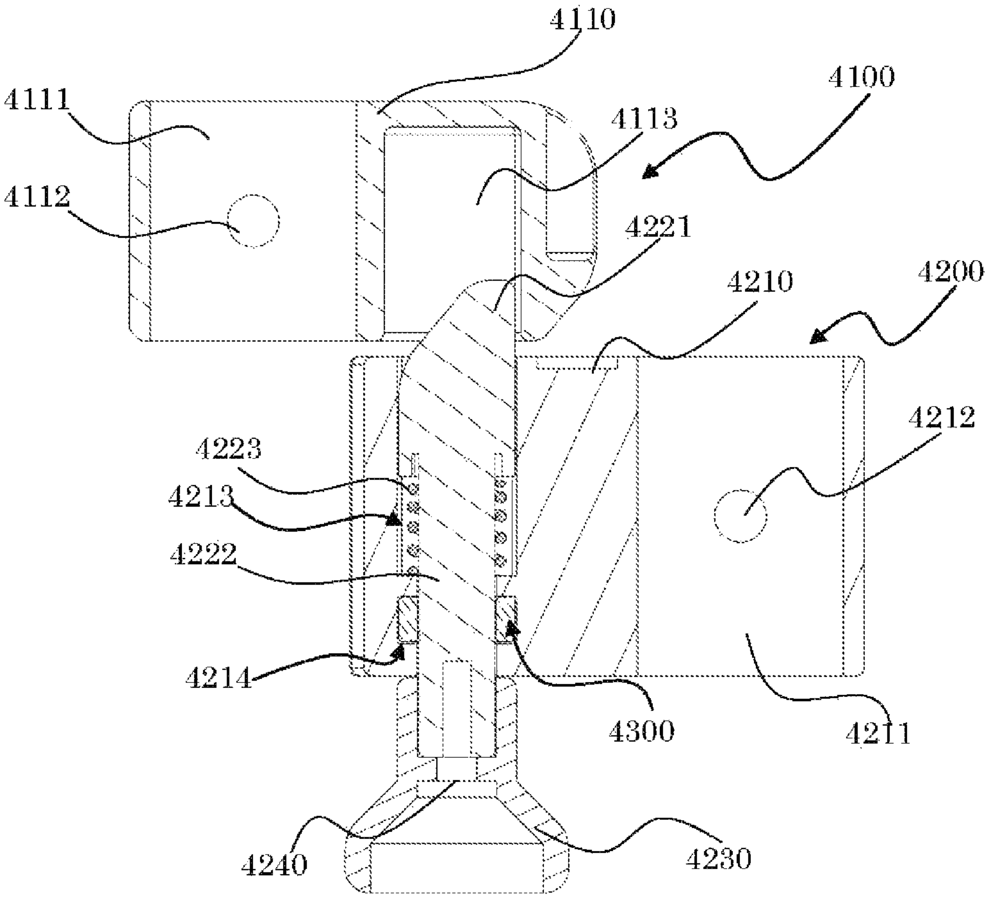
FIG. 48 is another cross-sectional view of the mortise lock structure of FIG. 45 in the locked state and shown from another view.

Still referring to FIGS. 46 and 47, the first mating member 4100 comprises a first body 4110 adapted to be fixed to the inner ladder 104. Specifically, the support rod 110 of the inner ladder 104 can pass through a fixing hole 4111 provided in the first body 4110. Opposite side walls of the fixing hole 4111 respectively have a shaft hole 4112, and an upper end portion of the support rod 110 has a shaft hole corresponding to the shaft hole 4112. A bolt passes through the shaft hole 4112 in one side wall and the shaft hole of the support rod 110 and protrudes from the shaft hole 4112 in the other side wall. The bolt may then be fixed with a nut so that the first mating member 4100 and the upper end of the inner ladder 104 are fixed. Certainly, the present invention is not limited thereto, and can employ other fixing methods. For example, the bolt may be replaced by a pin. In the present embodiment, a locking groove 4113 is provided on one side of the first body 4110 opposite to the fixing hole 4111.

As best shown in FIG. 46, the second mating member 4200 comprises a second body 4210 adapted to be fixed to the outer ladder 110. Specifically, the second body 4210 is provided with a mounting hole 4211 adapted to fit over the support rod of the outer ladder 110, and opposite side walls of the mounting hole 4211 respectively have a shaft hole 4212, and a lower end portion of the support rod of the outer ladder 110 or a portion near the lower end portion has a shaft hole corresponding to the shaft hole 4212. A bolt passes through the shaft hole 4212 in one side wall and the shaft hole of the support rod and protrudes from the shaft hole 4212 in the other side wall, and then is engaged with a nut and fixed, thereby fixing the second mating member 4200 and the outer ladder 110. However, it should be appreciated that the present invention is not limited thereto, and can employ other fixing methods. For example, the bolt may be replaced by a pin. In the present embodiment, a lock tongue assembly 4220 that can be at least partially engaged with or disengaged from the locking groove 4113 is mounted on the second body 4210.

In the present embodiment, the second body 4210 has a lock tongue mounting hole 4213 and a sliding groove 4214 disposed below the lock tongue mounting hole 4213. The lock tongue mounting hole 4213 is perpendicular to the sliding groove 4214 and communicated with the sliding groove 4214. The lock tongue assembly 4220 is partially disposed in the lock tongue mounting hole 4213 and partially extends to the sliding groove 4214, and the lock tongue assembly 4220 is configured to be movable in the lock tongue mounting hole 4213 to force a portion protruding from the lock tongue mounting hole 4213 to enter into or exit out of the locking groove 4113. In addition, the stopping assembly 4307 is partially disposed in the sliding groove 4214, and the stopping assembly 4307 is configured to be movable in the sliding groove 4214 to be engaged with or disengaged from the lock tongue assembly 4220 to block or allow the movement of the lock tongue assembly 4220.

In particular, the lock tongue assembly 4220 may comprise a lock tongue 4221 that is at least partially disposed outside the lock tongue mounting hole 4213 and adapted to be mated and engaged with the locking groove 4113, as shown in FIGS. 9-11. The lock tongue and the locking groove may have any structure of a lock tongue and a locking groove known in the art. The lock tongue assembly 4220 further comprises a connecting rod 4222 connected to the lock tongue 4221, disposed in the lock tongue mounting hole 4213 and partially extending to the sliding groove 4214. The second mating member 4200 further comprises a handle 4230 that is connected to an end of the connecting rod 4222 that passes through the sliding groove 4214 and protrudes from the second body 4210. For example, the end of the connecting rod 4222 has a threaded hole, and the handle 4230 has a space for accommodating the end of the connecting rod 4222. The bottom of the space has a through hole, and a bolt 4240 passes through the through hole and enters into the threaded hole of the connecting rod 4222 and is engaged with the threads in the threaded hole so as to fixedly connect the handle 4230 to the connecting rod 4222. By pulling the handle 4230, the connecting rod 4222 is moved in the lock tongue mounting hole 4213, thereby causing the lock tongue 4221 to enter into the locking groove 4113 (FIG. 44) or exit out of the locking groove 4113 (FIG. 47). The lock tongue assembly 4220 further comprises a lock tongue spring 4223 disposed between the lock tongue 4221 and the bottom of the lock tongue mounting hole 4213 and surrounding the connecting rod 4222, adapted to drive the lock tongue 4221 to automatically enter into the locking groove 4113 when pulling down and releasing the handle 4230.

In the present embodiment, the connecting rod 4222 is provided with a recess 4224. Moreover, the stopping assembly 4307 comprises a hand-held portion 4310 and an extension portion 4320. The hand-held portion 4310 is at least partially disposed outside the sliding groove 4214, and the extension portion 4320 is connected to the hand-held portion 4310 and at least partially extends into the sliding groove 4214. In this embodiment, the extension portion 4320 extends from one end of the sliding groove 4214 to the other end. As shown in FIG. 46, the extension portion 4320 is provided with a blocking groove 4321. The user operates the extension portion 4320 to move in the sliding groove 4214 by the hand-held portion 4310, thereby forcing the blocking groove 4321 to be engaged with or disengaged from the recess 4224.

Figure 49:
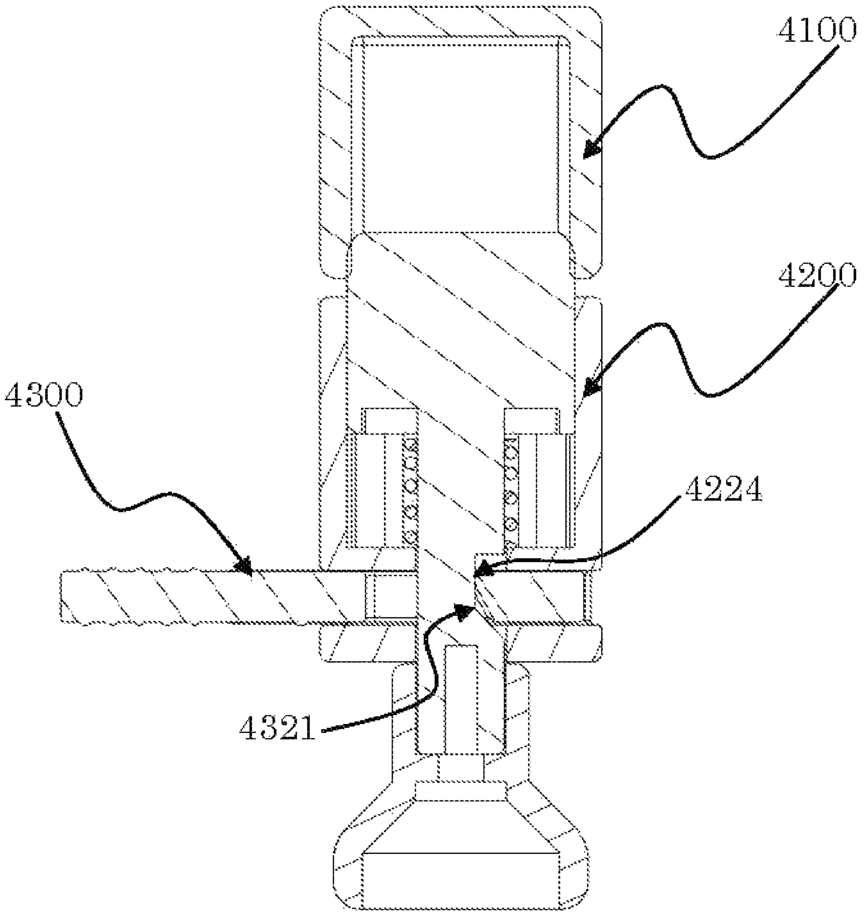
FIG. 49 is a cross-sectional view of the mortise lock structure of FIG. 45 in the locked state and shown from another view.

When the locking tongue 4221 moves into the locking groove 4113 by the elastic force of the locking tongue spring 4223 and is engaged with the locking groove 4113, at this time, as shown in FIG. 47, the hand-held portion 4310 is pulled in the direction of an arrow L to force the extension portion 4320 to move in the direction of the arrow L, so that the blocking groove 4321 is engaged with the recess 4224 to hold the first mating member 4100 and the second mating member 4200 in the locked state, as shown in FIG. 49. It can effectively prevent children from removing the outer ladder 110 without permission or prevent the outer ladder 110 from accidentally dropping and injuring people.

Figure 50:
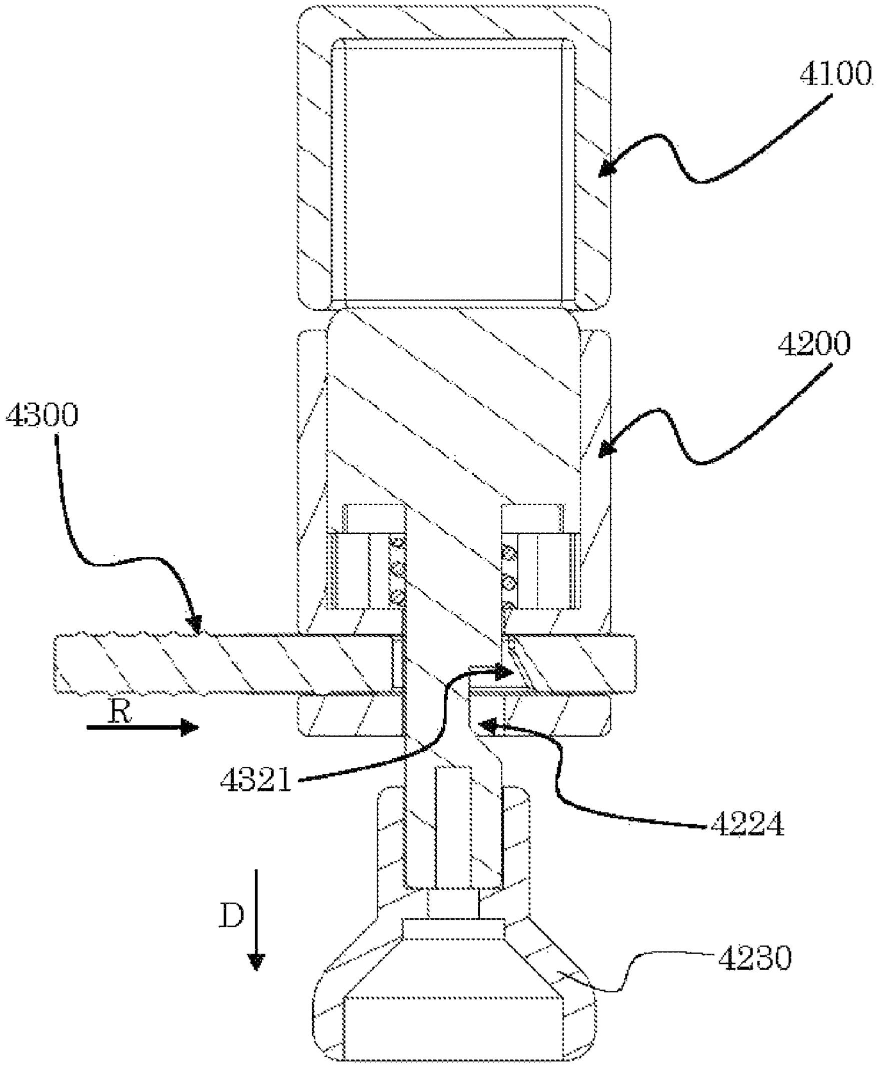
FIG. 50 is a cross-sectional view of the mortise lock structure of FIG. 45 in an unlocked state.
Figure 51:
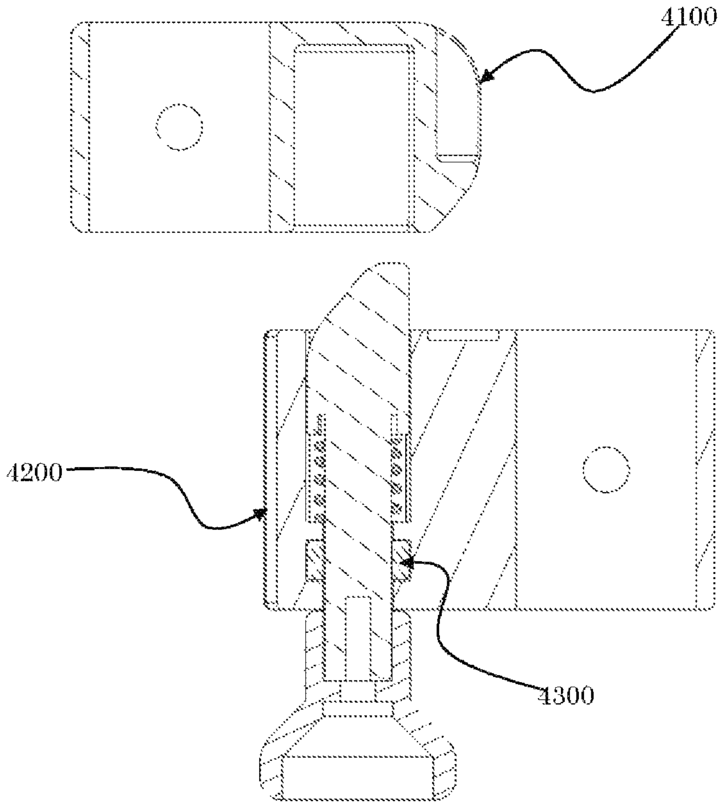
FIG. 51 is a cross-sectional view of the mortise lock structure of FIG. 45 in the unlocked state and shown from another view.
Figure 52:
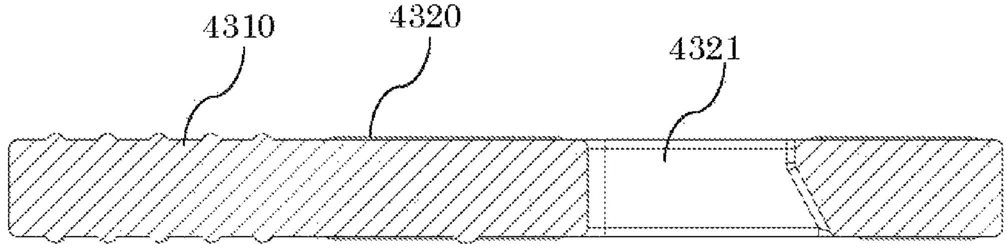
FIG. 52 is a cross-sectional view of a stopping assembly of the mortise lock structure, according to one embodiment.

In the locked state, as shown in FIG. 50, the hand-held portion 4310 is pushed in the direction of an arrow R to force the extension portion 4320 to move in the direction of the arrow R, so that the blocking groove 4321 is disengaged from the recess 4224. At the same time, the handle 4230 is pulled in the direction of the arrow D to cause the lock tongue 4221 to exit out of the locking groove 4113 against the elastic force of the lock tongue spring 4223. Thereby, the first mating member 4100 and the second mating member 4200 can be separated from each other and in the unlocked state, as shown in FIG. 50. In this way, the outer ladder 110 can be removed from the inner ladder 104.

In an alternative embodiment, the locking tongue spring 4223 can be omitted and the locking operation can be achieved by manually operating the handle 4230. The mortise lock structure can be used in conjunction with any of the previously described safety ladder assembly. Moreover, the dampening member 25 embodiments previously described may be used in conjunction with the safety ladder assembly of the present embodiment.

In one aspect of the present disclosure, the invention provides a ladder assembly 20J, 20K for a pool, wherein the ladder assembly 20J, 20K includes a mortise lock structure 307, 407 suitable for locking two objects. The mortise lock structure 307, 407 comprises a first mating member 3100, 4100 adapted to be fixed to a first object. The mortise lock structure 307, 407 further comprises a second mating member 3200, 4200 adapted to be fixed to a second object and adapted to be engaged with the first mating member 3100, 4100. A stopping assembly 3307, 4307 is included and is adapted to be operated to selectively block or allow the first mating member 3100, 4100 and the second mating member 3200, 4200 to disengage from an engaged state. The first mating member 3100, 4100 comprises a first body 3110, 4110 adapted to be fixed to the first object and is provided with a locking groove 3113, 4113. The second mating member 3200, 4200 comprises a second body 3210, 4210 adapted to be fixed to the second object, and the second body 3210, 4210 is equipped with a lock tongue assembly 3220, 4220 that is at least partially engageable with or disengageable from the locking groove 3113, 4113. The second body 3210, 4210 has a lock tongue mounting hole 3213, 4213 and a sliding groove 3214, 4214 disposed below the lock tongue mounting hole 3213, 4213 for engaging with the lock tongue mounting hole 3213, 4213. The lock tongue assembly 3220, 4220 is partially disposed in the lock tongue mounting hole 3213, 4213 and partially extends to the sliding groove 3214, 4214. The lock tongue assembly 3220, 4220 is configured to be movable in the lock tongue mounting hole 3213, 4213 to force a portion protruding from the lock tongue mounting hole 3213, 4213 to enter into or exit out of the locking groove 3113, 4113. The stopping assembly 3307, 4307 is partially disposed in the sliding groove 3214, 4214 and configured to be movable in the sliding groove 3214, 4214 to be engaged with or disengaged from the lock tongue assembly 3220, 4220 so as to block or allow the movement of the lock tongue assembly 3220, 4220.

The lock tongue assembly 3220, 4220 of the mortise lock structure 307, 407 may further comprise a lock tongue 3221 at least partially disposed outside the lock tongue mounting hole 3213, 4213 and adapted to be mated with the locking groove 3113, 4113. A connecting rod 3222, 4222 is connected to the lock tongue 3221, disposed in the lock tongue mounting hole 3213, 4213, and partially extending to the sliding groove 3214, 4214. The connecting rod 3222, 4222 is configured to be movable in the lock tongue mounting hole 3213, 4213 to force the lock tongue to enter into or exit out of the locking groove 3113, 4113. The lock tongue assembly 3220, 4220 may further comprise a lock tongue spring 3223, 4223 disposed between the lock tongue 3221 and a bottom of the lock tongue mounting hole 3213, 4213 and is adapted to force the lock tongue 3221 to enter into the locking groove 3113, 4113. The lock tongue spring 3223, 4223 may be disposed around the connecting rod 3222, 4222. A length direction of the lock tongue mounting hole 3213, 4213 is perpendicular to a length direction of the sliding groove 3214, 4214. The second mating member 3200, 4200 may further comprise a handle 3330, 4330 that is connected to an end portion of the connecting rod 3222, 4222 that passes through the sliding groove 3214, 4214 and protrudes from the second body 3210, 4210. The handle 3330, 4330 may further be adapted to be operated by a user to force the lock tongue 3221 to exit out of the locking groove 3113, 4113 against an elastic force of the lock tongue spring 3223, 4223.

Referring now to FIGS. 46 and 47, a connecting rod 4222 may be provided with a recess 4224 wherein the stopping assembly 4307 may also comprises a hand-held portion 4310 at least partially disposed outside the sliding groove 4214 and adapted to be operated by the user. An extension portion 4320 is connected to the hand-held portion 4310 and at least partially extending into to the sliding groove 4214, the extension portion 4320 being provided with a blocking groove 4113 and configured to be movable in the sliding groove 4214 to force the blocking groove 4113 to be engaged with or disengaged from the recess 4224.

Looking back to FIG. 44, the lock tongue mounting hole 3213 includes a length direction which may extend in the same direction as a length direction of the sliding groove 3214 and a side wall of the sliding groove 3214 may have a snapping groove 3215 adjacent to the lock tongue mounting hole 3213. The side wall of the sliding groove 3214 may further have a guiding groove 3216 connected and communicated with the snapping groove 3215 and having a size smaller than the size of the snapping groove 3215. The stopping assembly 3307 may include a sliding portion 3310 that is disposed in the sliding groove 3214, 4214 and connected to the end portion of the connecting rod 3222 and extending to the sliding groove 3214. The stopping assembly 3307 may further include a guiding rod 3320 having one end fixedly connected to the sliding portion 3310 and the other end passing through the guiding groove 3216 and extending to the outside of the sliding groove 3214, the guiding rod 3320 being adapted to slide along the guiding groove 3216. The stopping assembly 3307 may further include a handle 3330 that includes a hollow structure configured to receive the guiding rod 3320 and move relative to the guiding rod 3320 to expose the guiding rod 3320. The handle 3330 may be adapted to be locked in the snapping groove 3215. The handle 3330 has a tail end 3332 having a size smaller than the size of snapping groove 3215 and larger than the size of the guiding groove 3216.

In accordance with certain aspects, the stopping assembly 3307 may further comprise a blocking piece 3340 fixedly connected to the end portion of the connecting rod 3222 protruding from the sliding groove 3214 and a stopping spring 3350 disposed between the blocking piece 3340 and the handle 3330 to force the handle 3330 to enter into the snapping groove 3215. The stopping spring 3350 may be disposed around the guiding rod 3320.

It is another aspect of the present invention to provide a mortise lock structure 307, 407 suitable for locking two objects. Specifically, the mortise lock structure 307, 407 may comprise a first mating member 3100, 4100 adapted to be fixed to a first object. A second mating member 3200, 4200 is adapted to be fixed to a second object and adapted to be engaged with the first mating member 3100, 4100 and a stopping assembly 3307, 4307. The stopping assembly 3307, 4307 is adapted to be operated to selectively block or allow the first mating member 3100, 4100 and the second mating member 3200, 4200 to disengage from an engaged state. The stopping assembly 3307, 4307 can effectively prevent the second object (such as an outer ladder 110) and the first object (such as a support rod) from being easily unlocked by children, and can also prevent the outer ladder 110 from accidentally dropping and injuring people. Thereby, the safety of the pool safety ladder can be enhanced. It should further be appreciated that the rotatable connection mechanisms 23J and 23K may further include any of the afore described dampening members 25A, 25B, 25C to increase the force necessary to rotate the outer or movable ladder portion.

Although multiple embodiments have been described herein, various modifications may be made to these embodiments without departing from the spirit of the invention, and all such modifications still belong to the concept of the present invention and fall within the scope of the claims of the present invention.

While some implementations have been illustrated and described, numerous modifications may come to mind without departing from the spirit of the disclosure, and the scope of protection is only limited by the scope of the accompanying claims.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended by the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. Whenever a numerical range with a lower limit and/or an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patents or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each article of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. Claim recitation of "first" or "second" are not necessarily limited to usage in the specification unless otherwise supported within the claim terminology. The connection mechanisms, dampening member 25, support bases, and other features described in reference to specific embodiments can be arranged with other embodiments without departing from the subject disclosure.

What is claimed is:

1. A ladder assembly for an above-ground pool, the ladder assembly comprising:
- main support frame elements comprising:
  - a pair of inner rails;
  - a plurality of inner steps, each extending between the pair of inner rails; and
  - a pair of outer rails fixedly connected to the pair of inner rails;
- a moveable ladder portion moveably connected to the pair of outer rails between a first position and a second position, the moveable ladder portion comprising a pair of moveable rails and a plurality of steps extending between the pair of moveable rails;
- a connection mechanism moveably connecting each of the pair of moveable rails to a respective one of the pair of outer rails; and
- a mortise lock structure comprising:
  - a first mating member fixedly connected to a respective one of the pair of outer rails,
  - a second mating member fixedly connected to a respective one of the pair of moveable rails and including a sliding groove that further defines a snapping groove and a guiding groove,
  - a stopping assembly movably disposed within the sliding groove, such that the mortise lock structure is in a locked position when the stopping assembly is secured within the snapping groove and the mortise lock structure is in an unlocked position when the stopping assembly is positioned within the guiding groove, and
  - a lock assembly moveable within the second mating member and releasably connected to the first mating member.

2. The ladder assembly according to claim 1, wherein the connection mechanism rotatably connects each of the pair of moveable rails to a respective one of the pair of outer rails.

3. The ladder assembly according to claim 1, wherein:
- the first mating member comprises a first shaft hole formed through a wall thereof, and a first bolt, disposed through the first shaft hole and through a corresponding shaft hole in the respective one of the pair of outer rails, connects the first mating member to the respective one of the pair of outer rails; and
- the second mating member comprises a second shaft hole formed through a wall thereof, and a second bolt, disposed through the second shaft hole and through a corresponding shaft hole in the respective one of the pair of moveable rails, connects the second mating member to the respective one of the pair of moveable rails.

4. The ladder assembly according to claim 1, wherein the first mating member comprises a locking groove formed therein;
- the lock assembly comprises:
  - a lock tongue configured to releasably connect to the locking groove, and
  - a spring biasing the lock tongue to connect to the locking groove.

5. The ladder assembly according to claim 1, wherein the stopping assembly further comprises:
- a sliding portion disposed within the sliding groove of the second mating member;
- a guiding rod coupled to the sliding portion and extending from the sliding groove; and
- a handle slidably coupled to the guiding rod.

6. The ladder assembly of claim 5, wherein the handle is slidable relative to the guiding rod between an exposed position, in which the guiding rod translates through the guiding groove of the sliding groove, and a covered position, in which the guiding rod is locked within the snapping groove of the sliding groove.

7. The ladder assembly of claim 5, wherein a tail end of the handle is smaller than a size of the snapping groove and larger than a size of the guiding groove, such that the tail end of the handle can be accommodated in the snapping groove.

8. The ladder assembly of claim 5, wherein the stopping assembly further comprises a stopping spring disposed adjacent the handle and configured to bias the handle into the snapping groove of the sliding groove.

9. The ladder assembly of claim 5, wherein the handle is configured to slide relative to the guiding rod in a horizontal direction and the sliding portion is configured to slide within the sliding groove in a vertical direction.

10. A ladder assembly for an above-ground pool, comprising:
- main support frame elements comprising:
  - a pair of inner rails;
  - a plurality of inner steps, each extending between the pair of inner rails; and
  - a pair of outer rails fixedly connected to the pair of inner rails;
  - a moveable ladder portion moveably connected to the pair of outer rails between a first position and a second position, the moveable ladder portion comprising a pair of moveable rails and a plurality of steps extending between the pair of moveable rails;
  - a connection mechanism moveably connecting each of the pair of moveable rails to a respective one of the pair of outer rails; and
- a mortise lock structure comprising:

a first mating member fixedly connected to a respective one of the pair of outer rails, a second mating member fixedly connected to a respective one of the pair of moveable rails, and a lock assembly moveable within the second mating member and releasably connected to the first mating member;

a support base fixedly connected to a bottom end of each of the pair of outer rails, the support base comprising:

a pair of fixing recesses, each configured to retain a bottom end of one of the pair of moveable rails when the moveable ladder portion is in the first position, and a moveable latching mechanism comprising:

an elastic block comprising a first end, disposed within a cavity within the support base, and a second end forming a slope, the elastic block being moveable between a locked position in which the second end of the elastic block protrudes from the cavity into a position within one of the pair of fixing recesses to thereby wedge the bottom end of one of the pair of moveable rails within the fixing recess, and an unlocked position in which at least a portion of the second end of the elastic block is withdrawn within the cavity.

11. The ladder assembly according to claim 10, wherein the moveable latching mechanism further comprises:

a spring, disposed within the cavity and configured to bias the elastic block into the locked position.

12. The ladder assembly according to claim 11, wherein the moveable latching mechanism further comprises:

a switch, connected to the elastic block such that a movement of the switch causes a movement of the elastic block between the locked position and the unlocked position.

13. A ladder assembly for an above-ground pool, comprising:

main support frame elements comprising:

a pair of inner rails;

a plurality of inner steps, each extending between the pair of inner rails; and a pair of outer rails fixedly connected to the pair of inner rails;

a moveable ladder portion moveably connected to the pair of outer rails between a first position and a second position, the moveable ladder portion comprising a pair of moveable rails and a plurality of steps extending between the pair of moveable rails;

a connection mechanism moveably connecting each of the pair of moveable rails to a respective one of the pair of outer rails; and a mortise lock structure comprising:

a first mating member fixedly connected to a respective one of the pair of outer rails, a second mating member fixedly connected to a respective one of the pair of moveable rails, and a lock assembly moveable within the second mating member and releasably connected to the first mating member;

wherein the connection mechanism comprises a first connection mechanism rotatably connecting a first one of the pair of moveable rails to a respective one of the pair of outer rails and a second connection mechanism rotatably connecting a second one of the pair of moveable rails to a respective one of the pair of outer rails, such that the moveable ladder portion is rotatable about a first axis between the first position and the second position; and each of the first connection mechanism and the second connection mechanism comprises:

a first shaft disposed in a first bore, the first shaft being rotatable within the first bore about the first axis, and a dampening member configured to provide resistance to rotation of the moveable ladder portion, the dampening member comprising a first damper disposed between the first shaft and the first bore.

14. The ladder assembly according to claim 13, wherein each of the first connection mechanism and the second connection mechanism further comprises a rotation component rotatable relative to the moveable ladder portion via a connection of the first shaft and the first bore about the first axis, the rotation component being further rotatable via a second shaft and a second bore about a point located on the first axis.

15. The ladder assembly according to claim 14, wherein the dampening member further comprises a second damper disposed between the second shaft and the second bore.

* * * * *